US012681576B2

(12) United States Patent
Swett et al.

(10) Patent No.: US 12,681,576 B2
(45) Date of Patent: Jul. 14, 2026

(54) WEARABLE MATERIAL DESIGNED TO MAINTAIN CHARACTERISTIC IMPEDANCE LEVELS WITHIN DESIRED RANGE, AND SYSTEMS AND METHODS OF USE THEREOF

(71) Applicant: Meta Platforms Technologies, LLC, Menlo Park, CA (US)

(72) Inventors: Adam Swett, Seattle, WA (US); Michael Tawfik Khbeis, Federal Way, WA (US); Filipp Demenschonok, Bothell, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 18/917,269

(22) Filed: Oct. 16, 2024

(65) Prior Publication Data

US 2025/0123687 A1 Apr. 17, 2025

Related U.S. Application Data

(60) Provisional application No. 63/590,747, filed on Oct. 16, 2023.

(51) Int. Cl.
*G06F 3/01* (2006.01)
*G06F 1/16* (2006.01)

(52) U.S. Cl.
CPC .............. *G06F 3/015* (2013.01); *G06F 1/163* (2013.01); *G06F 3/012* (2013.01); *G06F 3/014* (2013.01); *G06F 3/017* (2013.01)

(58) Field of Classification Search
CPC .......... G06F 1/163; G06F 3/011; G06F 3/012; G06F 3/014; G06F 3/015; G06F 3/016; G06F 3/017
See application file for complete search history.

(56) References Cited

U.S. PATENT DOCUMENTS

| | | | | |
|---|---|---|---|---|
| 8,886,334 | B2 * | 11/2014 | Ghaffari | A61B 5/02028 |
| | | | | 607/115 |
| 10,314,534 | B2 * | 6/2019 | Yoon | G16H 20/30 |
| 10,649,528 | B2 * | 5/2020 | Hoen | D03D 1/0082 |
| 2007/0083096 | A1 * | 4/2007 | Paradiso | D04B 1/12 |
| | | | | 600/388 |
| 2017/0356812 | A1 * | 12/2017 | Madden | H03K 17/962 |
| 2017/0370030 | A1 * | 12/2017 | Podhajny | G06F 3/0446 |
| 2024/0231489 | A1 * | 7/2024 | Kao | G06F 3/016 |

* cited by examiner

*Primary Examiner* — Mihir K Rayan
(74) *Attorney, Agent, or Firm* — McDermott Will & Schulte LLP

(57) ABSTRACT

A wearable material is described. The wearable material includes a stretchable material including a biopotential-signal-sensing component for sensing a biopotential signal from a portion of a wearer's body on which the wearable material is being worn. The stretchable material includes a ground layer. The biopotential-signal-sensing component is separated from the ground layer by a height (H). The biopotential-signal-sensing component has a width (W) and a thickness (T). And the stretchable material is configured to maintain a substantially consistent stretch ratio between the width (W), the thickness (T), and the height (H) such that a substantially consistent characteristic impedance value $(Z_o)$ is maintained by the biopotential-signal-sensing component.

20 Claims, 21 Drawing Sheets

AR system 400c 402        600

424        420

700

500

422

AR system 400c

420

VR device 610

705

714a    702               700

704      706

708

712             710

714b

720

725

702

724     720     722B 714B     722A     726     728     730

WEARABLE MATERIAL DESIGNED TO MAINTAIN CHARACTERISTIC IMPEDANCE LEVELS WITHIN DESIRED RANGE, AND SYSTEMS AND METHODS OF USE THEREOF

RELATED APPLICATIONS

This application claims priority to U.S. App. No. 63/590,747, filed on Oct. 16, 2023, and titled "Wearable Material Designed to Maintain Characteristic Impedance Levels Within Desired Range, and Systems and Methods of Use Thereof," which is hereby incorporated by reference in its entirety.

TECHNICAL FIELD

The present disclosure relates generally to wearable electronic devices having stretchable materials, and more particularly to stretchable materials of wearable electronic devices that are configured to maintain a substantially consistent value of an electrical property that is based on properties of the stretchable materials (e.g., an impedance value) as the stretchable material is physically deformed by users' interactions with the wearable electronic devices (e.g., hand movements, such as in-air hand gestures and interactions with virtual objects of the artificial-reality content).

BACKGROUND

Wearable devices have become increasingly common for use with computing systems that use signals detected by sensing components (e.g., sensors and/or constituent components thereof) that are disposed on the wearable devices. Some wearable devices must include stretchable materials (e.g., textile material of a wearable glove garment), such that the wearable devices are able to fit properly on multiple different users wearing the wearable devices. But such stretchable materials, when used for sensing purposes (or other electronic functions), can have undesirable variances with respect to electrical values (e.g., a characteristic impedance) of the electronic components that are disposed within the stretched region. For example, such variances can result in impedance discontinuities, limiting the speed at which data can be transmitted, since a respective link (e.g., electronic connection for the sensing components) may degrade due to reflections on the transmission lines coupled to the sensing components. Variances can also lead to other deleterious consequences, such as: reduced sensing accuracy, electro-mechanical degradation, and negative impacts to processing capabilities of an electronic device configured to process the received signals.

SUMMARY

The embodiments described herein provide improved sensing capabilities for wearable electronic devices that include stretchable components having sensors disposed within the stretchable components, where a characteristic electrical value (e.g., a characteristic impedance) remains consistently stable at the stretchable component as it is physically deformed by use.

A wearable material (e.g., of a wearable electronic device) is provided. The wearable material includes a stretchable material, including a biopotential-signal-sensing component for detecting biopotential signals from a portion of a wearer's body on which the wearable material is being worn. The stretchable material includes a ground layer. The biopotential-signal-sensing component is separated from the ground layer by a height (H). The biopotential-signal-sensing component has a width (W) and a thickness (T). And the stretchable material is configured to maintain a substantially consistent stretch ratio between the width (W), the thickness (T), and the height (H) such that a substantially consistent characteristic impedance value ($Z_o$) is maintained by the biopotential-signal-sensing component. The stretchable material can also be configured to facilitate transmission of high-speed digital signals across a dimension of the stretchable material having the characteristic impedance.

The features and advantages described in the specification are not necessarily all inclusive and, in particular, certain additional features and advantages will be apparent to one of ordinary skill in the art in view of the drawings, specification, and claims. Moreover, it should be noted that the language used in the specification has been principally selected for readability and instructional purposes.

Having summarized the above example aspects, a brief description of the drawings will now be presented.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

FIGS. 4A 4B, 4C-1, 4C-2, 4D-1, and 4D-2 illustrate example artificial-reality systems, in accordance with some embodiments.

FIGS. 6A, 6B-1, 6B-2, and 6C illustrate example head-wearable devices, in accordance with some embodiments.

Figure 1A:
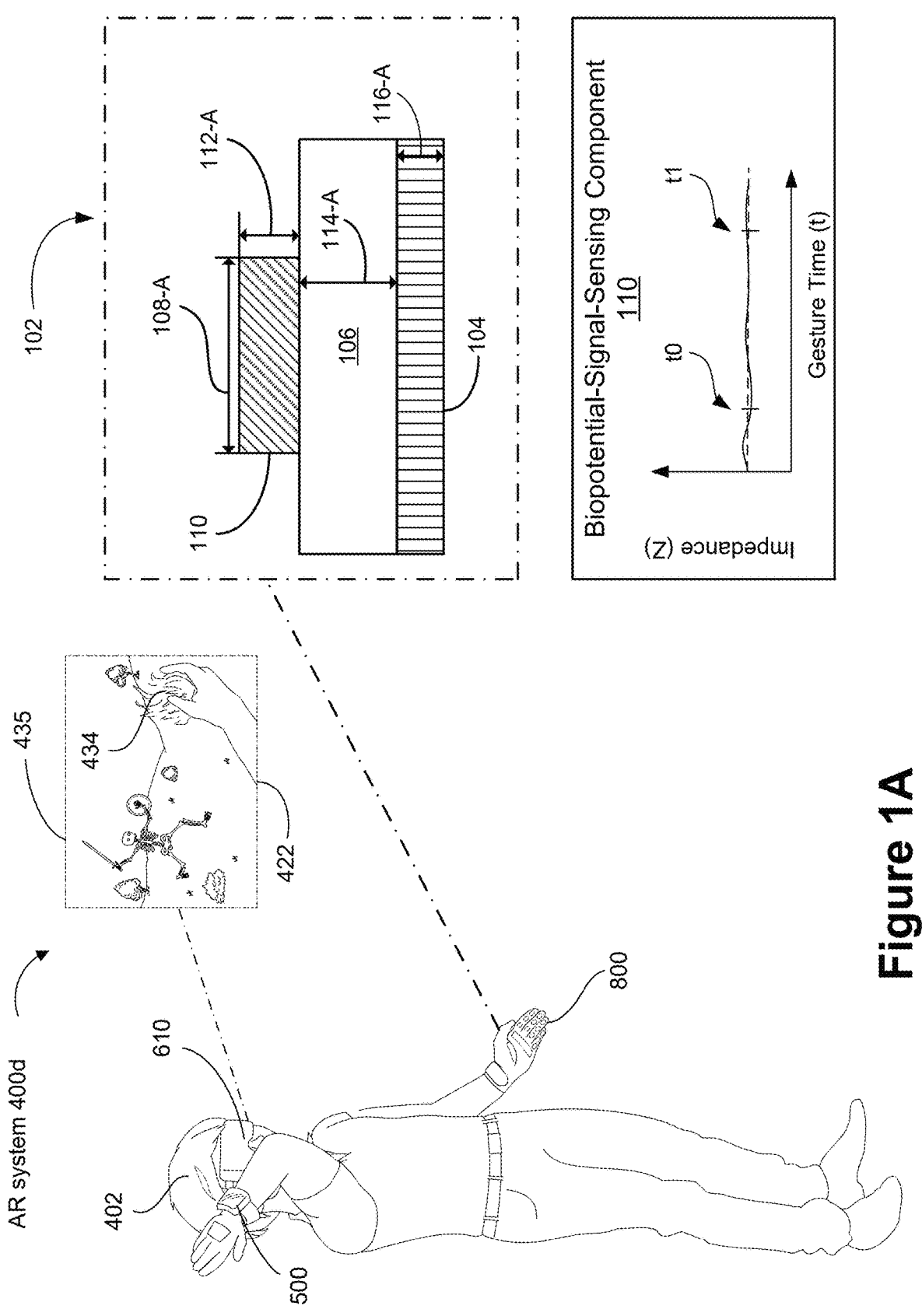
FIGS. 1A and 1B illustrate an example wearable electronic device that includes a first example wearable material, in accordance with some embodiments.

In accordance with customary practice, the various features illustrated in the drawings may not be drawn to scale. Accordingly, the dimensions of the various features may be arbitrarily expanded or reduced for clarity. In addition, some of the drawings may not depict all of the components of a given system, method, or device. Finally, like reference numerals may be used to denote like features throughout the specification and figures.

DETAILED DESCRIPTION

Numerous details are described herein to provide a thorough understanding of the example embodiments illustrated in the accompanying drawings. However, some embodiments may be practiced without many of the specific details, and the scope of the claims is only limited by those features and aspects specifically recited in the claims. Furthermore, well-known processes, components, and materials have not necessarily been described in exhaustive detail so as to avoid obscuring pertinent aspects of the embodiments described herein.

Embodiments of this disclosure can include or be implemented in conjunction with distinct types or embodiments of artificial-reality systems. Artificial-reality (AR), as described herein, is any superimposed functionality and or sensory-detectable presentation provided by an artificial-reality system within a user's physical surroundings. Such artificial-realities can include and/or represent virtual reality (VR), augmented reality, mixed artificial-reality (MAR), or some combination and/or variation one of these. For example, a user can perform a swiping in-air hand gesture to cause a song to be skipped by a song-providing API providing playback at, for example, a home speaker. An AR environment, as described herein, includes, but is not limited to, VR environments (including non-immersive, semi-immersive, and fully immersive VR environments), augmented-reality environments (including marker-based augmented-reality environments, markerless augmented-reality environments, location-based augmented-reality environments, projection-based augmented-reality environments), hybrid reality, and other types of mixed-reality environments.

Artificial-reality content may include generated content that encompasses substantially all, or at least a significant portion, of a user's field of view (e.g., purely virtual-reality content), and/or generated content combined with (presented in conjunction with) real-world aspects of the user's physical surroundings (e.g., via passthrough imaging and/or transparent display lenses). The artificial-reality content can include video, audio, haptic events, or some combination thereof, any of which can be presented in a single channel or in multiple channels (such as stereo video that produces a three-dimensional effect to a viewer). Additionally, in some embodiments, artificial reality can also be associated with applications, products, accessories, services, or some combination thereof, which are used, for example, to create content in an artificial reality environment and/or are otherwise used in (e.g., to perform activities in) an artificial reality.

Figure 1B:
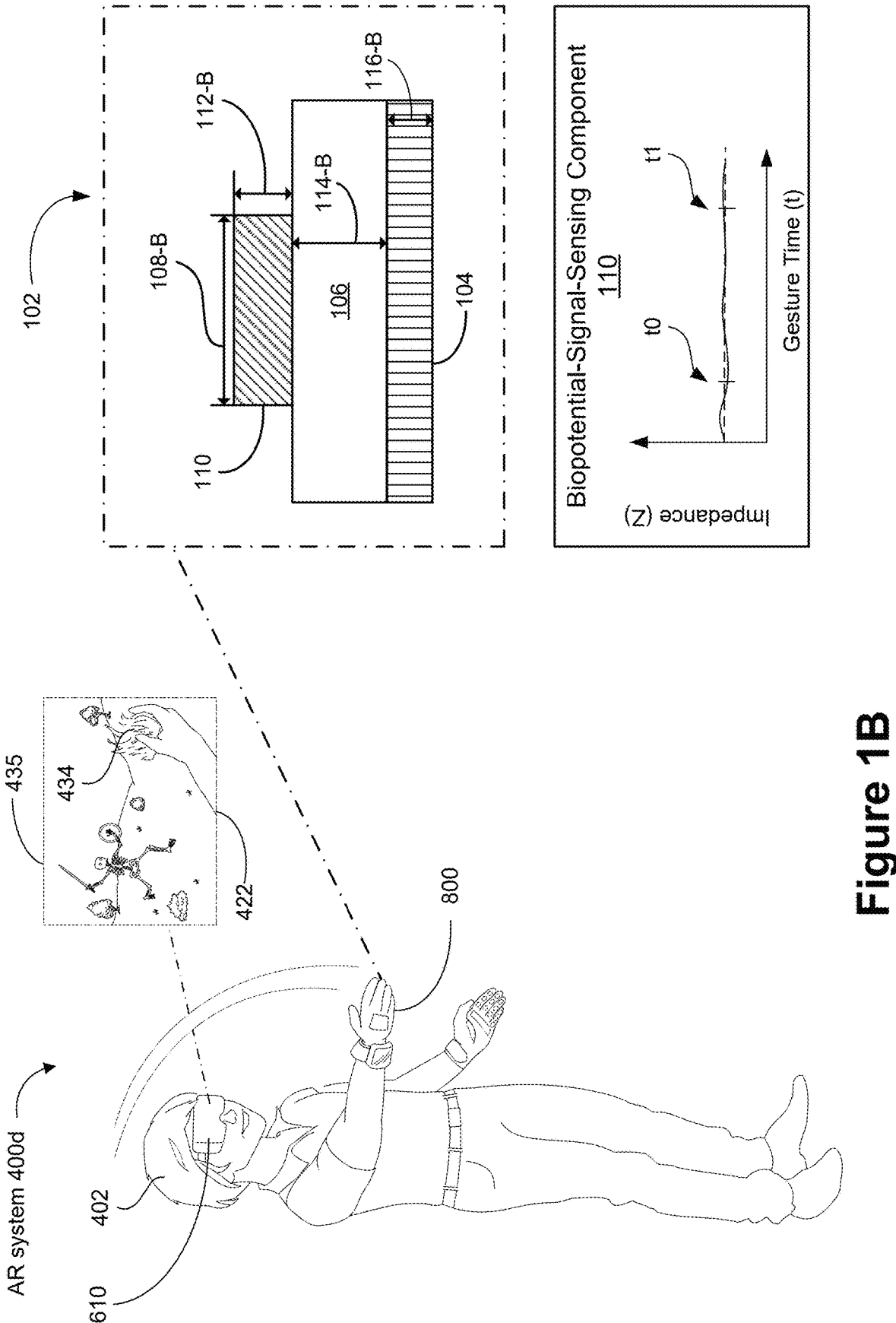

FIGS. 1A and 1B illustrate an example wearable electronic device (e.g., an example of the textile-based garment 800) that includes (e.g., is comprised and/or composed of) a first stretchable material 102, in accordance with some embodiments. For ease of explanation, the first stretchable material 102 will be described with respect to an AR system 400d that will be described in more detail with respect to FIGS. 4A to 4B, 4C-1 to 4C-2, and 4D-1 to 4D-2. As described in more detail with respect to FIGS. 8A to 8C, the textile-based garment 800 may include sensing components for detecting neuromuscular signals (e.g., the electromyography (EMG) sensors 856, the IMU 858, the capacitive sensor 860). For example, in FIGS. 1A and 1B, the textile-based garment 800 includes the first stretchable material 102 that is composed of a biopotential-signal-sensing component 110 that is separated from a ground layer 104 by a dielectric layer 106, each of which will be discussed in more detail below. In accordance with some embodiments, the biopotential-signal-sensing component 110 may have a characteristic impedance, which may be an inherent property of the material properties necessary for detecting biopotential signals (e.g., conductive material that allows electrical current to flow across the biopotential-signal-sensing component 110.

FIG. 1A shows the first stretchable material 102 at a first time (t0) while respective components (e.g., layers) of the biopotential-signal-sensing component 110 (e.g., a trace) correspond to a first size (e.g., while the stretchable material is not being worn by a user). While at the first size at the first time, the biopotential-signal-sensing component 110 has a first width 108-A and a first thickness 112-A. Any of the dimensions described herein may be referring to a constant value, an aggregated value based on a distribution across an area of the biopotential-signal-sensing component 110. The user 402 is using the textile-based garment 800 to interact with the second AR game environment 435, which includes an AR representation 422 of the user 402. As the user interacts with the second AR game environment 435 (e.g., throwing a virtual object, such as the fireball 434). The first stretchable material 102 may expand and/or contract based on the hand gestures (e.g., sequences of hand movements) performed by the user 402 as part of the interactions with the second AR game environment 435.

In accordance with some embodiments, the first stretchable material 102 includes at least one ground layer, such as the ground layer 104. The ground layer 104 may be referred to herein as a "ground plane," or other similar terms. That is, the terms "plane" and "layer" may be used interchangeably with respect to certain components described herein. At the first time, the ground layer 104 has thickness 116-A that is between 1 and 10 millimeters. In some embodiments, a portion of the first stretchable material 102 includes the ground layer 104, and another portion of the first stretchable material 102 does not include the ground layer 104. That is, in some embodiments, the locations of the stretchable material 102 that include the ground layer 104 correspond to locations of the biopotential-signal-sensing component 110.

In accordance with some embodiments, the first stretchable material 102 includes a dielectric layer 106. In some embodiments, the dielectric layer 106 is positioned between the ground layer 104 (e.g., the ground plane) and the biopotential-signal-sensing component 110. At the first time (e.g., while unstretched) the dielectric layer 106 has a first height 114-A. In some embodiments the first height 114-A is between 10 and 20 millimeters. In some embodiments the ground layer 104 has a first height between 1 and 10 millimeters. In some embodiments, the dielectric layer 106 is configured and arranged to fully enclose the biopotential-signal-sensing component 110. In some embodiments, the first stretchable material 102 is configured to adjust the height of the dielectric layer 106 based on changes to other dimensions of the first stretchable material 102, such as the height and thickness of the biopotential-signal-sensing component 110.

In some embodiments, the first stretchable material 102 causes a substantially consistent characteristic impedance value (Zo) to be maintained by the biopotential-signal-sensing component 110 while the textile-based garment 800 is being deformed through wear and/or interactions by the user 402 (e.g., when the user performs a hand motion that causes a characteristic biopotential signal to be detected and also causes a change in size to a particular portion of the stretchable). That is, the biopotential-signal-sensing component 110 may be configured to be deformed in a particular way such that respective dimensions of the biopotential-signal-sensing component 110 maintain a particular proportional relationship (e.g., based on maintaining a substantially consistent electrical property). For example, maintaining the particular proportional relationship may cause the biopotential-signal-sensing component 110 to maintain the same characteristic impedance Zo. In some embodiments, the biopotential-signal-sensing component 110 includes (e.g., is comprised of) one or more components of a neuromuscular-signal sensor (e.g., an electromyography (EMG) sensor).

In some embodiments, the characteristic impedance that is maintained at a substantially consistent value by the first stretchable material 102 can be represented by the following equation (where W is the first width 108-A, T is the first thickness 112-A, and H is the distance 114-A between the biopotential-signal-sensing component 110 and the ground layer 104). In some embodiments, the first stretchable material is configured for transmission of other signals in addition or alternatively to biopotential signals, such as high-speed digital signals, across a portion of the stretchable material having the characteristic impedance. By maintaining the characteristic impedance, such high-speed digital signals can be transmitted with minimum degradation of the signals as they are received by another processing device. In some embodiments, the stretchable material is configured to prevent discontinuities from occurring along a transmission path of signals transmitted across the stretchable material.

$$Z_o(\Omega) = \frac{87}{\sqrt{\varepsilon_r + 1.41}} \ln\left[\frac{5.98H}{0.8W + T}\right]. \qquad \text{Equation 1}$$

In accordance with some embodiments, the dielectric layer 106 has a relative permittivity $(\varepsilon_r)$, such that $\varepsilon_r$ is a constant value related to a respective physical characteristic of a particular dielectric material comprising the dielectric layer (e.g., the relative permittivity of the material comprising the dielectric layer 106). In some embodiments, the relative permittivity of the dielectric layer 106 may be tuned (e.g., modified) based on detected changes in a respective width or height of the biopotential-signal-sensing component 110. For example, the dielectric layer 106 may be configured to have a first value of relative permittivity while the biopotential-signal-sensing component 110 has a first width 108-A and a first height 112-A.

FIG. 1B shows the first stretchable material 102 at a second time (t1), when the first stretchable material 102 has a second size, including different dimensions of the constituent components than the dimensions of the stretchable material at the first time. For example, at the second time, the biopotential-signal-sensing component 110 has a second width 108-B and a second thickness 112-B. In some embodiments, the dielectric layer 106 has a second height 114-B and/or the ground layer 104 has a second thickness 116-B. In some embodiments one or more of the dimensions of first stretchable material 102 is the same when it is at the second size as when it is at the first size. For example, the dielectric layer 106 may be configured to maintain substantially the same thickness as the size of the first stretchable material 102 is modified. In some embodiments, material may be added or removed from the dielectric layer 106 in order to maintain the characteristic impedance when the first stretchable material 102 is at the second size. For example, material comprising the dielectric layer 106 may be dispersed in other portions of the textile-based garment 800, and may be caused to transport into and/or out of the dielectric layer 106, such that the stretchable material 102 maintains a particular set of characteristics (e.g., a characteristic impedance), regardless of a momentary size of the first stretchable material 102.

Figure 2A:
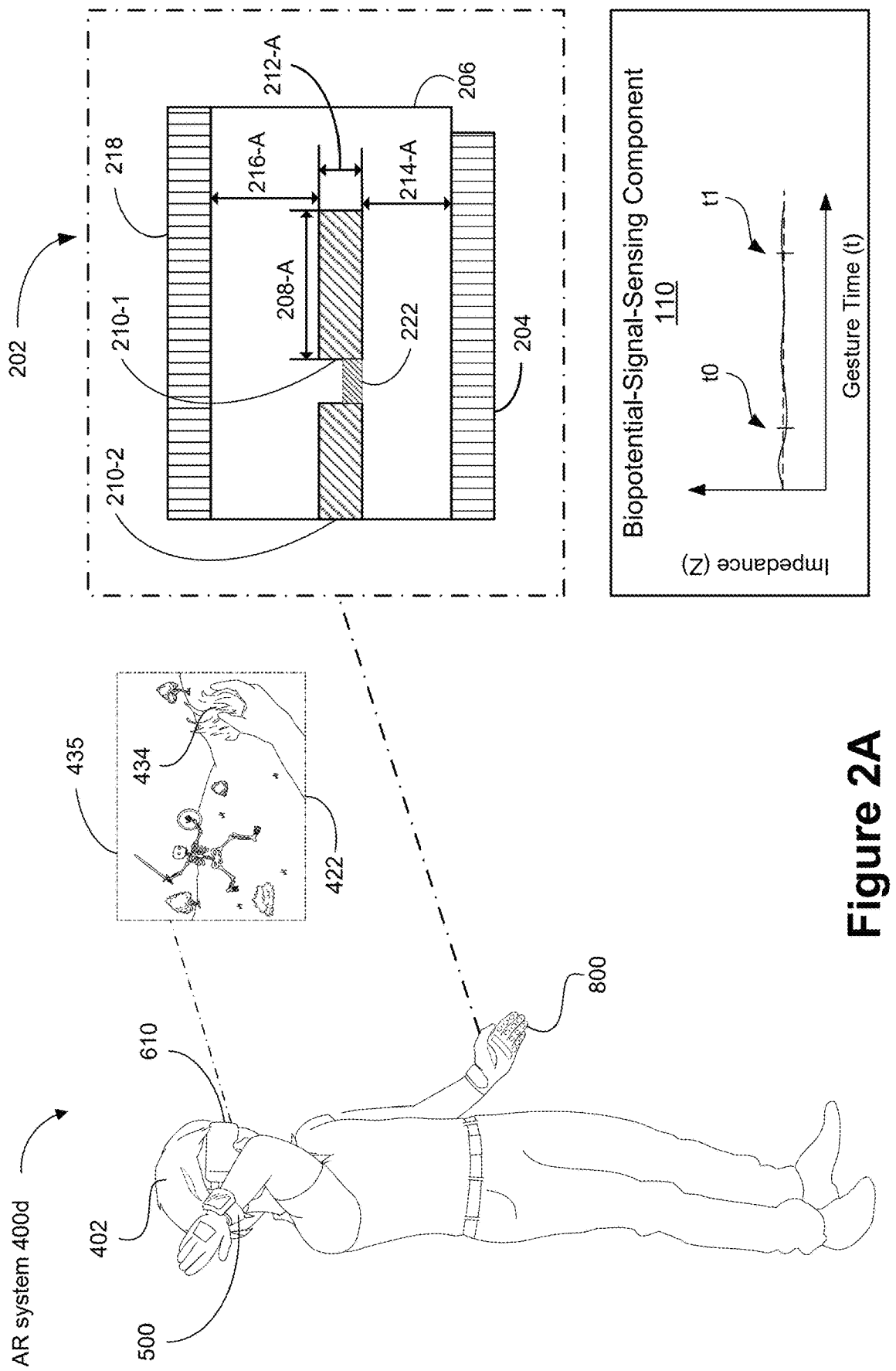
FIGS. 2A and 2B illustrate an example wearable electronic devices that includes a second example wearable material, in accordance with some embodiments.
Figure 2B:
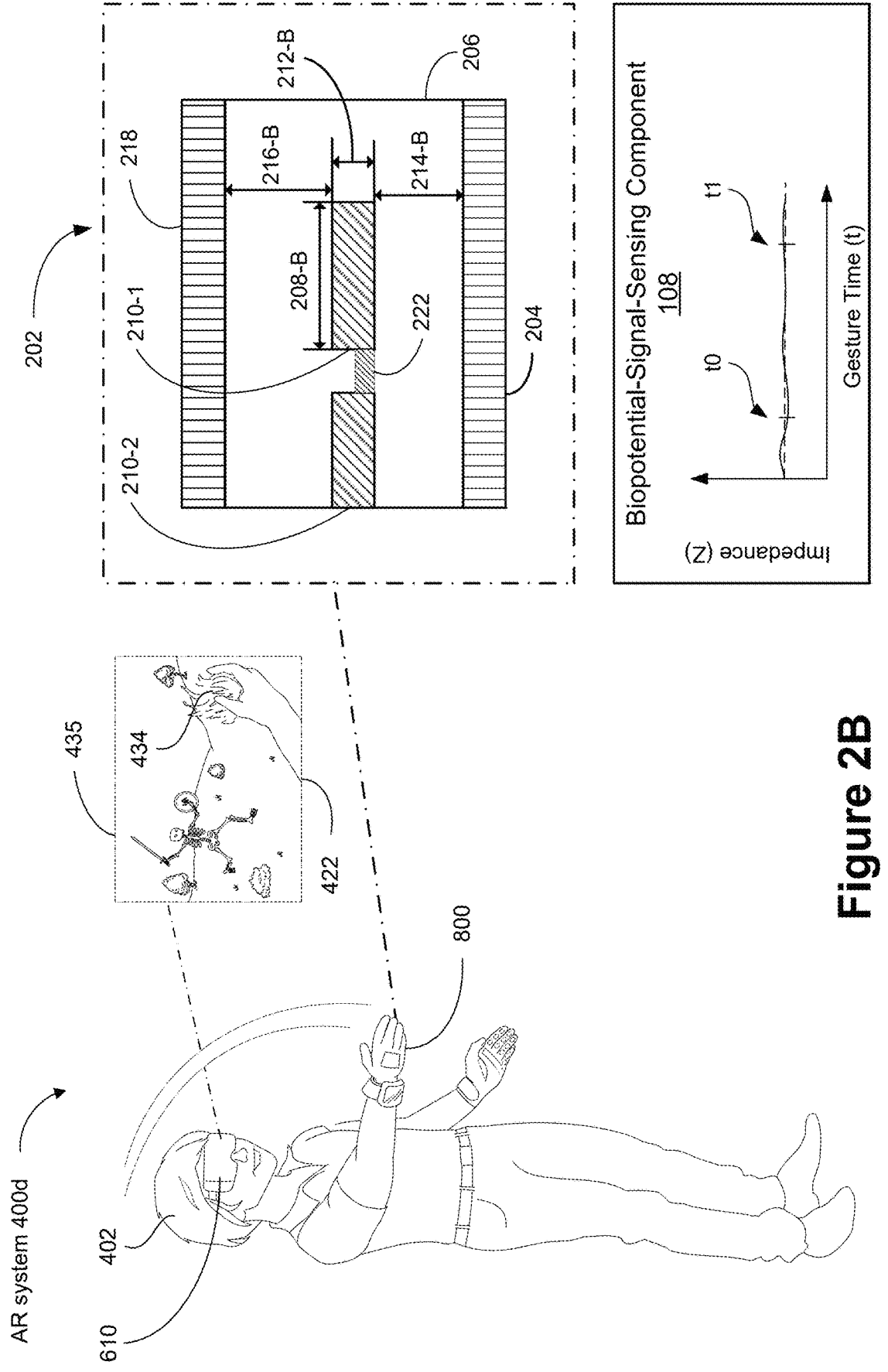

FIGS. 2A and 2B illustrate an example wearable electronic device (e.g., another example of the textile-based garment 800) that includes a second stretchable material 202, in accordance with some embodiments. The wearable electronic device is another example of the textile-based garment 800 described with respect to FIGS. 8A to 8C. Similar to the interaction shown by the sequence of FIGS. 1A, the user 402 is interacting with the second AR game environment 435, including the AR representation 422 and the virtual object (the fireball 434) that the user 402 is interacting with using hand gestures that are detected based in part on the second stretchable material having a substantially consistent impedance. In some embodiments, other electronic signals (e.g., high-speed digital signals) related to the interaction that the user 402 is performing with second AR game environment 435 can be transmitted across the stretchable material 202 in conjunction with, or separately from the biopotential signals being detected by the biopotential-signal-sensing component 210.

The second stretchable material 202 includes distinct configuration of layers from the first stretchable material 102 shown in FIGS. 1A and 1B. The second stretchable material 202 includes a biopotential-signal-sensing component 210, which may be comprised of the same or a different material than the biopotential-signal-sensing component 110 shown in FIGS. 1A and 1B. The second stretchable material 202 includes a dielectric layer 206, which may be composed of a same or different material as the dielectric layer 106 described with respect to FIGS. 1A and 1B. The second stretchable material 202 includes a second layer 218, such that the ground layer 204 and the second layer 218 sandwich the biopotential-signal-sensing component 210 and each of the dielectric layers 214 and 216, in accordance with some embodiments. In some embodiments, the second layer 218 is another ground layer, which may be composed of substantially the same material as the ground layer 208. In some embodiments, the second layer 218 is a power layer (e.g., a power plane). In some embodiments, a first surface of the ground layer 204 is substantially parallel to a second surface of the second layer 218.

In some embodiments, the biopotential-signal-sensing component 210 is part of a mesh that includes a plurality of biopotential-signal-sensing components (e.g., a first biopotential-signal-sensing component 210-1, and a second biopotential-signal-sensing component 210-2), which may be connected by a linking material 222. In some embodiments, the linking material 222 may be composed of the same or a different material than the biopotential-signal-sensing component 210. In some embodiments, the linking material 222 has a fixed size, such that a particular separation distance is maintained between each of the biopotential-signal-sensing components 210 of the mesh. In some embodiment, the separation distance is configured to prevent electrical noise between the respective biopotential-signal-sensing components 210 of the mesh. In accordance with some embodiments the first and second surfaces of the biopotential-signal-sensing component 210 are substantially opposite and/or substantially planar. In some embodiments, the biopotential-signal-sensing component 210 is configured and arranged to be within (e.g., sandwiched between) respective outer layers of the second stretchable material 202. In some embodiments, the biopotential-signal-sensing component 210 is at least partially exposed outside of the respective outer layers of the second stretchable material 202 and/or closer to a first outer edge than a second outer edge of the second stretchable material 202. In some embodiments, a first portion of the biopotential-signal-sensing component

210 is configured and arranged to maintain a substantially consistent impedance (e.g., by maintaining a particular dimensional relationship), and a second portion of the biopotential-signal-sensing component 210 (e.g., a portion of the biopotential-signal-sensing component 210 that is located outside of the dielectric layer 206) is configured to deform without maintaining a characteristic impedance.

FIG. 2A shows the second stretchable material 202 at a first time (t0) when the stretchable material 202 has a first size. At the first time, the biopotential-signal-sensing component 210 has a first width 208-A and a first thickness 210-A. In accordance with some embodiments, a total height of the dielectric layer 206 at the first time is a sum of: (i) a first distance 214-A (D1) between the first surface of the ground layer 204 and a first surface of the biopotential-signal-sensing component 210, (ii) the thickness 212-A of the biopotential-signal-sensing component 210, and (iii) a second distance 216-A (D2) between the second surface of the second layer 218 and a second surface of the biopotential-signal-sensing component 210. In some embodiments, the width 208-A of the biopotential-signal-sensing is between 10 and 30 microns (e.g., 16 microns, 18 microns, 20 microns, 22 microns). In some embodiments, the stretchable material includes a mesh, which may be composed of one or more of copper, zinc, and/or rubber.

FIG. 2B shows the second stretchable material 202 at a second time (t1) when the stretchable material 202 has a second size. At the second time, the biopotential-signal-sensing component 210 has a second width 208-B and a second height 210-B. In accordance with some embodiments, a total height of the dielectric layer 206 at the second time is a sum of: (i) a first distance 214-B between the first surface of the ground layer 204 and the first surface of the biopotential-signal-sensing component 210, (ii) the thickness 212-B of the biopotential-signal-sensing component 210, and (iii) a second distance 216-B between the second surface of the second layer 218 and the second surface of the biopotential-signal-sensing component 210.

FIGS. 3A-1 to 3C-2 illustrate different example wearable electronic devices that may include the first or second example wearable materials, in accordance with some embodiments. In some embodiments, the stretchable materials described herein (e.g., the first stretchable material 102, the second stretchable material 202) composes one or more of: (i) a band portion of a wrist-wearable device, (ii) a strap of an artificial-reality headset, and/or (iii) a skin-contacting portion of a wearable glove device. But one of skill in the art will appreciate that other devices not explicitly described herein may be configured and arranged to include any of the features and/or limitations of the explicit embodiments described herein. In some embodiments, all of the stretchable materials described with respect to FIGS. 3A-1 to 3E-2 have a same substantially consistent stretch ratio defined by the following equation.

$$Z_o(\Omega) = \frac{60}{\sqrt{\varepsilon_r}} \ln\left[\frac{1.9H2}{0.8W + T}\right]. \qquad \text{Equation 2}$$

Figures 2, 3A:
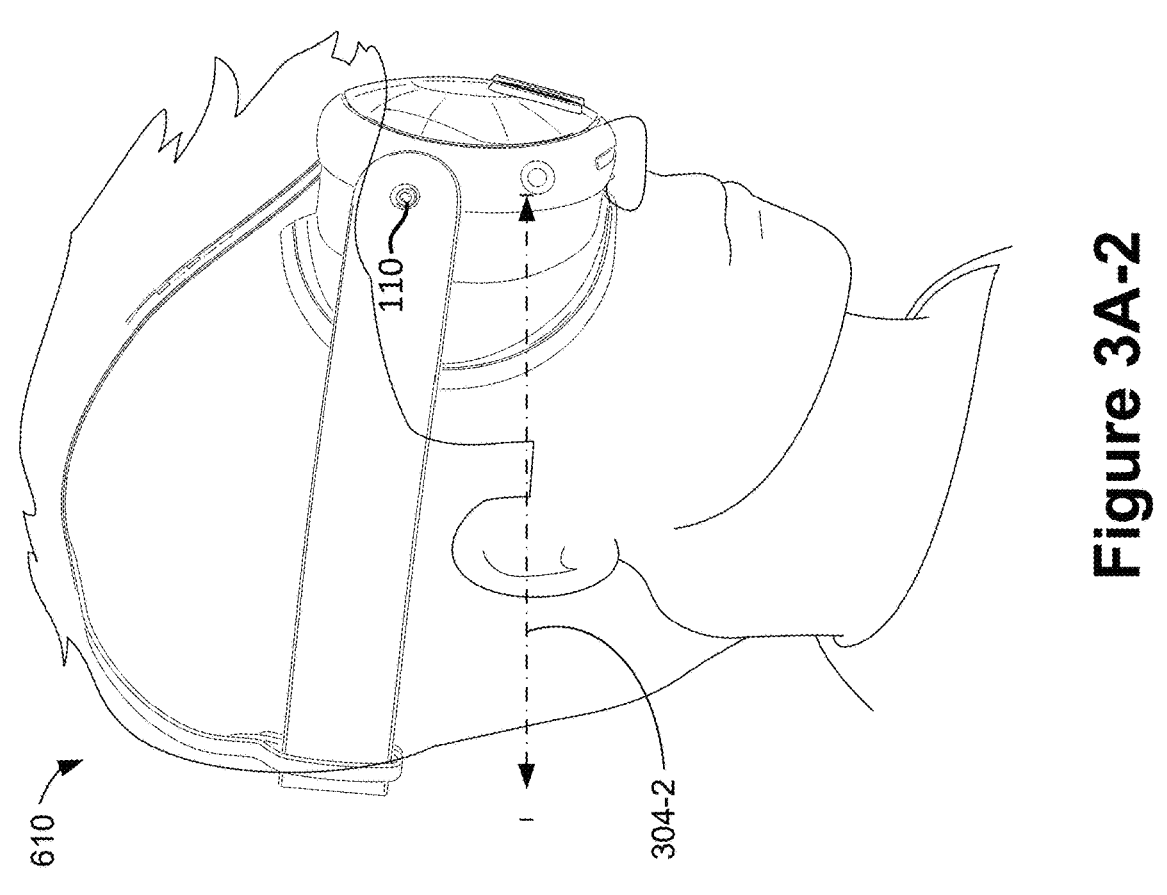
FIGS. 3A-1 to 3C-2 illustrate different example wearable electronic devices that may include the first or second example wearable materials, in accordance with some embodiments.
Figures 1, 3A:
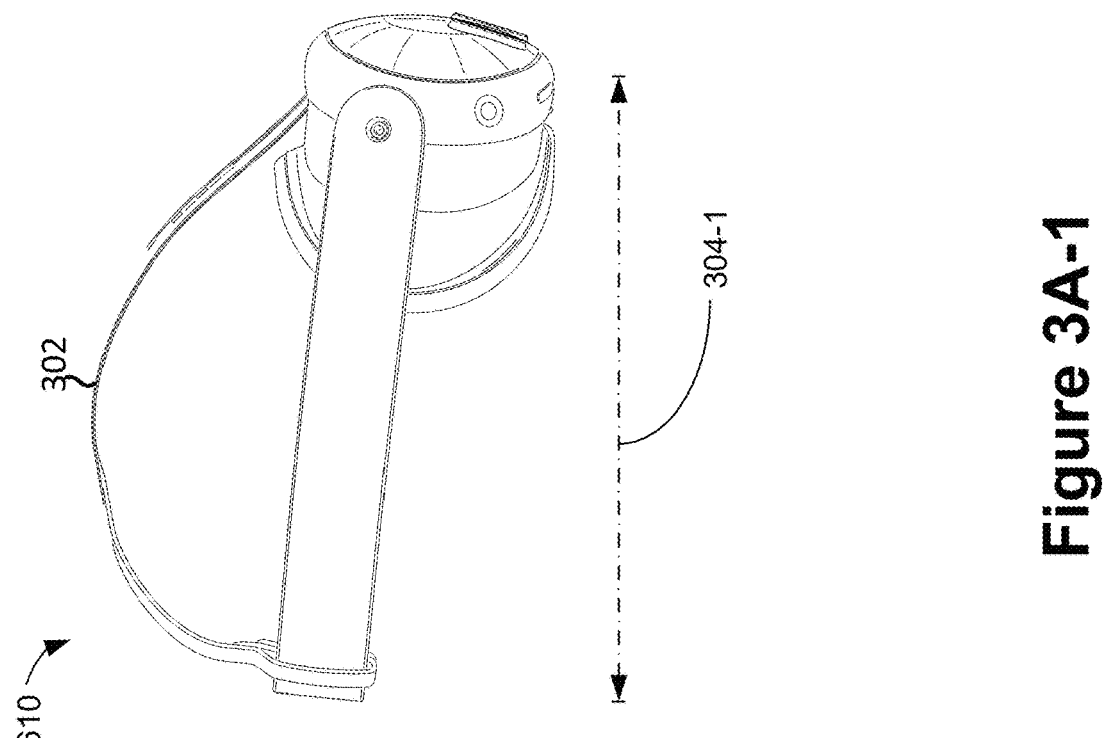
Figure 6A:
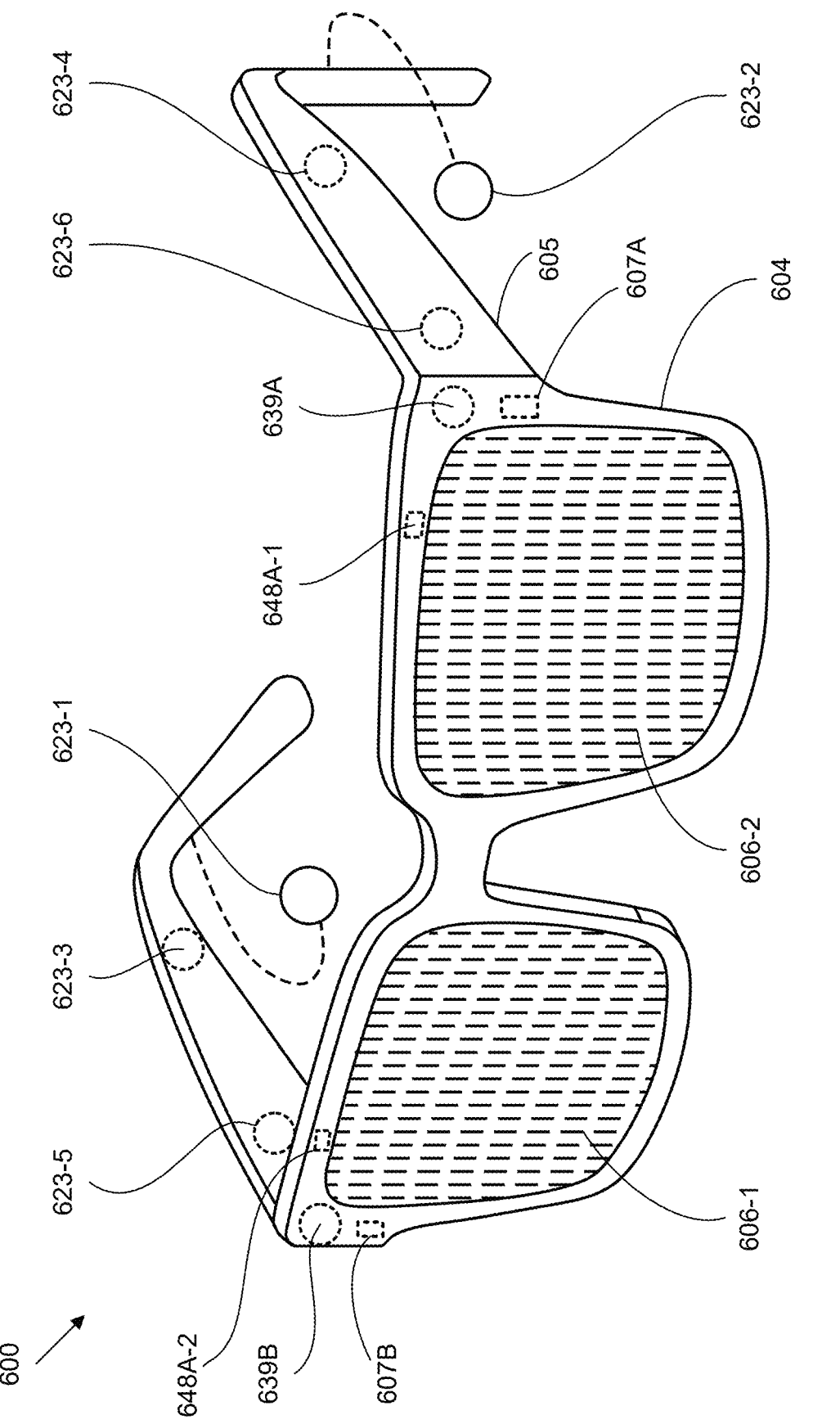
Figures 1, 6B:
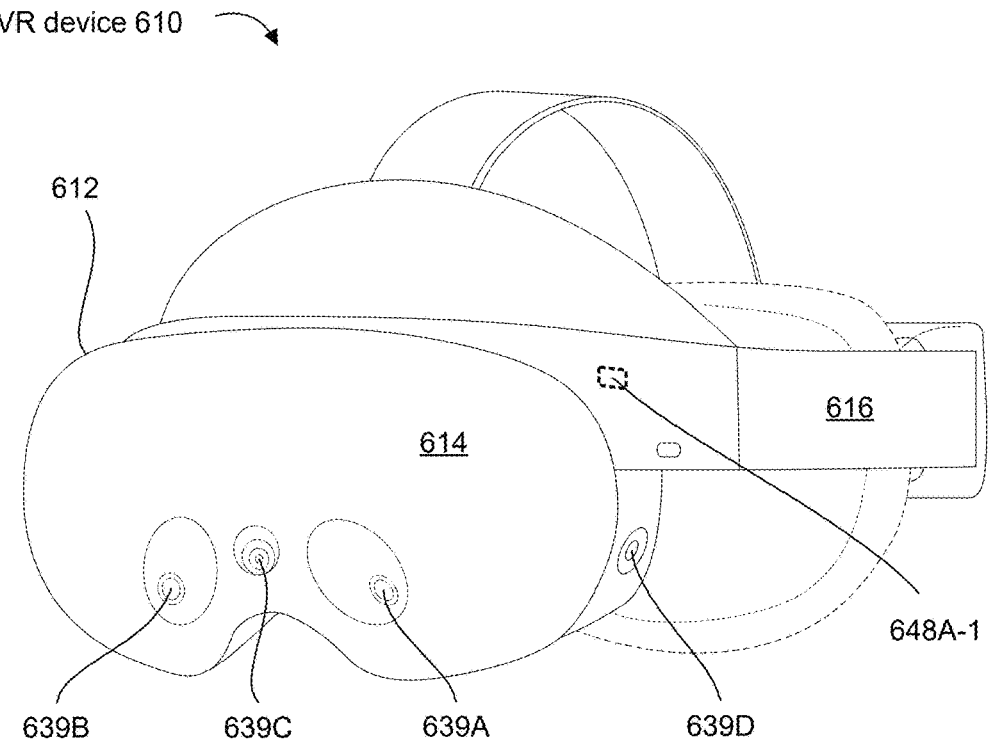
Figures 2, 6B:
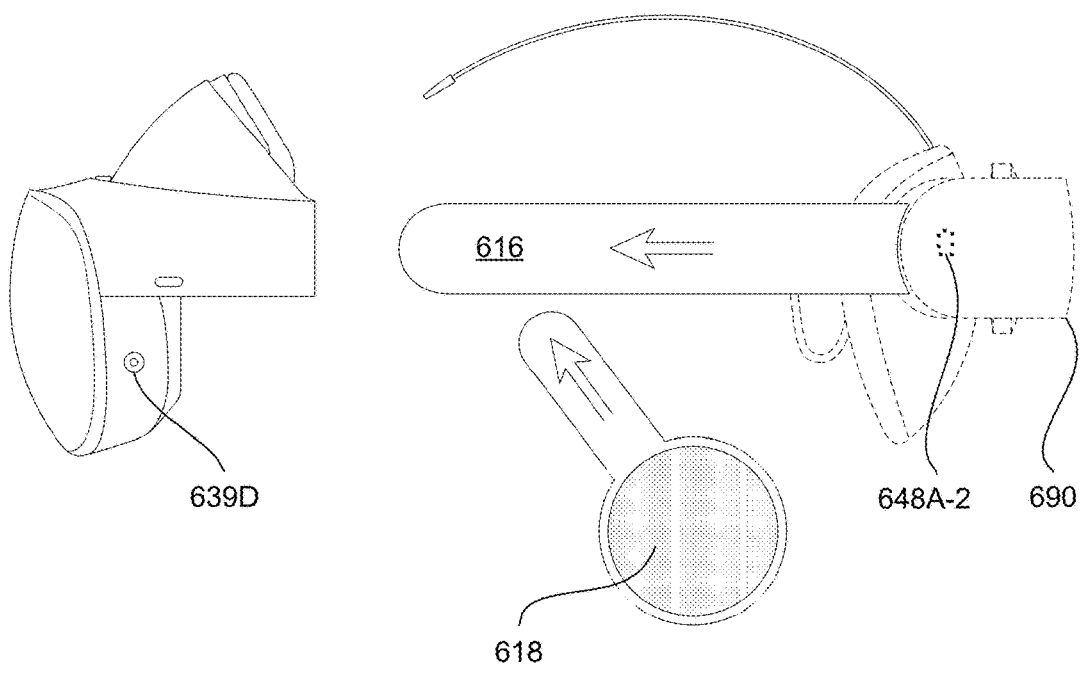
Figure 6C:
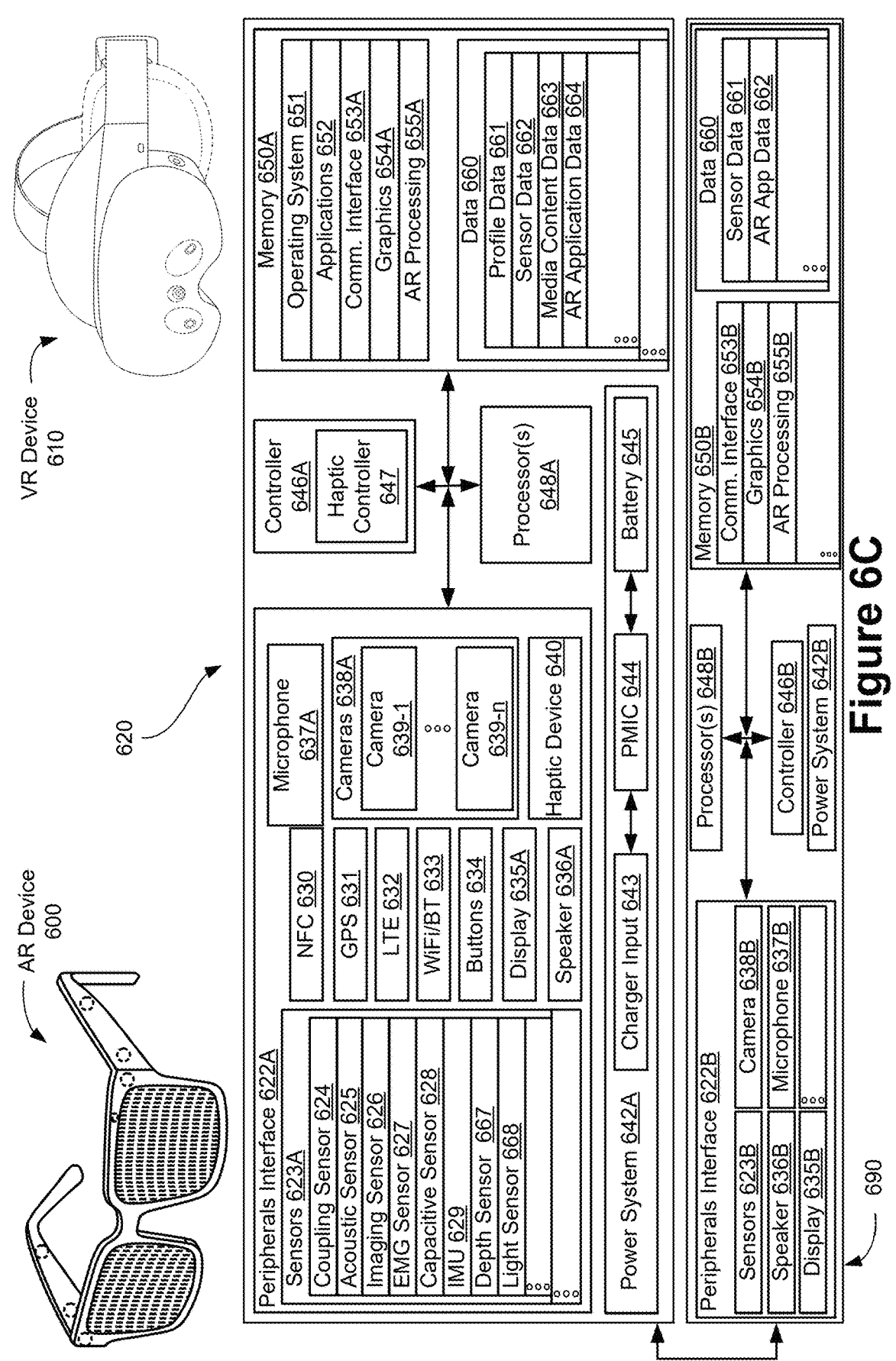

FIGS. 3A-1 and 3A-2 illustrate an example embodiments of the VR device 610 described in more detail with respect to FIGS. 6A to 6C. In some embodiments, the VR device 610 includes a strap 302 that is composed of a stretchable material having analogous features to the example embodiments described herein (e.g., the first stretchable material 102, the second stretchable material 202). In some embodiments, the strap material is configured to, via the stretchable material, stretch between a first smallest dimension (e.g., a first length 304-1) and a second smallest dimension (e.g., the second length 304-2).

Figures 1, 2, 3B:
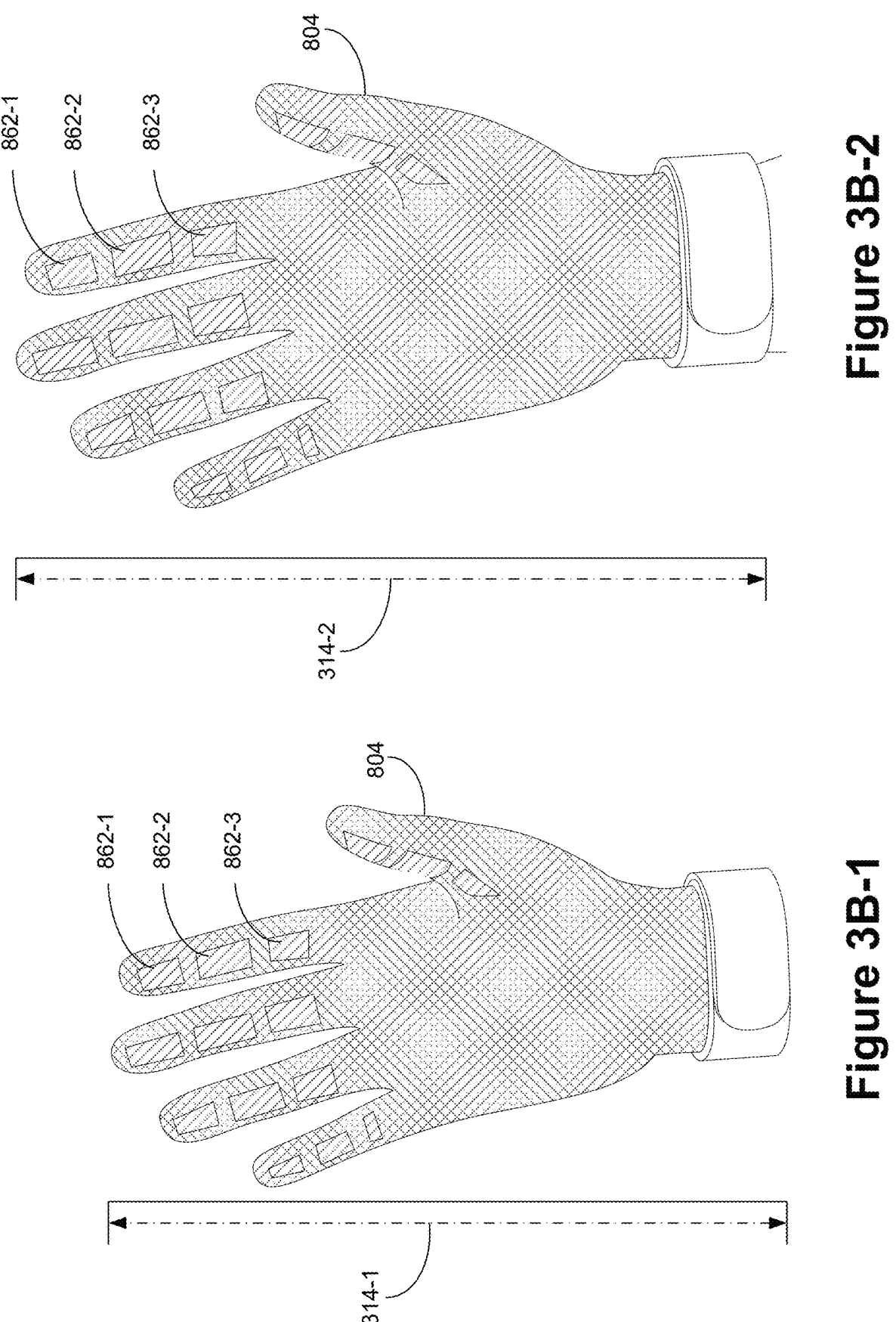
Figures 8A, 8B:
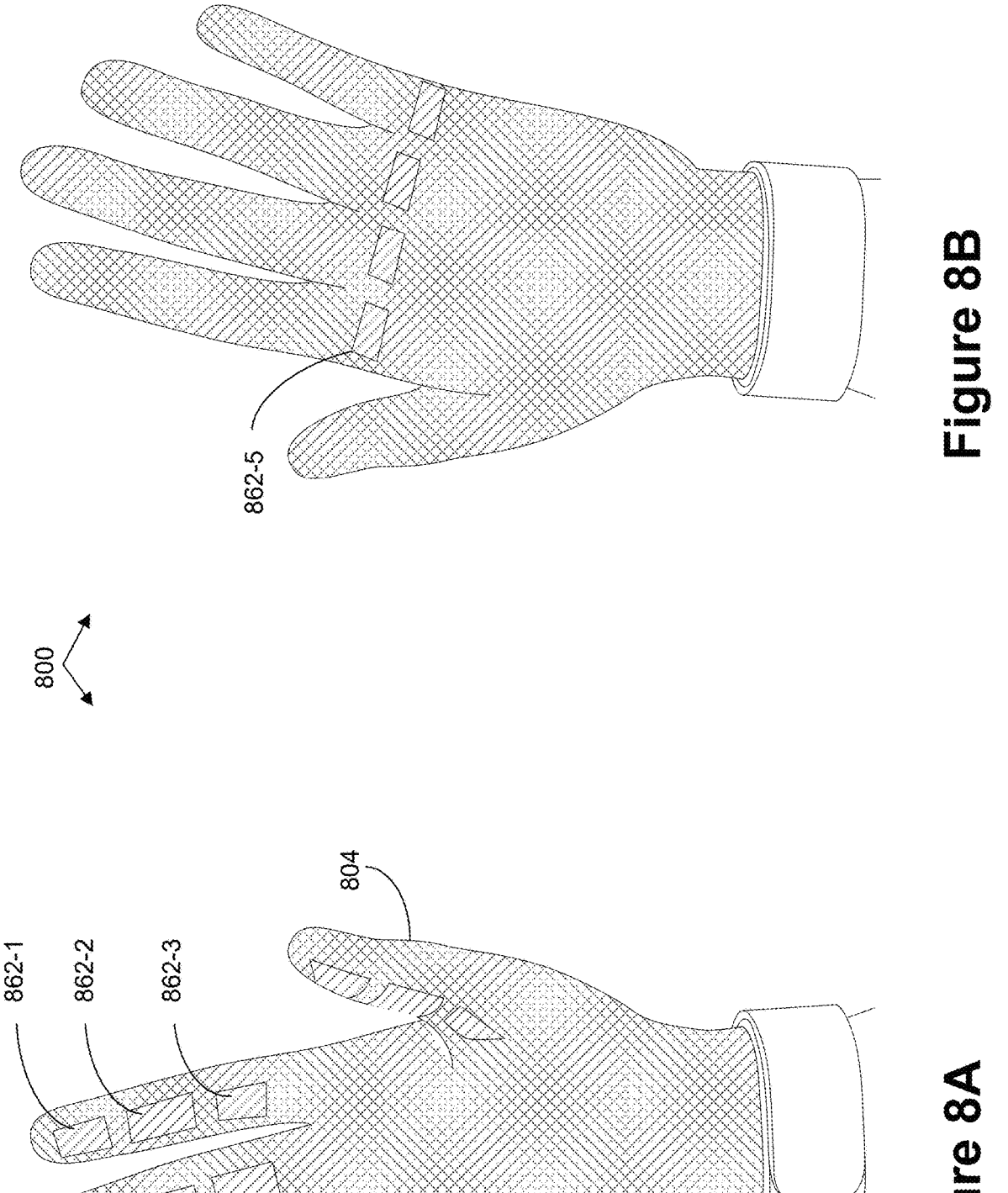
FIGS. 8A to 8C illustrate an example smart textile-based garment, in accordance with some embodiments.
Figure 8C:
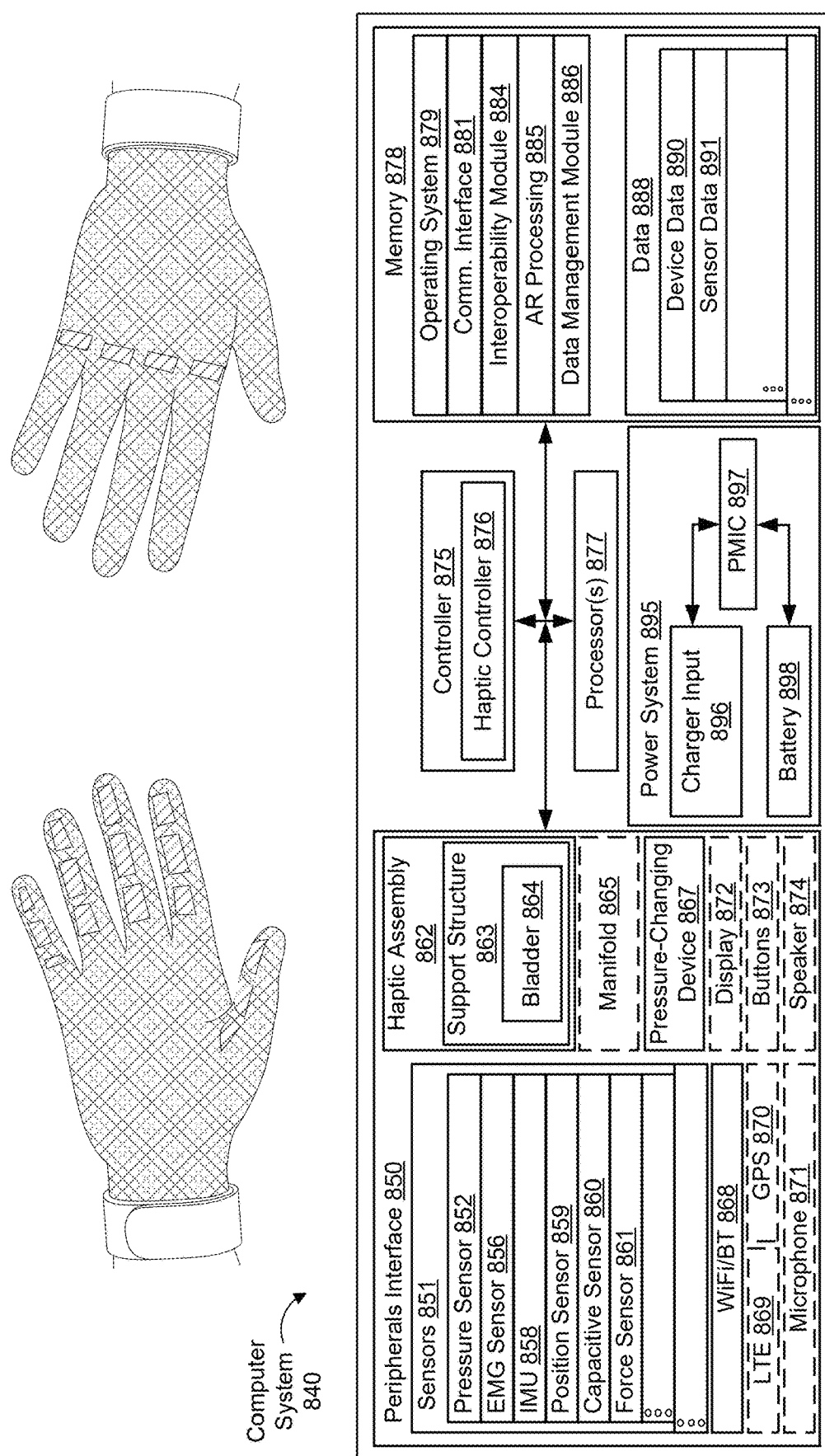

FIGS. 3B-1 and 3B-2 illustrate an example of the textile-based garment 800, as described in more detail with respect to FIGS. 8A to 8C. In some embodiments, the textile-based garment 800 has a first major dimension 314-1 (as shown in FIG. 3B-1), and a second major dimension 314-2 (as shown in FIG. 3B-2). The first and second major dimensions may correspond to respective stretched and unstretched configurations of the textile-based garment 800 (e.g., a first point in time when the textile-based garment 800 is not being worn, and a second point in time when the textile-based garment 800 is being worn). In some embodiments, the stretchable material including a biopotential-signal-sensing component having a substantially consistent impedance is disposed on a skin-contacting surface of the textile-based garment 800 (e.g., an inner surface of a portion of the skin-contacting surface that is facing respective fingers of the wearer).

Figures 1, 2, 3C:
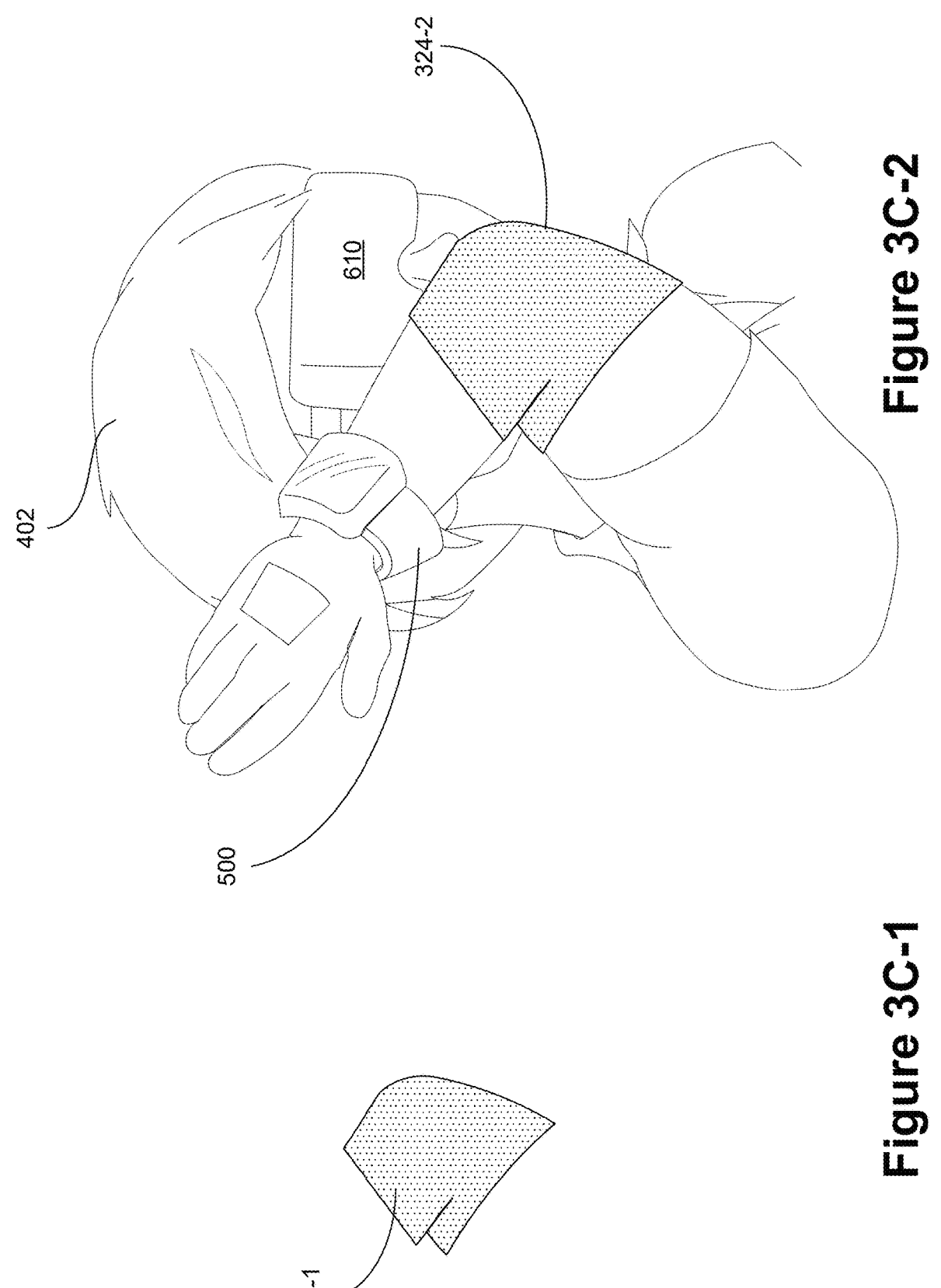

FIGS. 3C-1 and 3C-2 illustrate an arm sleeve 330 before and after being worn by the user 402. As shown by the respective dimensions 332 of a major dimension of the arm sleeve 330 before and after being worn by the user 402, the size of the sleeve changes as it is worn by the user 402. Similar to the strap of the head-wearable device shown in FIGS. 3A-1 and 3A-2, and the textile-based garment 800 shown in FIGS. 3B-1 to 3B-2, the arm sleeve 330 may have a first set of dimensions at a first time when it has a first size 324-1, and the arm sleeve 330 may have a second set of dimensions at a second when it has a second size 324-2.

Definitions Relevant to the Example Embodiments

The devices described above are further detailed below, including systems, wrist-wearable devices, headset devices, and smart textile-based garments. Specific operations described above may occur as a result of specific hardware, such hardware is described in further detail below. The devices described below are not limiting and features on these devices can be removed or additional features can be added to these devices. The different devices can include one or more analogous hardware components. For brevity, analogous devices and components are described below. Any differences in the devices and components are described below in their respective sections.

As described herein, a processor (e.g., a central processing unit (CPU) or microcontroller unit (MCU)), is an electronic component that is responsible for executing instructions and controlling the operation of an electronic device (e.g., a wrist-wearable device 500, a head-wearable device, an HIPD 700, a smart textile-based garment 800, or other computer system). There are several types of processors that may be used interchangeably or specifically required by embodiments described herein. For example, a processor may be (i) a general processor designed to perform a wide range of tasks, such as running software applications, managing operating systems, and performing arithmetic and logical operations; (ii) a microcontroller designed for specific tasks such as controlling electronic devices, sensors, and motors; (iii) a graphics processing unit (GPU) designed to accelerate the creation and rendering of images, videos, and animations (e.g., virtual-reality animations, such as three-dimensional modeling); (iv) a field-programmable gate array (FPGA) that can be programmed and reconfigured after manufacturing and/or customized to perform specific tasks, such as signal processing, cryptography, and machine learning; (v) a digital signal processor (DSP) designed to perform mathematical operations on signals such as audio, video, and radio waves. One of skill in the art will understand that one or more processors of one or more electronic devices may be used in various embodiments described herein.

As described herein, controllers are electronic components that manage and coordinate the operation of other components within an electronic device (e.g., controlling inputs, processing data, and/or generating outputs). Examples of controllers can include (i) microcontrollers, including small, low-power controllers that are commonly used in embedded systems and Internet of Things (IoT) devices; (ii) programmable logic controllers (PLCs) that may be configured to be used in industrial automation systems to control and monitor manufacturing processes; (iii) system-on-a-chip (SoC) controllers that integrate multiple components such as processors, memory, I/O interfaces, and other peripherals into a single chip; and/or DSPs. As described herein, a graphics module is a component or software module that is designed to handle graphical operations and/or processes, and can include a hardware module and/or a software module.

As described herein, memory refers to electronic components in a computer or electronic device that store data and instructions for the processor to access and manipulate. The devices described herein can include volatile and non-volatile memory. Examples of memory can include (i) random access memory (RAM), such as DRAM, SRAM, DDR RAM or other random access solid state memory devices, configured to store data and instructions temporarily; (ii) read-only memory (ROM) configured to store data and instructions permanently (e.g., one or more portions of system firmware and/or boot loaders); (iii) flash memory, magnetic disk storage devices, optical disk storage devices, other non-volatile solid state storage devices, which can be configured to store data in electronic devices (e.g., universal serial bus (USB) drives, memory cards, and/or solid-state drives (SSDs)); and (iv) cache memory configured to temporarily store frequently accessed data and instructions. Memory, as described herein, can include structured data (e.g., SQL databases, MongoDB databases, GraphQL data, or JSON data). Other examples of memory can include (i) profile data, including user account data, user settings, and/or other user data stored by the user; (ii) sensor data detected and/or otherwise obtained by one or more sensors; (iii) media content data including stored image data, audio data, documents, and the like; (iv) application data, which can include data collected and/or otherwise obtained and stored during use of an application; and/or any other types of data described herein.

As described herein, a power system of an electronic device is configured to convert incoming electrical power into a form that can be used to operate the device. A power system can include various components, including (i) a power source, which can be an alternating current (AC) adapter or a direct current (DC) adapter power supply; (ii) a charger input that can be configured to use a wired and/or wireless connection (which may be part of a peripheral interface, such as a USB, micro-USB interface, near-field magnetic coupling, magnetic inductive and magnetic resonance charging, and/or radio frequency (RF) charging); (iii) a power-management integrated circuit, configured to distribute power to various components of the device and ensure that the device operates within safe limits (e.g., regulating voltage, controlling current flow, and/or managing heat dissipation); and/or (iv) a battery configured to store power to provide usable power to components of one or more electronic devices.

As described herein, peripheral interfaces are electronic components (e.g., of electronic devices) that allow electronic devices to communicate with other devices or peripherals and can provide a means for input and output of data and signals. Examples of peripheral interfaces can include (i) USB and/or micro-USB interfaces configured for connecting devices to an electronic device; (ii) Bluetooth interfaces configured to allow devices to communicate with each other, including Bluetooth low energy (BLE); (iii) near-field communication (NFC) interfaces configured to be short-range wireless interfaces for operations such as access control; (iv) POGO pins, which may be small, spring-loaded pins configured to provide a charging interface; (v) wireless charging interfaces; (vi) global-position system (GPS) interfaces; (vii) Wi-Fi interfaces for providing a connection between a device and a wireless network; and (viii) sensor interfaces.

As described herein, sensors are electronic components (e.g., in and/or otherwise in electronic communication with electronic devices, such as wearable devices) configured to detect physical and environmental changes and generate electrical signals. Examples of sensors can include (i) imaging sensors for collecting imaging data (e.g., including one or more cameras disposed on a respective electronic device); (ii) biopotential-signal sensors; (iii) inertial measurement unit (e.g., IMUs) for detecting, for example, angular rate, force, magnetic field, and/or changes in acceleration; (iv) heart rate sensors for measuring a user's heart rate; (v) SpO2 sensors for measuring blood oxygen saturation and/or other biometric data of a user; (vi) capacitive sensors for detecting changes in potential at a portion of a user's body (e.g., a sensor-skin interface) and/or the proximity of other devices or objects; and (vii) light sensors (e.g., ToF sensors, infrared light sensors, or visible light sensors), and/or sensors for sensing data from the user or the user's environment. As described herein biopotential-signal-sensing components are devices used to measure electrical activity within the body (e.g., biopotential-signal sensors). Some types of biopotential-signal sensors include: (i) electroencephalography (EEG) sensors configured to measure electrical activity in the brain to diagnose neurological disorders; (ii) electrocardiography (ECG or EKG) sensors configured to measure electrical activity of the heart to diagnose heart problems; (iii) electromyography (EMG) sensors configured to measure the electrical activity of muscles and diagnose neuromuscular disorders; (iv) electrooculography (EOG) sensors configured to measure the electrical activity of eye muscles to detect eye movement and diagnose eye disorders.

As described herein, an application stored in memory of an electronic device (e.g., software) includes instructions stored in the memory. Examples of such applications include (i) games; (ii) word processors; (iii) messaging applications; (iv) media-streaming applications; (v) financial applications; (vi) calendars; (vii) clocks; (viii) web browsers; (ix) social media applications, (x) camera applications, (xi) web-based applications; (xii) health applications; (xiii) artificial-reality (AR) applications, and/or any other applications that can be stored in memory. The applications can operate in conjunction with data and/or one or more components of a device or communicatively coupled devices to perform one or more operations and/or functions.

As described herein, communication interface modules can include hardware and/or software capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, or MiWi), custom or standard wired protocols (e.g., Ethernet or HomePlug), and/or any other suitable communication protocol, including communication protocols not yet developed as of the filing date of this document. A communication interface is a mechanism that enables different systems or devices to exchange information and data with each other, including hardware, software, or a combination of both hardware and software. For example, a communication interface can refer to a physical connector and/or port on a device that enables communication with other devices (e.g., USB, Ethernet, HDMI, or Bluetooth). In some embodiments, a communication interface can refer to a software layer that enables different software programs to communicate with each other (e.g., application programming interfaces (APIs) and protocols such as HTTP and TCP/IP).

As described herein, a graphics module is a component or software module that is designed to handle graphical operations and/or processes, and can include a hardware module and/or a software module.

As described herein, non-transitory computer-readable storage media are physical devices or storage medium that can be used to store electronic data in a non-transitory form (e.g., such that the data is stored permanently until it is intentionally deleted or modified).

Example AR Systems 4A to 4D-2

Figure 4A:
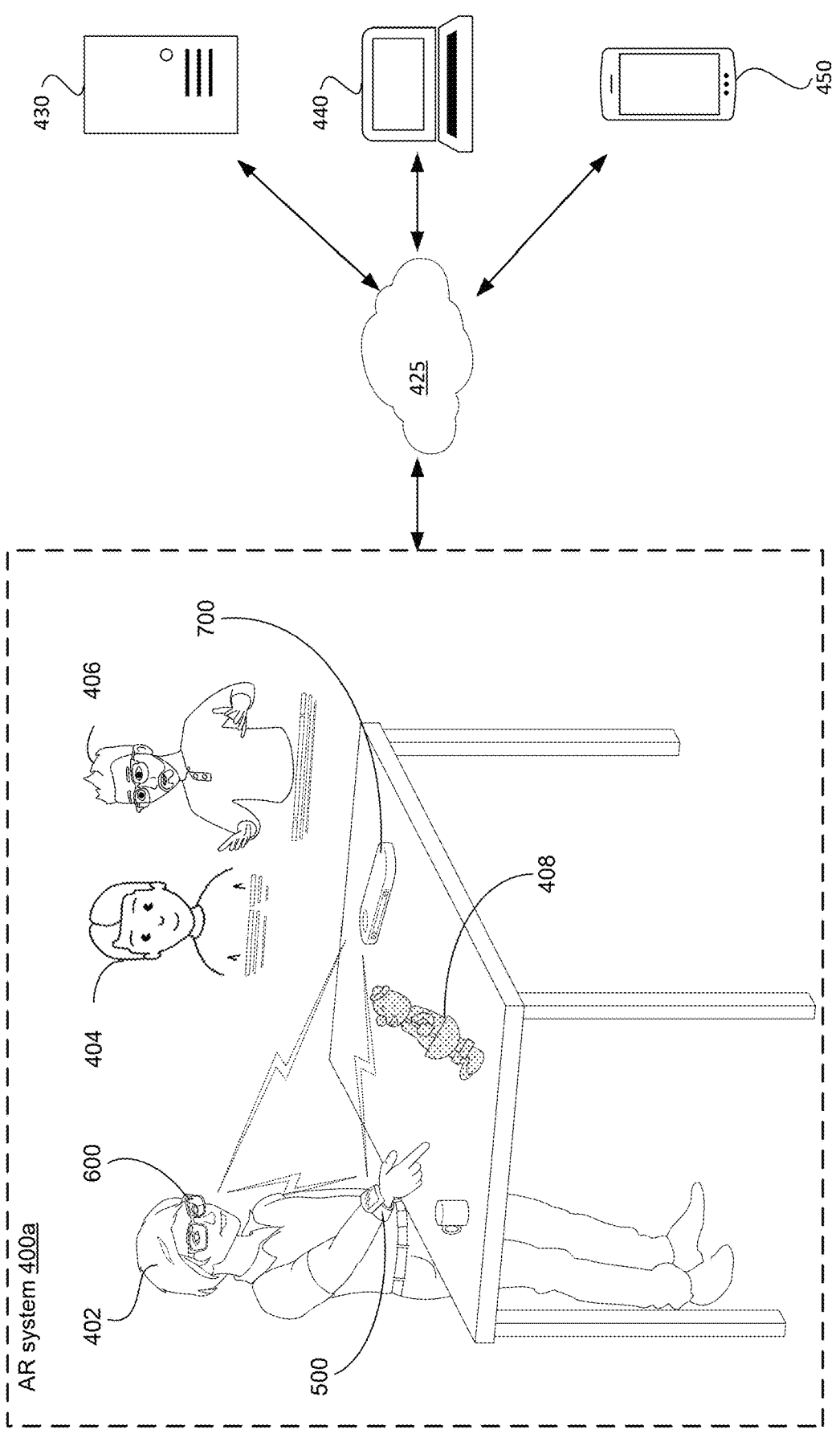
Figure 4B:
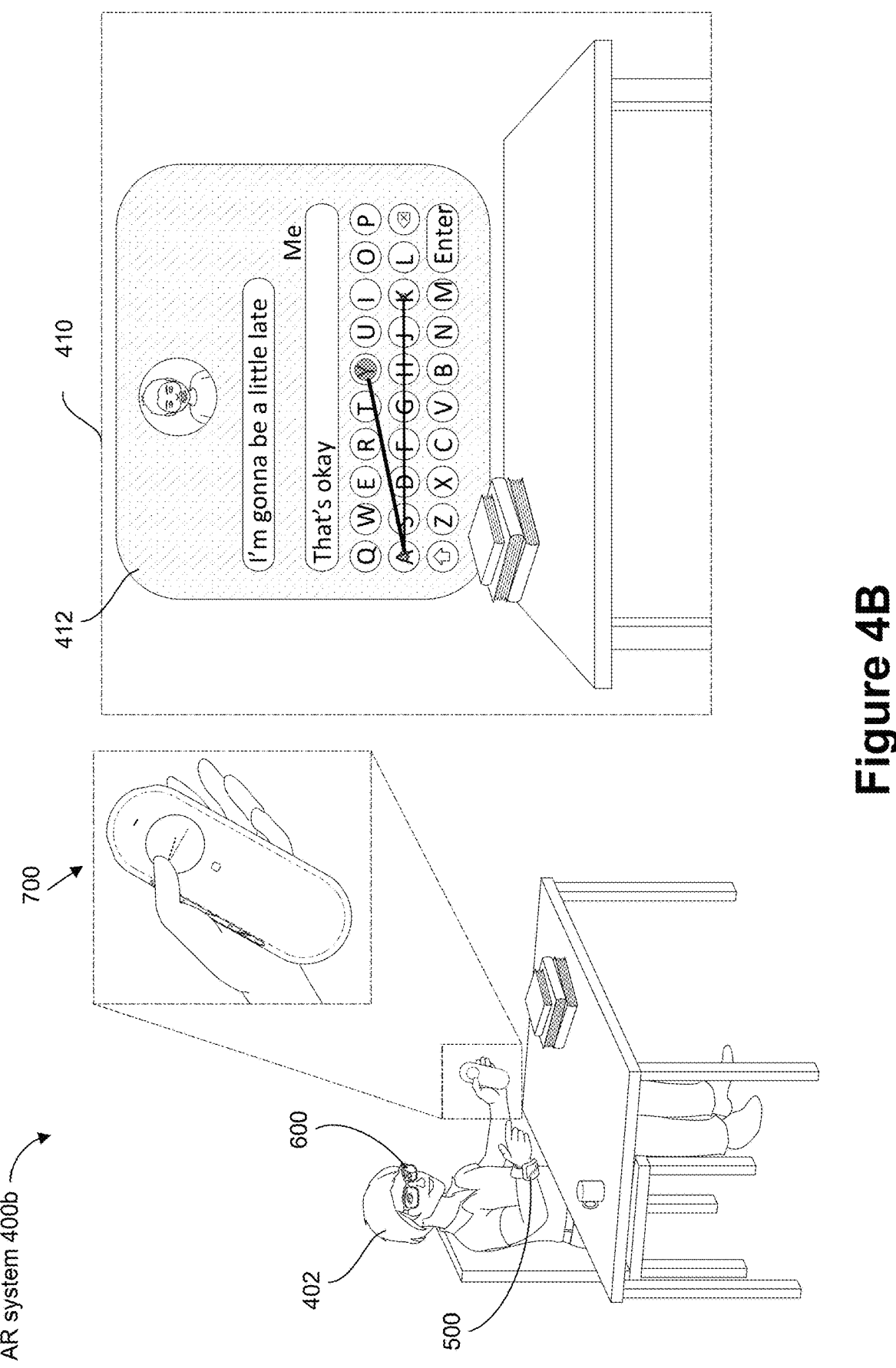
Figures 1, 4C:
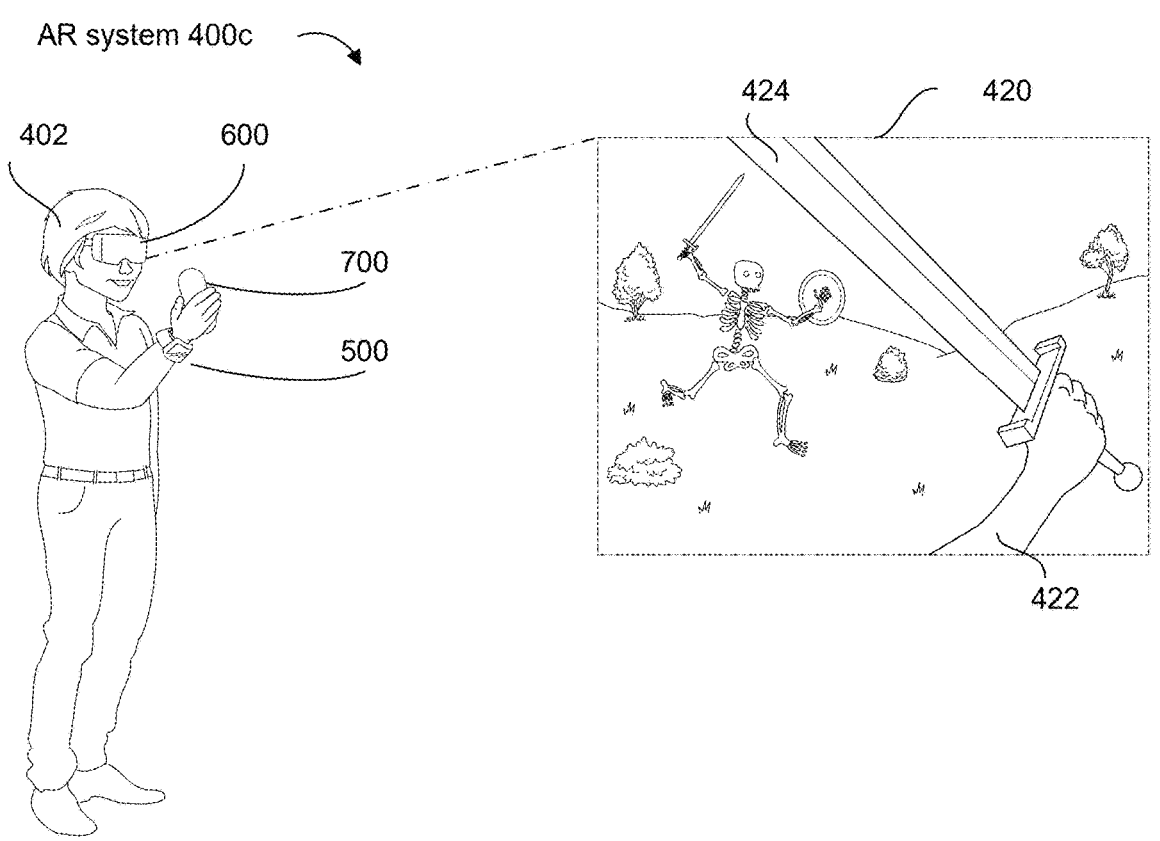
Figures 2, 4C:
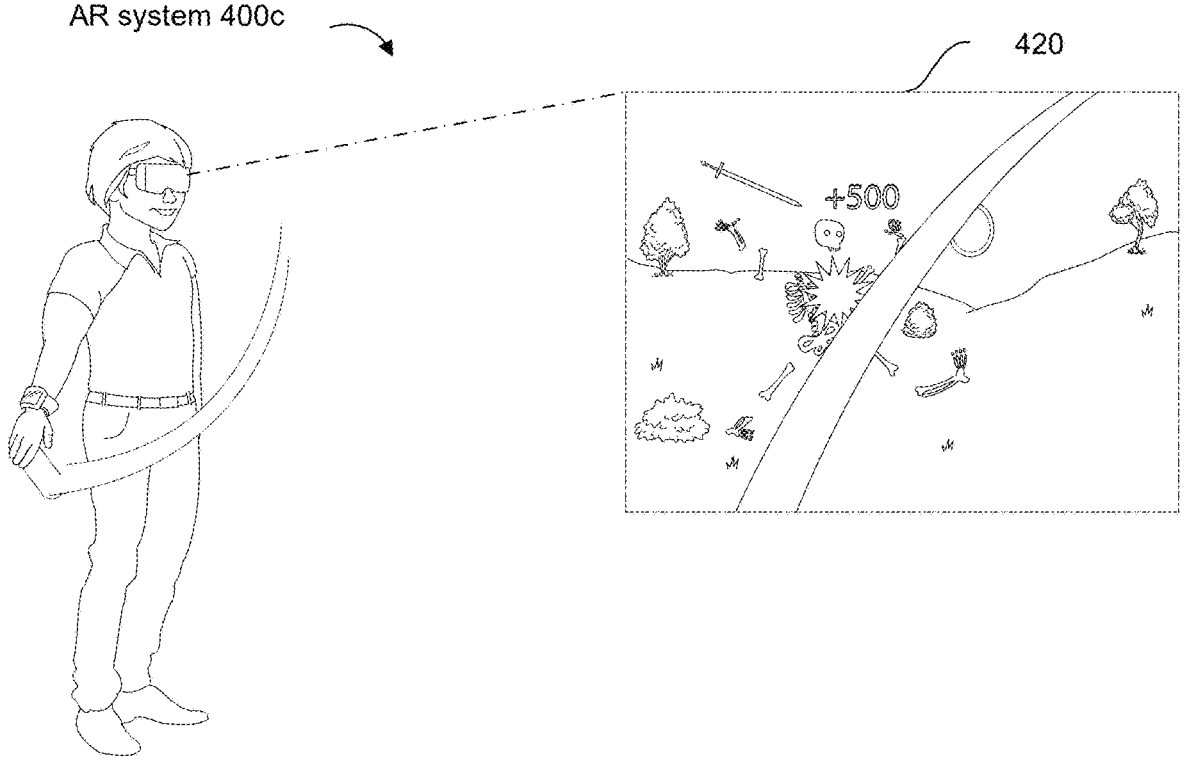
Figures 1, 4D:
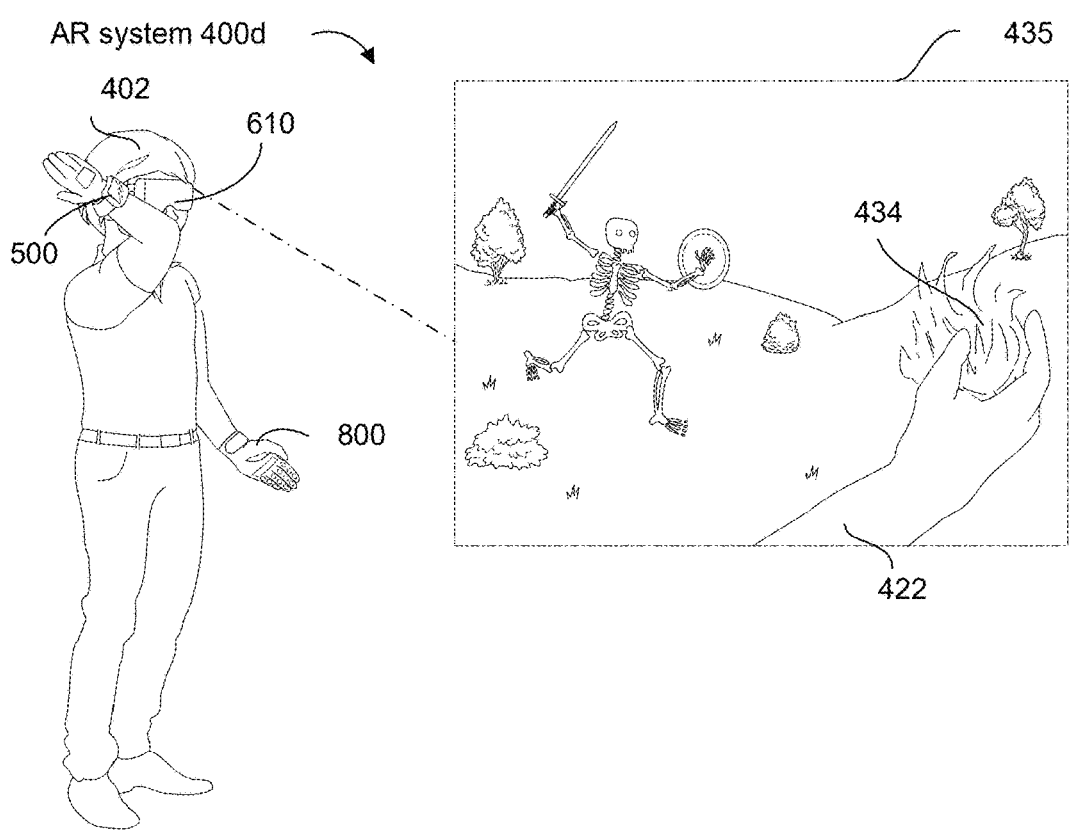
Figures 2, 4D:
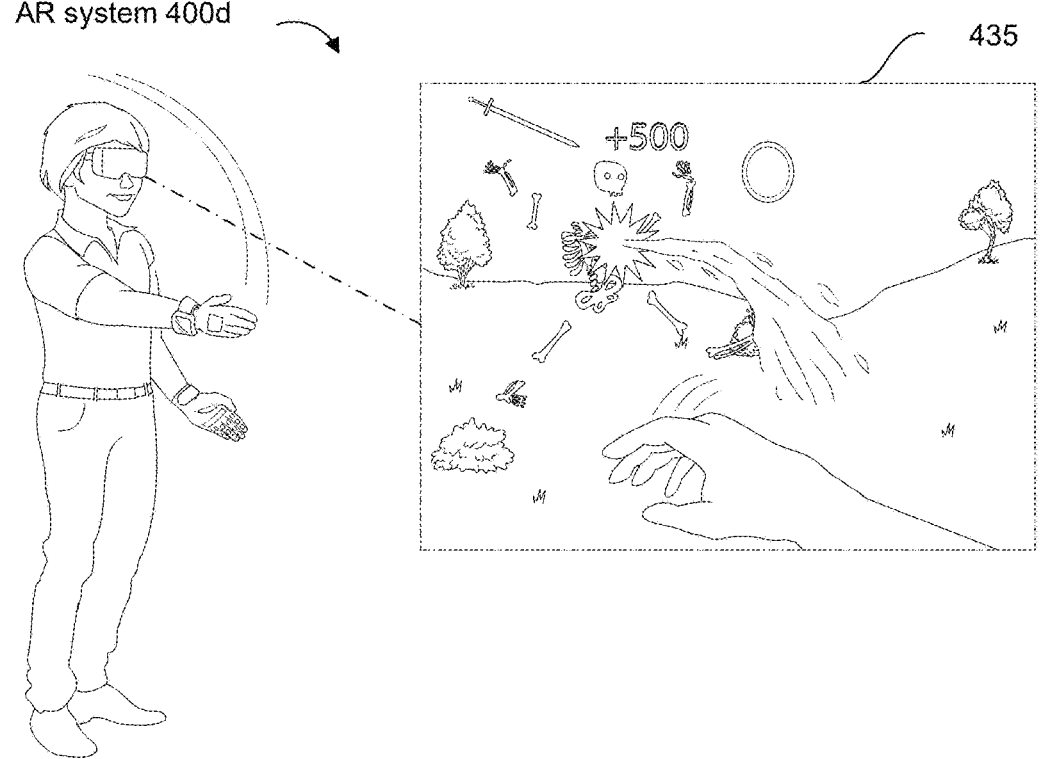

FIGS. 4A, 4B, 4C-1, 4C-2, 4D-1, and 4D-2 illustrate example AR systems, in accordance with some embodiments. FIG. 4A shows a first AR system 400a and first example user interactions using a wrist-wearable device 500, a head-wearable device (e.g., AR device 600), and/or a handheld intermediary processing device (HIPD) 700. FIG. 4B shows a second AR system 400b and second example user interactions using a wrist-wearable device 500, AR device 600, and/or an HIPD 700. FIGS. 4C-1 and 4C-2 show a third AR system 400c and third example user interactions using a wrist-wearable device 500, a head-wearable device (e.g., virtual-reality (VR) device 610), and/or an HIPD 700. FIGS. 4D-1 and 4D-2 show a fourth AR system 400d and fourth example user interactions using a wrist-wearable device 500, VR device 610, and/or a smart textile-based garment 800 (e.g., wearable gloves, haptic gloves). As the skilled artisan will appreciate upon reading the descriptions provided herein, the above-example AR systems (described in detail below) can perform various functions and/or operations described above with reference to FIGS. 1A to 2B.

The wrist-wearable device 500 and its constituent components are described below in reference to FIGS. 5A-5B, the head-wearable devices and their constituent components are described below in reference to FIGS. 6A-6D, and the HIPD 700 and its constituent components are described below in reference to FIGS. 7A-7B. The smart textile-based garment 800 and its one or more components are described below in reference to FIGS. 8A-8C. The wrist-wearable device 500, the head-wearable devices, and/or the HIPD 700 can communicatively couple via a network 425 (e.g., cellular, near field, Wi-Fi, personal area network, or wireless LAN). Additionally, the wrist-wearable device 500, the head-wearable devices, and/or the HIPD 700 can also communicatively couple with one or more servers 430, computers 440 (e.g., laptops or computers), mobile devices 450 (e.g., smartphones or tablets), and/or other electronic devices via the network 425 (e.g., cellular, near field, Wi-Fi, personal area network, or wireless LAN). Similarly, the smart textile-based garment 800, when used, can also communicatively couple with the wrist-wearable device 500, the head-wearable devices, the HIPD 700, the one or more servers 430, the computers 440, the mobile devices 450, and/or other electronic devices via the network 425.

Turning to FIG. 4A, a user 402 is shown wearing the wrist-wearable device 500 and the AR device 600, and having the HIPD 700 on their desk. The wrist-wearable device 500, the AR device 600, and the HIPD 700 facilitate user interaction with an AR environment. In particular, as shown by the first AR system 400a, the wrist-wearable device 500, the AR device 600, and/or the HIPD 700 cause presentation of one or more avatars 404, digital representations of contacts 406, and virtual objects 408. As discussed below, the user 402 can interact with the one or more avatars 404, digital representations of the contacts 406, and virtual objects 408 via the wrist-wearable device 500, the AR device 600, and/or the HIPD 700.

The user 402 can use any of the wrist-wearable device 500, the AR device 600, and/or the HIPD 700 to provide user inputs. For example, the user 402 can perform one or more hand gestures that are detected by the wrist-wearable device 500 (e.g., using one or more EMG sensors and/or IMUs, described below in reference to FIGS. 5A-5B) and/or AR device 600 (e.g., using one or more image sensors or cameras, described below in reference to FIGS. 6A-6B) to provide a user input. Alternatively, or additionally, the user 402 can provide a user input via one or more touch surfaces of the wrist-wearable device 500, the AR device 600, and/or the HIPD 700, and/or voice commands captured by a microphone of the wrist-wearable device 500, the AR device 600, and/or the HIPD 700. In some embodiments, the wrist-wearable device 500, the AR device 600, and/or the HIPD 700 include a digital assistant to help the user in providing a user input (e.g., completing a sequence of operations, suggesting different operations or commands, providing reminders, or confirming a command). In some embodiments, the user 402 can provide a user input via one or more facial gestures and/or facial expressions. For example, cameras of the wrist-wearable device 500, the AR device 600, and/or the HIPD 700 can track the user 402's eyes for navigating a user interface.

The wrist-wearable device 500, the AR device 600, and/or the HIPD 700 can operate alone or in conjunction to allow the user 402 to interact with the AR environment. In some embodiments, the HIPD 700 is configured to operate as a central hub or control center for the wrist-wearable device 500, the AR device 600, and/or another communicatively coupled device. For example, the user 402 can provide an input to interact with the AR environment at any of the wrist-wearable device 500, the AR device 600, and/or the HIPD 700, and the HIPD 700 can identify one or more back-end and front-end tasks to cause the performance of the requested interaction and distribute instructions to cause the performance of the one or more back-end and front-end tasks at the wrist-wearable device 500, the AR device 600, and/or the HIPD 700. In some embodiments, a back-end task is a background-processing task that is not perceptible by the user (e.g., rendering content, decompression, or compression), and a front-end task is a user-facing task that is perceptible to the user (e.g., presenting information to the user or providing feedback to the user). As described below in reference to FIGS. 7A-7B, the HIPD 700 can perform the back-end tasks and provide the wrist-wearable device 500 and/or the AR device 600 operational data corresponding to the performed back-end tasks such that the wrist-wearable device 500 and/or the AR device 600 can perform the front-end tasks. In this way, the HIPD 700, which has more computational resources and greater thermal headroom than the wrist-wearable device 500 and/or the AR device 600, performs computationally intensive tasks and reduces the computer resource utilization and/or power usage of the wrist-wearable device 500 and/or the AR device 600.

In the example shown by the first AR system 400a, the HIPD 700 identifies one or more back-end tasks and front-end tasks associated with a user request to initiate an AR video call with one or more other users (represented by the avatar 404 and the digital representation of the contact 406) and distributes instructions to cause the performance of the one or more back-end tasks and front-end tasks. In particular, the HIPD 700 performs back-end tasks for processing and/or rendering image data (and other data) associated with the AR video call and provides operational data associated with the performed back-end tasks to the AR device 600 such that the AR device 600 performs front-end tasks for presenting the AR video call (e.g., presenting the avatar 404 and the digital representation of the contact 406).

In some embodiments, the HIPD 700 can operate as a focal or anchor point for causing the presentation of information. This allows the user 402 to be generally aware of where information is presented. For example, as shown in the first AR system 400a, the avatar 404 and the digital representation of the contact 406 are presented above the HIPD 700. In particular, the HIPD 700 and the AR device 600 operate in conjunction to determine a location for presenting the avatar 404 and the digital representation of the contact 406. In some embodiments, information can be presented within a predetermined distance from the HIPD 700 (e.g., within five meters). For example, as shown in the first AR system 400a, virtual object 408 is presented on the desk some distance from the HIPD 700. Similar to the above example, the HIPD 700 and the AR device 600 can operate in conjunction to determine a location for presenting the virtual object 408. Alternatively, in some embodiments, presentation of information is not bound by the HIPD 700. More specifically, the avatar 404, the digital representation of the contact 406, and the virtual object 408 do not have to be presented within a predetermined distance of the HIPD 700.

User inputs provided at the wrist-wearable device 500, the AR device 600, and/or the HIPD 700 are coordinated such that the user can use any device to initiate, continue, and/or complete an operation. For example, the user 402 can provide a user input to the AR device 600 to cause the AR device 600 to present the virtual object 408 and, while the virtual object 408 is presented by the AR device 600, the user 402 can provide one or more hand gestures via the wrist-wearable device 500 to interact and/or manipulate the virtual object 408.

FIG. 4B shows the user 402 wearing the wrist-wearable device 500 and the AR device 600, and holding the HIPD 700. In the second AR system 400b, the wrist-wearable device 500, the AR device 600, and/or the HIPD 700 are used to receive and/or provide one or more messages to a contact of the user 402. In particular, the wrist-wearable device 500, the AR device 600, and/or the HIPD 700 detect and coordinate one or more user inputs to initiate a messaging application and prepare a response to a received message via the messaging application.

In some embodiments, the user 402 initiates, via a user input, an application on the wrist-wearable device 500, the AR device 600, and/or the HIPD 700 that causes the application to initiate on at least one device. For example, in the second AR system 400b, the user 402 performs a hand gesture associated with a command for initiating a messaging application (represented by messaging user interface 412), the wrist-wearable device 500 detects the hand gesture, and, based on a determination that the user 402 is wearing AR device 600, causes the AR device 600 to present a messaging user interface 412 of the messaging application. The AR device 600 can present the messaging user interface 412 to the user 402 via its display (e.g., as shown by user 402's field of view 410). In some embodiments, the application is initiated and can be run on the device (e.g., the wrist-wearable device 500, the AR device 600, and/or the HIPD 700) that detects the user input to initiate the application, and the device provides another device operational data to cause the presentation of the messaging application. For example, the wrist-wearable device 500 can detect the user input to initiate a messaging application, initiate and run the messaging application, and provide operational data to the AR device 600 and/or the HIPD 700 to cause presentation of the messaging application. Alternatively, the application can be initiated and run at a device other than the device that detected the user input. For example, the wrist-wearable device 500 can detect the hand gesture associated with initiating the messaging application and cause the HIPD 700 to run the messaging application and coordinate the presentation of the messaging application.

Further, the user 402 can provide a user input provided at the wrist-wearable device 500, the AR device 600, and/or the HIPD 700 to continue and/or complete an operation initiated at another device. For example, after initiating the messaging application via the wrist-wearable device 500 and while the AR device 600 presents the messaging user interface 412, the user 402 can provide an input at the HIPD 700 to prepare a response (e.g., shown by the swipe gesture performed on the HIPD 700). The user 402's gestures performed on the HIPD 700 can be provided and/or displayed on another device. For example, the user 402's swipe gestures performed on the HIPD 700 are displayed on a virtual keyboard of the messaging user interface 412 displayed by the AR device 600.

In some embodiments, the wrist-wearable device 500, the AR device 600, the HIPD 700, and/or other communicatively coupled devices can present one or more notifications to the user 402. The notification can be an indication of a new message, an incoming call, an application update, a status update, etc. The user 402 can select the notification via the wrist-wearable device 500, the AR device 600, or the HIPD 700 and cause presentation of an application or operation associated with the notification on at least one device. For example, the user 402 can receive a notification that a message was received at the wrist-wearable device 500, the AR device 600, the HIPD 700, and/or other communicatively coupled device and provide a user input at the wrist-wearable device 500, the AR device 600, and/or the HIPD 700 to review the notification, and the device detecting the user input can cause an application associated with the notification to be initiated and/or presented at the wrist-wearable device 500, the AR device 600, and/or the HIPD 700.

While the above example describes coordinated inputs used to interact with a messaging application, the skilled artisan will appreciate upon reading the descriptions that user inputs can be coordinated to interact with any number of applications including, but not limited to, gaming applications, social media applications, camera applications, web-based applications, financial applications, etc. For example, the AR device 600 can present to the user 402 game application data and the HIPD 700 can use a controller to provide inputs to the game. Similarly, the user 402 can use the wrist-wearable device 500 to initiate a camera of the AR device 600, and the user can use the wrist-wearable device 500, the AR device 600, and/or the HIPD 700 to manipulate the image capture (e.g., zoom in or out or apply filters) and capture image data.

Turning to FIGS. 4C-1 and 4C-2, the user 402 is shown wearing the wrist-wearable device 500 and a VR device 610, and holding the HIPD 700. In the third AR system 400c, the wrist-wearable device 500, the VR device 610, and/or the HIPD 700 are used to interact within an AR environment, such as a VR game or other AR application. While the VR device 610 presents a representation of a VR game (e.g., first AR game environment 420) to the user 402, the wrist-wearable device 500, the VR device 610, and/or the HIPD 700 detect and coordinate one or more user inputs to allow the user 402 to interact with the VR game.

In some embodiments, the user 402 can provide a user input via the wrist-wearable device 500, the VR device 610, and/or the HIPD 700 that causes an action in a corresponding AR environment. For example, the user 402 in the third AR system 400c (shown in FIG. 4C-1) raises the HIPD 700 to prepare for a swing in the first AR game environment 420. The VR device 610, responsive to the user 402 raising the HIPD 700, causes the AR representation 422 of the user 402 to perform a similar action (e.g., raise a virtual object, such as a virtual sword 424). In some embodiments, each device uses respective sensor data and/or image data to detect the user input and provide an accurate representation of the user 402's motion. For example, imaging sensors 754 (e.g., SLAM cameras or other cameras discussed below in FIGS. 7A and 7B) of the HIPD 700 can be used to detect a position of the 700 relative to the user 402's body such that the virtual object can be positioned appropriately within the first AR game environment 420; sensor data from the wrist-wearable device 500 can be used to detect a velocity at which the user 402 raises the HIPD 700 such that the AR representation 422 of the user 402 and the virtual sword 424 are synchronized with the user 402's movements; and image sensors 626 (FIGS. 6A-6C) of the VR device 610 can be used to represent the user 402's body, boundary conditions, or real-world objects within the first AR game environment 420.

In FIG. 4C-2, the user 402 performs a downward swing while holding the HIPD 700. The user 402's downward swing is detected by the wrist-wearable device 500, the VR device 610, and/or the HIPD 700 and a corresponding action is performed in the first AR game environment 420. In some embodiments, the data captured by each device is used to improve the user's experience within the AR environment. For example, sensor data of the wrist-wearable device 500 can be used to determine a speed and/or force at which the downward swing is performed and image sensors of the HIPD 700 and/or the VR device 610 can be used to determine a location of the swing and how it should be represented in the first AR game environment 420, which, in turn, can be used as inputs for the AR environment (e.g., game mechanics, which can use detected speed, force, locations, and/or aspects of the user 402's actions to classify a user's inputs (e.g., user performs a light strike, hard strike, critical strike, glancing strike, miss) or calculate an output (e.g., amount of damage)).

While the wrist-wearable device 500, the VR device 610, and/or the HIPD 700 are described as detecting user inputs, in some embodiments, user inputs are detected at a single device (with the single device being responsible for distributing signals to the other devices for performing the user input). For example, the HIPD 700 can operate an application for generating the first AR game environment 420 and provide the VR device 610 with corresponding data for causing the presentation of the first AR game environment 420, as well as detect the 402's movements (while holding the HIPD 700) to cause the performance of corresponding actions within the first AR game environment 420. Additionally, or alternatively, in some embodiments, operational data (e.g., sensor data, image data, application data, device data, and/or other data) of one or more devices is provide to a single device (e.g., the HIPD 700) to process the operational data and cause respective devices to perform an action associated with processed operational data.

In FIGS. 4D-1 and 4D-2, the user 402 is shown wearing the wrist-wearable device 500, the VR device 610, and smart textile-based garments 800. In the fourth AR system 400d, the wrist-wearable device 500, the VR device 610, and/or the smart textile-based garments 800 are used to interact within an AR environment (e.g., any AR system described above in reference to FIGS. 4A-4C-2). While the VR device 610 presents a representation of a VR game (e.g., second AR game environment 435) to the user 402, the wrist-wearable device 500, the VR device 610, and/or the smart textile-based garments 800 detect and coordinate one or more user inputs to allow the user 402 to interact with the AR environment.

In some embodiments, the user 402 can provide a user input via the wrist-wearable device 500, the VR device 610, and/or the smart textile-based garments 800 that causes an action in a corresponding AR environment. For example, the user 402 in the fourth AR system 400d (shown in FIG. 4D-1) raises a hand wearing the smart textile-based garments 800 to prepare to cast a spell or throw an object within the second AR game environment 435. The VR device 610, responsive to the user 402 holding up their hand (wearing smart textile-based garments 800), causes the AR representation 422 of the user 402 to perform a similar action (e.g., hold a virtual object or throw a fireball 434). In some embodiments, each device uses respective sensor data and/or image data to detect the user input and provides an accurate representation of the user 402's motion.

In FIG. 4D-2, the user 402 performs a throwing motion while wearing the smart textile-based garment 800. The user 402's throwing motion is detected by the wrist-wearable device 500, the VR device 610, and/or the smart textile-based garments 800, and a corresponding action is performed in the second AR game environment 435. As described above, the data captured by each device is used to improve the user's experience within the AR environment. Although not shown, the smart textile-based garments 800 can be used in conjunction with an AR device 610 and/or an HIPD 700.

Having discussed example AR systems, devices for interacting with such AR systems, and other computing systems more generally, devices and components will now be discussed in greater detail below. Some definitions of devices and components that can be included in some or all of the example devices discussed below are defined here for ease of reference. A skilled artisan will appreciate that certain types of the components described below may be more suitable for a particular set of devices and less suitable for a different set of devices. But subsequent references to the components defined here should be considered to be encompassed by the definitions provided.

In some embodiments discussed below, example devices and systems, including electronic devices and systems, will be discussed. Such example devices and systems are not intended to be limiting, and one of skill in the art will understand that alternative devices and systems to the example devices and systems described herein may be used to perform the operations and construct the systems and devices that are described herein.

As described herein, an electronic device is a device that uses electrical energy to perform a specific function. It can be any physical object that contains electronic components such as transistors, resistors, capacitors, diodes, and integrated circuits. Examples of electronic devices include smartphones, laptops, digital cameras, televisions, gaming consoles, and music players, as well as the example electronic devices discussed herein. As described herein, an intermediary electronic device is a device that sits between two other electronic devices and/or a subset of components of one or more electronic devices, which facilitates communication, and/or data processing, and/or data transfer between the respective electronic devices and/or electronic components.

Example Wrist-Wearable Devices

Figure 5A:
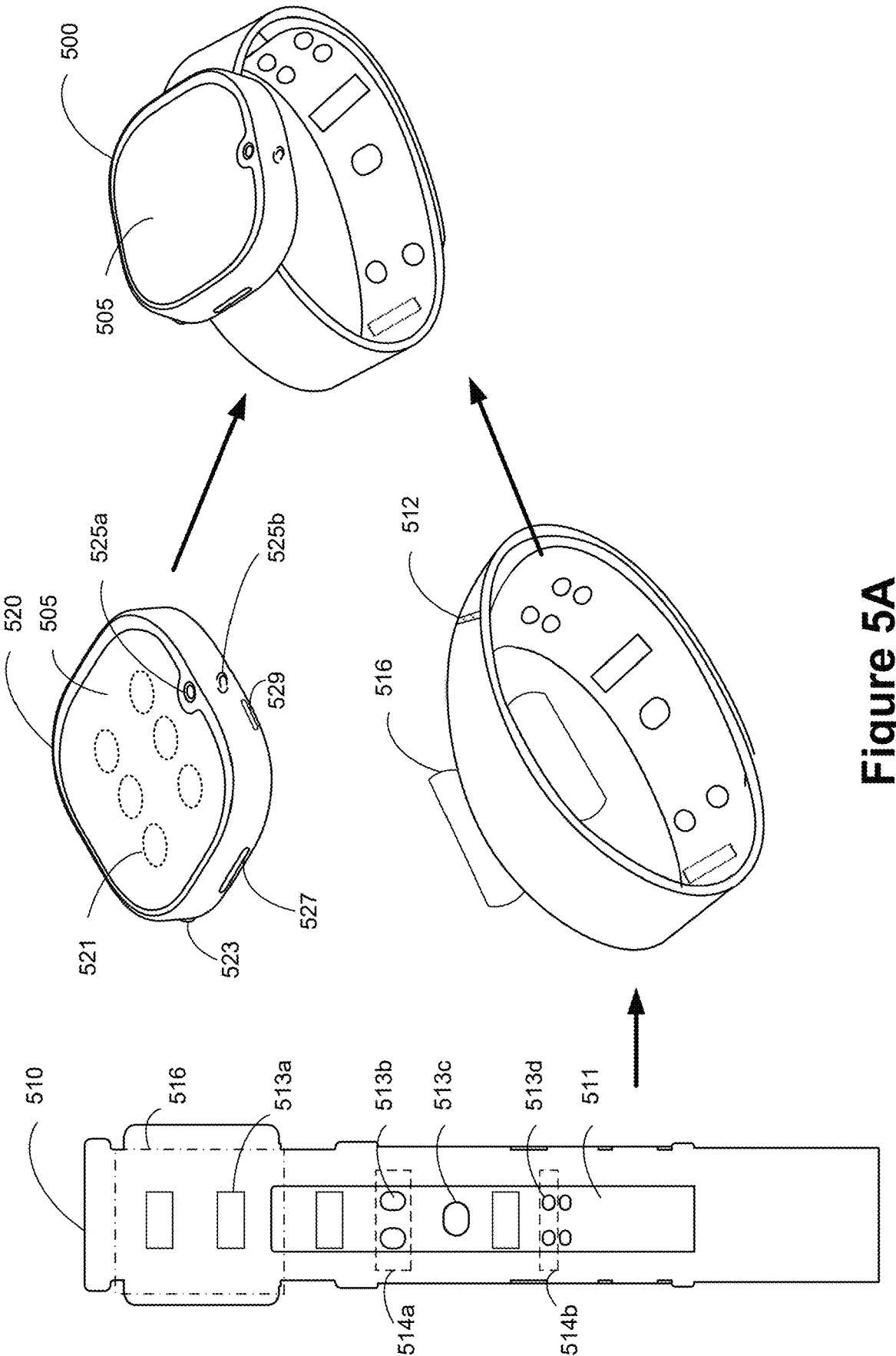
FIGS. 5A and 5B illustrate an example wrist-wearable device, in accordance with some embodiments.
Figure 5B:
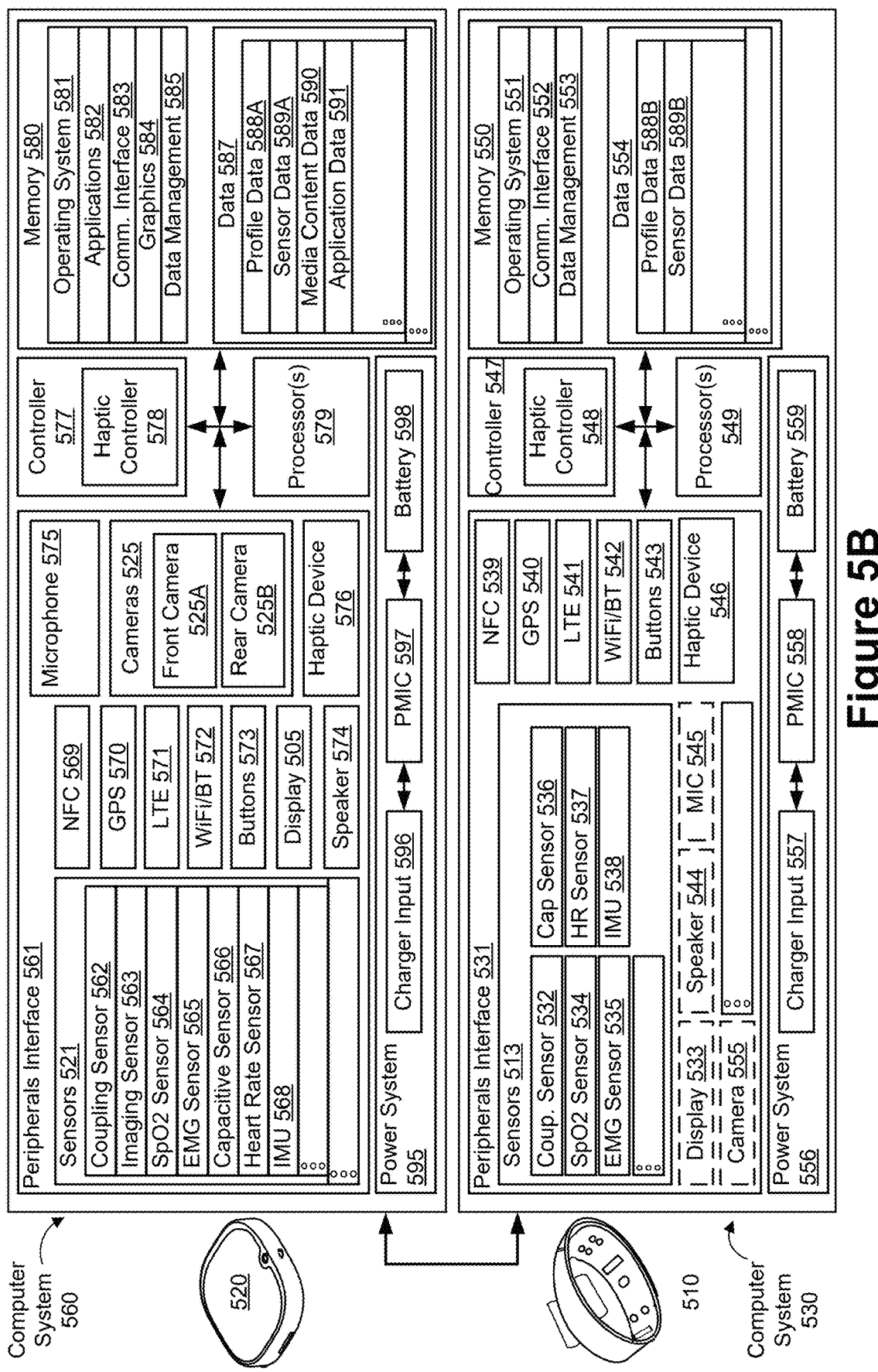

FIGS. 5A and 5B illustrate an example wrist-wearable device 500, in accordance with some embodiments. The wrist-wearable device 500 is an instance of the wearable device described in reference to FIGS. 1A to 2B herein, such that the wrist-wearable device should be understood to have the features of the wrist-wearable device 500 and vice versa. FIG. 5A illustrates components of the wrist-wearable device 500, which can be used individually or in combination, including combinations that include other electronic devices and/or electronic components.

FIG. 5A shows a wearable band 510 and a watch body 520 (or capsule) being coupled, as discussed below, to form the wrist-wearable device 500. The wrist-wearable device 500 can perform various functions and/or operations associated with navigating through user interfaces and selectively opening applications.

As will be described in more detail below, operations executed by the wrist-wearable device 500 can include (i) presenting content to a user (e.g., displaying visual content via a display 505); (ii) detecting (e.g., sensing) user input (e.g., sensing a touch on peripheral button 523 and/or at a touch screen of the display 505, a hand gesture detected by sensors (e.g., biopotential sensors)); (iii) sensing biometric data via one or more sensors 513 (e.g., neuromuscular signals, heart rate, temperature, or sleep); messaging (e.g., text, speech, or video); image capture via one or more imaging devices or cameras 525; wireless communications (e.g., cellular, near field, Wi-Fi, or personal area network); location determination; financial transactions; providing haptic feedback; alarms; notifications; biometric authentication; health monitoring; and/or sleep monitoring.

The above-example functions can be executed independently in the watch body 520, independently in the wearable band 510, and/or via an electronic communication between the watch body 520 and the wearable band 510. In some embodiments, functions can be executed on the wrist-wearable device 500 while an AR environment is being presented (e.g., via one of the AR systems 400a to 400d). As the skilled artisan will appreciate upon reading the descriptions provided herein, the novel wearable devices described herein can be used with other types of AR environments.

The wearable band 510 can be configured to be worn by a user such that an inner (or inside) surface of the wearable structure 511 of the wearable band 510 is in contact with the user's skin. When worn by a user, sensors 513 contact the user's skin. The sensors 513 can sense biometric data such as a user's heart rate, saturated oxygen level, temperature, sweat level, neuromuscular-signal sensors, or a combination thereof. The sensors 513 can also sense data about a user's environment, including a user's motion, altitude, location, orientation, gait, acceleration, position, or a combination thereof. In some embodiments, the sensors 513 are configured to track a position and/or motion of the wearable band 510. The one or more sensors 513 can include any of the sensors defined above and/or discussed below with respect to FIG. 5B.

The one or more sensors 513 can be distributed on an inside and/or an outside surface of the wearable band 510. In some embodiments, the one or more sensors 513 are uniformly spaced along the wearable band 510. Alternatively, in some embodiments, the one or more sensors 513 are positioned at distinct points along the wearable band 510. As shown in FIG. 5A, the one or more sensors 513 can be the same or distinct. For example, in some embodiments, the one or more sensors 513 can be shaped as a pill (e.g., sensor 513a), an oval, a circle a square, an oblong (e.g., sensor 513c), and/or any other shape that maintains contact with the user's skin (e.g., such that neuromuscular signal and/or other biometric data can be accurately measured at the user's skin). In some embodiments, the one or more sensors 513 are aligned to form pairs of sensors (e.g., for sensing neuromuscular signals based on differential sensing within each respective sensor). For example, sensor 513b is aligned with an adjacent sensor to form sensor pair 514a, and sensor 513d is aligned with an adjacent sensor to form sensor pair 514b. In some embodiments, the wearable band 510 does not have a sensor pair. Alternatively, in some embodiments, the wearable band 510 has a predetermined number of sensor pairs (one pair of sensors, three pairs of sensors, four pairs of sensors, six pairs of sensors, or sixteen pairs of sensors).

The wearable band 510 can include any suitable number of sensors 513. In some embodiments, the amount, and arrangements of sensors 513 depend on the particular application for which the wearable band 510 is used. For instance, a wearable band 510 configured as an armband, wristband, or chest-band may include a plurality of sensors 513 with a different number of sensors 513 and different arrangement for each use case, such as medical use cases, compared to gaming or general day-to-day use cases.

In accordance with some embodiments, the wearable band 510 further includes an electrical ground electrode and a shielding electrode. The electrical ground and shielding electrodes, like the sensors 513, can be distributed on the inside surface of the wearable band 510 such that they contact a portion of the user's skin. For example, the electrical ground and shielding electrodes can be at an inside surface of coupling mechanism 516 or an inside surface of a wearable structure 511. The electrical ground and shielding electrodes can be formed and/or use the same components as the sensors 513. In some embodiments, the wearable band 510 includes more than one electrical ground electrode and more than one shielding electrode.

The sensors 513 can be formed as part of the wearable structure 511 of the wearable band 510. In some embodiments, the sensors 513 are flush or substantially flush with the wearable structure 511 such that they do not extend beyond the surface of the wearable structure 511. While flush with the wearable structure 511, the sensors 513 are still configured to contact the user's skin (e.g., via a skin-contacting surface). Alternatively, in some embodiments, the sensors 513 extend beyond the wearable structure 511 a predetermined distance (e.g., 0.1 mm to 2 mm) to make contact and depress into the user's skin. In some embodiments, the sensors 513 are coupled to an actuator (not shown) configured to adjust an extension height (e.g., a distance from the surface of the wearable structure 511) of the sensors 513 such that the sensors 513 make contact and depress into the user's skin. In some embodiments, the actuators adjust the extension height between 0.01 mm to 1.2 mm. This allows the user to customize the positioning of the sensors 513 to improve the overall comfort of the wearable band 510 when worn while still allowing the sensors 513 to contact the user's skin. In some embodiments, the sensors 513 are indistinguishable from the wearable structure 511 when worn by the user.

The wearable structure 511 can be formed of an elastic material, elastomers, etc., configured to be stretched and fitted to be worn by the user. In some embodiments, the wearable structure 511 is a textile or woven fabric. As described above, the sensors 513 can be formed as part of a wearable structure 511. For example, the sensors 513 can be molded into the wearable structure 511 or be integrated into a woven fabric (e.g., the sensors 513 can be sewn into the fabric and mimic the pliability of fabric (e.g., the sensors 513 can be constructed from a series of woven strands of fabric)).

The wearable structure 511 can include flexible electronic connectors that interconnect the sensors 513, the electronic circuitry, and/or other electronic components (described below in reference to FIG. 5B) that are enclosed in the wearable band 510. In some embodiments, the flexible electronic connectors are configured to interconnect the sensors 513, the electronic circuitry, and/or other electronic components of the wearable band 510 with respective sensors and/or other electronic components of another electronic device (e.g., watch body 520). The flexible electronic connectors are configured to move with the wearable structure 511 such that the user adjustment to the wearable structure 511 (e.g., resizing, pulling, or folding) does not stress or strain the electrical coupling of components of the wearable band 510.

As described above, the wearable band 510 is configured to be worn by a user. In particular, the wearable band 510 can be shaped or otherwise manipulated to be worn by a user. For example, the wearable band 510 can be shaped to have a substantially circular shape such that it can be configured to be worn on the user's lower arm or wrist. Alternatively, the wearable band 510 can be shaped to be worn on another body part of the user, such as the user's upper arm (e.g., around a bicep), forearm, chest, legs, etc. The wearable band 510 can include a retaining mechanism 512 (e.g., a buckle or a hook and loop fastener) for securing the wearable band 510 to the user's wrist or other body part. While the wearable band 510 is worn by the user, the sensors 513 sense data (referred to as sensor data) from the user's skin. In particular, the sensors 513 of the wearable band 510 obtain (e.g., sense and record) neuromuscular signals.

The sensed data (e.g., sensed neuromuscular signals) can be used to detect and/or determine the user's intention to perform certain motor actions. In particular, the sensors 513 sense and record neuromuscular signals from the user as the user performs muscular activations (e.g., movements or gestures). The detected and/or determined motor action (e.g., phalange (or digits) movements, wrist movements, hand movements, and/or other muscle intentions) can be used to determine control commands or control information (instructions to perform certain commands after the data is sensed) for causing a computing device to perform one or more input commands. For example, the sensed neuromuscular signals can be used to control certain user interfaces displayed on the display 505 of the wrist-wearable device

500 and/or can be transmitted to a device responsible for rendering an AR environment (e.g., a head-mounted display) to perform an action in an associated AR environment, such as to control the motion of a virtual device displayed to the user. The muscular activations performed by the user can include static gestures, such as placing the user's hand palm down on a table; dynamic gestures, such as grasping a physical or virtual object; and covert gestures that are imperceptible to another person, such as slightly tensing a joint by co-contracting opposing muscles or using submuscular activations. The muscular activations performed by the user can include symbolic gestures (e.g., gestures mapped to other gestures, interactions, or commands, for example, based on a gesture vocabulary that specifies the mapping of gestures to commands).

The sensor data sensed by the sensors 513 can be used to provide a user with an enhanced interaction with a physical object (e.g., devices communicatively coupled with the wearable band 510) and/or a virtual object in an AR application generated by an AR system (e.g., user interface objects presented on the display 505 or another computing device (e.g., a smartphone)).

In some embodiments, the wearable band 510 includes one or more haptic devices 546 (FIG. 5B; e.g., a vibratory haptic actuator) that are configured to provide haptic feedback (e.g., a cutaneous and/or kinesthetic sensation) to the user's skin. The sensors 513 and/or the haptic devices 546 can be configured to operate in conjunction with multiple applications including, without limitation, health monitoring, social media, games, and AR (e.g., the applications associated with AR).

The wearable band 510 can also include a coupling mechanism 516 (e.g., a cradle or a shape of the coupling mechanism can correspond to the shape of the watch body 520 of the wrist-wearable device 500) for detachably coupling a capsule (e.g., a computing unit) or watch body 520 (via a coupling surface of the watch body 520) to the wearable band 510. In particular, the coupling mechanism 516 can be configured to receive a coupling surface proximate to the bottom side of the watch body 520 (e.g., a side opposite to a front side of the watch body 520 where the display 505 is located), such that a user can push the watch body 520 downward into the coupling mechanism 516 to attach the watch body 520 to the coupling mechanism 516. In some embodiments, the coupling mechanism 516 can be configured to receive a top side of the watch body 520 (e.g., a side proximate to the front side of the watch body 520 where the display 505 is located) that is pushed upward into the cradle, as opposed to being pushed downward into the coupling mechanism 516. In some embodiments, the coupling mechanism 516 is an integrated component of the wearable band 510 such that the wearable band 510 and the coupling mechanism 516 are a single unitary structure. In some embodiments, the coupling mechanism 516 is a type of frame or shell that allows the watch body 520 coupling surface to be retained within or on the wearable band 510 coupling mechanism 516 (e.g., a cradle, a tracker band, a support base, or a clasp).

The coupling mechanism 516 can allow for the watch body 520 to be detachably coupled to the wearable band 510 through a friction fit, a magnetic coupling, a rotation-based connector, a shear-pin coupler, a retention spring, one or more magnets, a clip, a pin shaft, a hook-and-loop fastener, or a combination thereof. A user can perform any type of motion to couple the watch body 520 to the wearable band 510 and to decouple the watch body 520 from the wearable band 510. For example, a user can twist, slide, turn, push, pull, or rotate the watch body 520 relative to the wearable band 510, or a combination thereof, to attach the watch body 520 to the wearable band 510 and to detach the watch body 520 from the wearable band 510. Alternatively, as discussed below, in some embodiments, the watch body 520 can be decoupled from the wearable band 510 by actuation of the release mechanism 529.

The wearable band 510 can be coupled with a watch body 520 to increase the functionality of the wearable band 510 (e.g., converting the wearable band 510 into a wrist-wearable device 500, adding an additional computing unit and/or battery to increase computational resources and/or a battery life of the wearable band 510, or adding additional sensors to improve sensed data). As described above, the wearable band 510 (and the coupling mechanism 516) is configured to operate independently (e.g., execute functions independently) from watch body 520. For example, the coupling mechanism 516 can include one or more sensors 513 that contact a user's skin when the wearable band 510 is worn by the user and provide sensor data for determining control commands.

A user can detach the watch body 520 (or capsule) from the wearable band 510 in order to reduce the encumbrance of the wrist-wearable device 500 to the user. For embodiments in which the watch body 520 is removable, the watch body 520 can be referred to as a removable structure, such that in these embodiments the wrist-wearable device 500 includes a wearable portion (e.g., the wearable band 510) and a removable structure (the watch body 520).

Turning to the watch body 520, the watch body 520 can have a substantially rectangular or circular shape. The watch body 520 is configured to be worn by the user on their wrist or on another body part. More specifically, the watch body 520 is sized to be easily carried by the user, attached on a portion of the user's clothing, and/or coupled to the wearable band 510 (forming the wrist-wearable device 500). As described above, the watch body 520 can have a shape corresponding to the coupling mechanism 516 of the wearable band 510. In some embodiments, the watch body 520 includes a single release mechanism 529 or multiple release mechanisms (e.g., two release mechanisms 529 positioned on opposing sides of the watch body 520, such as spring-loaded buttons) for decoupling the watch body 520 and the wearable band 510. The release mechanism 529 can include, without limitation, a button, a knob, a plunger, a handle, a lever, a fastener, a clasp, a dial, a latch, or a combination thereof.

A user can actuate the release mechanism 529 by pushing, turning, lifting, depressing, shifting, or performing other actions on the release mechanism 529. Actuation of the release mechanism 529 can release (e.g., decouple) the watch body 520 from the coupling mechanism 516 of the wearable band 510, allowing the user to use the watch body 520 independently from wearable band 510 and vice versa. For example, decoupling the watch body 520 from the wearable band 510 can allow the user to capture images using rear-facing camera 525*b*. Although the coupling mechanism 516 is shown positioned at a corner of watch body 520, the release mechanism 529 can be positioned anywhere on watch body 520 that is convenient for the user to actuate. In addition, in some embodiments, the wearable band 510 can also include a respective release mechanism for decoupling the watch body 520 from the coupling mechanism 516. In some embodiments, the release mechanism 529 is optional and the watch body 520 can be decoupled from the coupling mechanism 516, as described above (e.g., via twisting or rotating).

The watch body 520 can include one or more peripheral buttons 523 and 527 for performing various operations at the watch body 520. For example, the peripheral buttons 523 and 527 can be used to turn on or wake (e.g., transition from a sleep state to an active state) the display 505, unlock the watch body 520, increase or decrease volume, increase, or decrease brightness, interact with one or more applications, interact with one or more user interfaces. Additionally, or alternatively, in some embodiments, the display 505 operates as a touch screen and allows the user to provide one or more inputs for interacting with the watch body 520.

In some embodiments, the watch body 520 includes one or more sensors 521. The sensors 521 of the watch body 520 can be the same or distinct from the sensors 513 of the wearable band 510. The sensors 521 of the watch body 520 can be distributed on an inside and/or an outside surface of the watch body 520. In some embodiments, the sensors 521 are configured to contact a user's skin when the watch body 520 is worn by the user. For example, the sensors 521 can be placed on the bottom side of the watch body 520 and the coupling mechanism 516 can be a cradle with an opening that allows the bottom side of the watch body 520 to directly contact the user's skin. Alternatively, in some embodiments, the watch body 520 does not include sensors that are configured to contact the user's skin (e.g., including sensors internal and/or external to the watch body 520 that are configured to sense data of the watch body 520 and the watch body 520's surrounding environment). In some embodiments, the sensors 513 are configured to track a position and/or motion of the watch body 520.

The watch body 520 and the wearable band 510 can share data using a wired communication method (e.g., a Universal Asynchronous Receiver/Transmitter (UART) or a USB transceiver) and/or a wireless communication method (e.g., near-field communication or Bluetooth). For example, the watch body 520 and the wearable band 510 can share data sensed by the sensors 513 and 521, as well as application- and device-specific information (e.g., active and/or available applications), output devices (e.g., display or speakers), and/or input devices (e.g., touch screens, microphones, or imaging sensors).

In some embodiments, the watch body 520 can include, without limitation, a front-facing camera 525*a* and/or a rear-facing camera 525*b*, sensors 521 (e.g., a biometric sensor, an IMU sensor, a heart rate sensor, a saturated oxygen sensor, a neuromuscular-signal sensor, an altimeter sensor, a temperature sensor, a bioimpedance sensor, a pedometer sensor, an optical sensor (e.g., FIG. 5B; imaging sensor 563), a touch sensor, a sweat sensor). In some embodiments, the watch body 520 can include one or more haptic devices 576 (FIG. 5B; a vibratory haptic actuator) that is configured to provide haptic feedback (e.g., a cutaneous and/or kinesthetic sensation) to the user. The sensors 521 and/or the haptic device 576 can also be configured to operate in conjunction with multiple applications, including, without limitation, health-monitoring applications, social media applications, game applications, and AR applications (e.g., the applications associated with AR).

As described above, the watch body 520 and the wearable band 510, when coupled, can form the wrist-wearable device 500. When coupled, the watch body 520 and wearable band 510 operate as a single device to execute functions (e.g., operations, detections, or communications) described herein. In some embodiments, each device is provided with particular instructions for performing the one or more operations of the wrist-wearable device 500. For example, in accordance with a determination that the watch body 520 does not include neuromuscular-signal sensors, the wearable band 510 can include alternative instructions for performing associated instructions (e.g., providing sensed neuromuscular-signal data to the watch body 520 via a different electronic device). Operations of the wrist-wearable device 500 can be performed by the watch body 520 alone or in conjunction with the wearable band 510 (e.g., via respective processors and/or hardware components) and vice versa. In some embodiments, operations of the wrist-wearable device 500, the watch body 520, and/or the wearable band 510 can be performed in conjunction with one or more processors and/or hardware components of another communicatively coupled device (e.g., FIGS. 7A-7B; the HIPD 700).

As described below with reference to the block diagram of FIG. 5B, the wearable band 510 and/or the watch body 520 can each include independent resources required to independently execute functions. For example, the wearable band 510 and/or the watch body 520 can each include a power source (e.g., a battery), a memory, data storage, a processor (e.g., a CPU), communications, a light source, and/or input/output devices.

FIG. 5B shows block diagrams of a computing system 530 corresponding to the wearable band 510 and a computing system 560 corresponding to the watch body 520, according to some embodiments. A computing system of the wrist-wearable device 500 includes a combination of components of the wearable band computing system 530 and the watch body computing system 560, in accordance with some embodiments.

The watch body 520 and/or the wearable band 510 can include one or more components shown in watch body computing system 560. In some embodiments, a single integrated circuit includes all or a substantial portion of the components of the watch body computing system 560 that are included in a single integrated circuit. Alternatively, in some embodiments, components of the watch body computing system 560 are included in a plurality of integrated circuits that are communicatively coupled. In some embodiments, the watch body computing system 560 is configured to couple (e.g., via a wired or wireless connection) with the wearable band computing system 530, which allows the computing systems to share components, distribute tasks, and/or perform other operations described herein (individually or as a single device).

The watch body computing system 560 can include one or more processors 579, a controller 577, a peripherals interface 561, a power system 595, and memory (e.g., a memory 580), each of which are defined above and described in more detail below.

The power system 595 can include a charger input 596, a power-management integrated circuit (PMIC) 597, and a battery 598, each of which are defined above. In some embodiments, a watch body 520 and a wearable band 510 can have respective charger inputs (e.g., charger inputs 596 and 557), respective batteries (e.g., batteries 598 and 559), and can share power with each other (e.g., the watch body 520 can power and/or charge the wearable band 510 and vice versa). Although watch body 520 and/or the wearable band 510 can include respective charger inputs, a single charger input can charge both devices when coupled. The watch body 520 and the wearable band 510 can receive a charge using a variety of techniques. In some embodiments, the watch body 520 and the wearable band 510 can use a wired charging assembly (e.g., power cords) to receive the charge. Alternatively, or in addition, the watch body 520 and/or the wearable band 510 can be configured for wireless charging. For example, a portable charging device can be designed to mate with a portion of watch body 520 and/or wearable band 510 and wirelessly deliver usable power to a battery of watch body 520 and/or wearable band 510. The watch body 520 and the wearable band 510 can have independent power systems (e.g., power system 595 and 556) to enable each to operate independently. The watch body 520 and wearable band 510 can also share power (e.g., one can charge the other) via respective PMICs (e.g., PMICs 597 and 558) that can share power over power and ground conductors and/or over wireless charging antennas.

In some embodiments, the peripherals interface 561 can include one or more sensors 521, many of which listed below are defined above. The sensors 521 can include one or more coupling sensors 562 for detecting when the watch body 520 is coupled with another electronic device (e.g., a wearable band 510). The sensors 521 can include imaging sensors 563 (one or more of the cameras 525 and/or separate imaging sensors 563 (e.g., thermal-imaging sensors)). In some embodiments, the sensors 521 include one or more SpO2 sensors 564. In some embodiments, the sensors 521 include one or more biopotential-signal sensors (e.g., EMG sensors 565, which may be disposed on a user-facing portion of the watch body 520 and/or the wearable band 510). In some embodiments, the sensors 521 include one or more capacitive sensors 566. In some embodiments, the sensors 521 include one or more heart rate sensors 567. In some embodiments, the sensors 521 include one or more IMUs 568. In some embodiments, one or more IMUs 568 can be configured to detect movement of a user's hand or other location that the watch body 520 is placed or held.

In some embodiments, the peripherals interface 561 includes an NFC component 569, a GPS component 570, a long-term evolution (LTE) component 571, and/or a Wi-Fi and/or Bluetooth communication component 572. In some embodiments, the peripherals interface 561 includes one or more buttons 573 (e.g., the peripheral buttons 523 and 527 in FIG. 5A), which, when selected by a user, cause operations to be performed at the watch body 520. In some embodiments, the peripherals interface 561 includes one or more indicators, such as a light-emitting diode (LED), to provide a user with visual indicators (e.g., message received, low battery, an active microphone, and/or a camera).

The watch body 520 can include at least one display 505 for displaying visual representations of information or data to the user, including user-interface elements and/or three-dimensional (3D) virtual objects. The display can also include a touch screen for inputting user inputs, such as touch gestures, swipe gestures, and the like. The watch body 520 can include at least one speaker 574 and at least one microphone 575 for providing audio signals to the user and receiving audio input from the user. The user can provide user inputs through the microphone 575 and can also receive audio output from the speaker 574 as part of a haptic event provided by the haptic controller 578. The watch body 520 can include at least one camera 525, including a front-facing camera 525a and a rear-facing camera 525b. The cameras 525 can include ultra-wide-angle cameras, wide-angle cameras, fish-eye cameras, spherical cameras, telephoto cameras, depth-sensing cameras, or other types of cameras.

The watch body computing system 560 can include one or more haptic controllers 578 and associated componentry (e.g., haptic devices 576) for providing haptic events at the watch body 520 (e.g., a vibrating sensation or audio output in response to an event at the watch body 520). The haptic controllers 578 can communicate with one or more haptic devices 576, such as electroacoustic devices, including a speaker of the one or more speakers 574 and/or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). The haptic controller 578 can provide haptic events to respective haptic actuators that are capable of being sensed by a user of the watch body 520. In some embodiments, the one or more haptic controllers 578 can receive input signals from an application of the applications 582.

In some embodiments, the computer system 530 and/or the computer system 560 can include memory 580, which can be controlled by a memory controller of the one or more controllers 577 and/or one or more processors 579. In some embodiments, software components stored in the memory 580 include one or more applications 582 configured to perform operations at the watch body 520. In some embodiments, the one or more applications 582 include games, word processors, messaging applications, calling applications, web browsers, social media applications, media streaming applications, financial applications, calendars, clocks, etc. In some embodiments, software components stored in the memory 580 include one or more communication interface modules 583 as defined above. In some embodiments, software components stored in the memory 580 include one or more graphics modules 584 for rendering, encoding, and/or decoding audio and/or visual data; and one or more data management modules 585 for collecting, organizing, and/or providing access to the data 587 stored in memory 580. In some embodiments, one or more of applications 582 and/or one or more modules can work in conjunction with one another to perform various tasks at the watch body 520.

In some embodiments, software components stored in the memory 580 can include one or more operating systems 581 (e.g., a Linux-based operating system, an Android operating system, etc.). The memory 580 can also include data 587. The data 587 can include profile data 588A, sensor data 589A, media content data 590, application data 591.

It should be appreciated that the watch body computing system 560 is an example of a computing system within the watch body 520, and that the watch body 520 can have more or fewer components than shown in the watch body computing system 560, combine two or more components, and/or have a different configuration and/or arrangement of the components. The various components shown in watch body computing system 560 are implemented in hardware, software, firmware, or a combination thereof, including one or more signal processing and/or application-specific integrated circuits.

Turning to the wearable band computing system 530, one or more components that can be included in the wearable band 510 are shown. The wearable band computing system 530 can include more or fewer components than shown in the watch body computing system 560, combine two or more components, and/or have a different configuration and/or arrangement of some or all of the components. In some embodiments, all, or a substantial portion of the components of the wearable band computing system 530 are included in a single integrated circuit. Alternatively, in some embodiments, components of the wearable band computing system 530 are included in a plurality of integrated circuits that are communicatively coupled. As described above, in some embodiments, the wearable band computing system 530 is configured to couple (e.g., via a wired or wireless connection) with the watch body computing system 560, which allows the computing systems to share components, distribute tasks, and/or perform other operations described herein (individually or as a single device).

The wearable band computing system 530, similar to the watch body computing system 560, can include one or more processors 549, one or more controllers 547 (including one or more haptics controller 548), a peripherals interface 531 that can include one or more sensors 513 and other peripheral devices, power source (e.g., a power system 556), and memory (e.g., a memory 550) that includes an operating system (e.g., an operating system 551), data (e.g., data 554 including profile data 588B, sensor data 589B, etc.), and one or more modules (e.g., a communications interface module 552, a data management module 553, etc.).

The one or more sensors 513 can be analogous to sensors 521 of the computer system 560 in light of the definitions above. For example, sensors 513 can include one or more coupling sensors 532, one or more SpO2 sensors 534, one or more EMG sensors 535, one or more capacitive sensors 536, one or more heart rate sensors 537, and one or more IMU sensors 538.

The peripherals interface 531 can also include other components analogous to those included in the peripheral interface 561 of the computer system 560, including an NFC component 539, a GPS component 540, an LTE component 541, a Wi-Fi and/or Bluetooth communication component 542, and/or one or more haptic devices 576 as described above in reference to peripherals interface 561. In some embodiments, the peripherals interface 531 includes one or more buttons 543, a display 533, a speaker 544, a microphone 545, and a camera 555. In some embodiments, the peripherals interface 531 includes one or more indicators, such as an LED.

It should be appreciated that the wearable band computing system 530 is an example of a computing system within the wearable band 510, and that the wearable band 510 can have more or fewer components than shown in the wearable band computing system 530, combine two or more components, and/or have a different configuration and/or arrangement of the components. The various components shown in wearable band computing system 530 can be implemented in one or a combination of hardware, software, and firmware, including one or more signal processing and/or application-specific integrated circuits.

The wrist-wearable device 500 with respect to FIG. 5A is an example of the wearable band 510 and the watch body 520 coupled, so the wrist-wearable device 500 will be understood to include the components shown and described for the wearable band computing system 530 and the watch body computing system 560. In some embodiments, wrist-wearable device 500 has a split architecture (e.g., a split mechanical architecture or a split electrical architecture) between the watch body 520 and the wearable band 510. In other words, all of the components shown in the wearable band computing system 530 and the watch body computing system 560 can be housed or otherwise disposed in a combined watch device 500, or within individual components of the watch body 520, wearable band 510, and/or portions thereof (e.g., a coupling mechanism 516 of the wearable band 510).

The techniques described above can be used with any device for sensing neuromuscular signals, including the arm-wearable devices of FIG. 5A-5B, but could also be used with other types of wearable devices for sensing neuromuscular signals (such as body-wearable or head-wearable devices that might have neuromuscular sensors closer to the brain or spinal column).

In some embodiments, a wrist-wearable device 500 can be used in conjunction with a head-wearable device described below (e.g., AR device 600 and VR device 610) and/or an HIPD 700, and the wrist-wearable device 500 can also be configured to be used to allow a user to control aspect of the artificial reality (e.g., by using EMG-based gestures to control user interface objects in the artificial reality and/or by allowing a user to interact with the touchscreen on the wrist-wearable device to also control aspects of the artificial reality). In some embodiments, a wrist-wearable device 500 can also be used in conjunction with a wearable garment, such as smart textile-based garment 800 described below in reference to FIGS. 8A-8C. Having thus described example wrist-wearable device, attention will now be turned to example head-wearable devices, such AR device 600 and VR device 610.

Example Head-Wearable Devices

FIGS. 6A, 6B-1, 6B-2, and 6C show example head-wearable devices, in accordance with some embodiments. Head-wearable devices can include, but are not limited to, AR devices 600 (e.g., AR or smart eyewear devices, such as smart glasses, smart monocles, smart contacts, etc.), VR devices 610 (e.g., VR headsets or head-mounted displays (HMDs)), or other ocularly coupled devices. The AR devices 600 and the VR devices 610 can perform various functions and/or operations associated with navigating through user interfaces and selectively opening applications.

In some embodiments, an AR system (e.g., FIGS. 4A-4D-2; AR systems 400*a* to 400*d*) includes an AR device 600 (as shown in FIG. 6A) and/or VR device 610 (as shown in FIGS. 6B-1-B-2). In some embodiments, the AR device 600 and the VR device 610 can include one or more analogous components (e.g., components for presenting interactive AR environments, such as processors, memory, and/or presentation devices, including one or more displays and/or one or more waveguides), some of which are described in more detail with respect to FIG. 6C. The head-wearable devices can use display projectors (e.g., display projector assemblies 607A and 607B) and/or waveguides for projecting representations of data to a user. Some embodiments of head-wearable devices do not include displays.

FIG. 6A shows an example visual depiction of the AR device 600 (e.g., which may also be described herein as augmented-reality glasses and/or smart glasses). The AR device 600 can work in conjunction with additional electronic components that are not shown in FIGS. 6A, such as a wearable accessory device and/or an intermediary processing device, in electronic communication or otherwise configured to be used in conjunction with the AR device 600. In some embodiments, the wearable accessory device and/or the intermediary processing device may be configured to couple with the AR device 600 via a coupling mechanism in electronic communication with a coupling sensor 624, where the coupling sensor 624 can detect when an electronic device becomes physically or electronically coupled with the AR device 600. In some embodiments, the AR device 600 can be configured to couple to a housing (e.g., a portion of frame 604 or temple arms 605), which may include one or more additional coupling mechanisms configured to couple with additional accessory devices. The components shown in FIG. 6A can be implemented in hardware, software, firmware, or a combination thereof, including one or more signal-processing components and/or application-specific integrated circuits (ASICs).

The AR device 600 includes mechanical glasses components, including a frame 604 configured to hold one or more lenses (e.g., one or both lenses 606-1 and 606-2). One of ordinary skill in the art will appreciate that the AR device 600 can include additional mechanical components, such as hinges configured to allow portions of the frame 604 of the AR device 600 to be folded and unfolded, a bridge configured to span the gap between the lenses 606-1 and 606-2 and rest on the user's nose, nose pads configured to rest on the bridge of the nose and provide support for the AR device 600, earpieces configured to rest on the user's ears and provide additional support for the AR device 600, temple arms 605 configured to extend from the hinges to the earpieces of the AR device 600, and the like. One of ordinary skill in the art will further appreciate that some examples of the AR device 600 can include none of the mechanical components described herein. For example, smart contact lenses configured to present AR to users may not include any components of the AR device 600.

The lenses 606-1 and 606-2 can be individual displays or display devices (e.g., a waveguide for projected representations). The lenses 606-1 and 606-2 may act together or independently to present an image or series of images to a user. In some embodiments, the lenses 606-1 and 606-2 can operate in conjunction with one or more display projector assemblies 607A and 607B to present image data to a user. While the AR device 600 includes two displays, embodiments of this disclosure may be implemented in AR devices with a single near-eye display (NED) or more than two NEDs.

The AR device 600 includes electronic components, many of which will be described in more detail below with respect to FIG. 6C. Some example electronic components are illustrated in FIG. 6A, including sensors 623-1, 623-2, 623-3, 623-4, 623-5, and 623-6, which can be distributed along a substantial portion of the frame 604 of the AR device 600. The distinct types of sensors are described below in reference to FIG. 6C. The AR device 600 also includes a left camera 639A and a right camera 639B, which are located on different sides of the frame 604. And the eyewear device includes one or more processors 648A and 648B (e.g., an integral microprocessor, such as an ASIC) that is embedded into a portion of the frame 604.

FIGS. 6B-1 and 6B-2 show an example visual depiction of the VR device 610 (e.g., a head-mounted display (HMD) 612, also referred to herein as an AR headset, a head-wearable device, or a VR headset). The HMD 612 includes a front body 614 and a frame 616 (e.g., a strap or band) shaped to fit around a user's head. In some embodiments, the front body 614 and/or the frame 616 includes one or more electronic elements for facilitating presentation of and/or interactions with an AR and/or VR system (e.g., displays, processors (e.g., processor 648A-1), IMUs, tracking emitters or detectors, or sensors). In some embodiments, the HMD 612 includes output audio transducers (e.g., an audio transducer 618-1), as shown in FIG. 6B-2. In some embodiments, one or more components, such as the output audio transducer(s) 618 and the frame 616, can be configured to attach and detach (e.g., are detachably attachable) to the HMD 612 (e.g., a portion or all of the frame 616 and/or the output audio transducer 618), as shown in FIG. 6B-2. In some embodiments, coupling a detachable component to the HMD 612 causes the detachable component to come into electronic communication with the HMD 612. The VR device 610 includes electronic components, many of which will be described in more detail below with respect to FIG. 6C.

FIGS. 6B-1 and 6B-2 also show that the VR device 610 having one or more cameras, such as the left camera 639A and the right camera 639B, which can be analogous to the left and right cameras on the frame 604 of the AR device 600. In some embodiments, the VR device 610 includes one or more additional cameras (e.g., cameras 639C and 639D), which can be configured to augment image data obtained by the cameras 639A and 639B by providing more information. For example, the camera 639C can be used to supply color information that is not discerned by cameras 639A and 639B. In some embodiments, one or more of the cameras 639A to 639D can include an optional IR (infrared) cut filter configured to remove IR light from being received at the respective camera sensors.

The VR device 610 can include a housing 690 storing one or more components of the VR device 610 and/or additional components of the VR device 610. The housing 690 can be a modular electronic device configured to couple with the VR device 610 (or an AR device 600) and supplement and/or extend the capabilities of the VR device 610 (or an AR device 600). For example, the housing 690 can include additional sensors, cameras, power sources, and processors (e.g., processor 648A-2). to improve and/or increase the functionality of the VR device 610. Examples of the different components included in the housing 690 are described below in reference to FIG. 6C.

Alternatively, or in addition, in some embodiments, the head-wearable device, such as the VR device 610 and/or the AR device 600, includes, or is communicatively coupled to, another external device (e.g., a paired device), such as an HIPD 7 (discussed below in reference to FIGS. 7A-7B) and/or an optional neckband. The optional neckband can couple to the head-wearable device via one or more connectors (e.g., wired, or wireless connectors). The head-wearable device and the neckband can operate independently without any wired or wireless connection between them. In some embodiments, the components of the head-wearable device and the neckband are located on one or more additional peripheral devices paired with the head-wearable device, the neckband, or some combination thereof. Furthermore, the neckband is intended to represent any suitable type or form of paired device. Thus, the following discussion of neckbands may also apply to various other paired devices, such as smartwatches, smartphones, wrist bands, other wearable devices, hand-held controllers, tablet computers, or laptop computers.

In some situations, pairing external devices, such as an intermediary processing device (e.g., an HIPD device 700, an optional neckband, and/or a wearable accessory device) with the head-wearable devices (e.g., an AR device 600 and/or a VR device 610) enables the head-wearable devices to achieve a similar form factor of a pair of glasses while still providing sufficient battery and computational power for expanded capabilities. Some, or all, of the battery power, computational resources, and/or additional features of the head-wearable devices can be provided by a paired device or shared between a paired device and the head-wearable devices, thus reducing the weight, heat profile, and form factor of the head-wearable device overall while allowing the head-wearable device to retain its desired functionality. For example, the intermediary processing device (e.g., the HIPD 700) can allow components that would otherwise be included in a head-wearable device to be included in the intermediary processing device (and/or a wearable device or accessory device), thereby shifting a weight load from the user's head and neck to one or more other portions of the user's body. In some embodiments, the intermediary processing device has a larger surface area over which to diffuse and disperse heat to the ambient environment. Thus, the intermediary processing device can allow for greater battery and computational capacity than might otherwise have been possible on the head-wearable devices, standing alone. Because weight carried in the intermediary processing device can be less invasive to a user than weight carried in the head-wearable devices, a user may tolerate wearing a lighter eyewear device and carrying or wearing the paired device for greater lengths of time than the user would tolerate wearing a heavier eyewear device standing alone, thereby enabling an AR environment to be incorporated more fully into a user's day-to-day activities.

In some embodiments, the intermediary processing device is communicatively coupled with the head-wearable device and/or to other devices. The other devices may provide certain functions (e.g., tracking, localizing, depth mapping, processing, and/or storage) to the head-wearable device. In some embodiments, the intermediary processing device includes a controller and a power source. In some embodiments, sensors of the intermediary processing device are configured to sense additional data that can be shared with the head-wearable devices in an electronic format (analog or digital).

The controller of the intermediary processing device processes information generated by the sensors on the intermediary processing device and/or the head-wearable devices. The intermediary processing device, such as an HIPD 700, can process information generated by one or more of its sensors and/or information provided by other communicatively coupled devices. For example, a head-wearable device can include an IMU, and the intermediary processing device (a neckband and/or an HIPD 700) can compute all inertial and spatial calculations from the IMUs located on the head-wearable device. Additional examples of processing performed by a communicatively coupled device, such as the HIPD 700, are provided below in reference to FIGS. 7A and 7B.

AR systems may include a variety of types of visual feedback mechanisms. For example, display devices in the AR devices 600 and/or the VR devices 610 may include one or more liquid-crystal displays (LCDs), light emitting diode (LED) displays, organic LED (OLED) displays, and/or any other suitable type of display screen. AR systems may include a single display screen for both eyes or may provide a display screen for each eye, which may allow for additional flexibility for varifocal adjustments or for correcting a refractive error associated with the user's vision. Some AR systems also include optical subsystems having one or more lenses (e.g., conventional concave or convex lenses, Fresnel lenses, or adjustable liquid lenses) through which a user may view a display screen. In addition to or instead of using display screens, some AR systems include one or more projection systems. For example, display devices in the AR device 600 and/or the VR device 610 may include micro-LED projectors that project light (e.g., using a waveguide) into display devices, such as clear combiner lenses that allow ambient light to pass through. The display devices may refract the projected light toward a user's pupil and may enable a user to simultaneously view both AR content and the real world. AR systems may also be configured with any other suitable type or form of image projection system. As noted, some AR systems may, instead of blending an artificial reality with actual reality, substantially replace one or more of a user's sensory perceptions of the real world with a virtual experience.

While the example head-wearable devices are respectively described herein as the AR device 600 and the VR device 610, either or both of the example head-wearable devices described herein can be configured to present fully immersive VR scenes presented in substantially all of a user's field of view, additionally or alternatively to, subtler augmented-reality scenes that are presented within a portion, less than all, of the user's field of view.

In some embodiments, the AR device 600 and/or the VR device 610 can include haptic feedback systems. The haptic feedback systems may provide distinct types of cutaneous feedback, including vibration, force, traction, shear, texture, and/or temperature. The haptic feedback systems may also provide several types of kinesthetic feedback, such as motion and compliance. The haptic feedback can be implemented using motors, piezoelectric actuators, fluidic systems, and/or a variety of other types of feedback mechanisms. The haptic feedback systems may be implemented independently of other AR devices, within other AR devices, and/or in conjunction with other AR devices (e.g., wrist-wearable devices that may be incorporated into headwear, gloves, body suits, handheld controllers, environmental devices (e.g., chairs or floormats), and/or any other type of device or system, such as a wrist-wearable device 500, an HIPD 700, smart textile-based garment 800), and/or other devices described herein.

FIG. 6C illustrates a computing system 620 and an optional housing 690, each of which shows components that can be included in a head-wearable device (e.g., the AR device 600 and/or the VR device 610). In some embodiments, more or fewer components can be included in the optional housing 690 depending on practical restraints of the respective head-wearable device being described. Additionally, or alternatively, the optional housing 690 can include additional components to expand and/or augment the functionality of a head-wearable device.

In some embodiments, the computing system 620 and/or the optional housing 690 can include one or more peripheral interfaces 622A and 622B, one or more power systems 642A and 642B (including charger input 643, PMIC 644, and battery 645), one or more controllers 646A and 646B (including one or more haptic controllers 647), one or more processors 648A and 648B (as defined above, including any of the examples provided), and memory 650A and 650B, which can all be in electronic communication with each other. For example, the one or more processors 648A and/or 648B can be configured to execute instructions stored in the memory 650A and/or 650B, which can cause a controller of the one or more controllers 646A and/or 646B to cause operations to be performed at one or more peripheral devices of the peripherals interfaces 622A and/or 622B. In some embodiments, each operation described can occur based on electrical power provided by the power system 642A and/or 642B.

In some embodiments, the peripherals interface 622A can include one or more devices configured to be part of the computing system 620, many of which have been defined above and/or described with respect to wrist-wearable devices shown in FIGS. 5A and 5B. For example, the peripherals interface can include one or more sensors 623A. Some example sensors include one or more coupling sensors 624, one or more acoustic sensors 625, one or more imaging sensors 626, one or more EMG sensors 627, one or more capacitive sensors 628, and/or one or more IMUs 629. In some embodiments, the sensors 623A further include depth sensors 667, light sensors 668, and/or any other types of sensors defined above or described with respect to any other embodiments discussed herein.

In some embodiments, the peripherals interface can include one or more additional peripheral devices, including one or more NFC devices 630, one or more GPS devices

631, one or more LTE devices 632, one or more Wi-Fi and/or Bluetooth devices 633, one or more buttons 634 (e.g., including buttons that are slidable or otherwise adjustable), one or more displays 635A, one or more speakers 636A, one or more microphones 637A, one or more cameras 638A (e.g., including the first camera 639-1 through nth camera 639-n, which are analogous to the left camera 639A and/or the right camera 639B), one or more haptic devices 640, and/or any other types of peripheral devices defined above or described with respect to any other embodiments discussed herein.

The head-wearable devices can include a variety of types of visual feedback mechanisms (e.g., presentation devices). For example, display devices in the AR device 600 and/or the VR device 610 can include one or more liquid-crystal displays (LCDs), light emitting diode (LED) displays, organic LED (OLED) displays, micro-LEDs, and/or any other suitable types of display screens. The head-wearable devices can include a single display screen (e.g., configured to be seen by both eyes) and/or can provide separate display screens for each eye, which can allow for additional flexibility for varifocal adjustments and/or for correcting a refractive error associated with the user's vision. Some embodiments of the head-wearable devices also include optical subsystems having one or more lenses (e.g., conventional concave or convex lenses, Fresnel lenses, or adjustable liquid lenses) through which a user can view a display screen. For example, respective displays 635A can be coupled to each of the lenses 606-1 and 606-2 of the AR device 600. The displays 635A coupled to each of the lenses 606-1 and 606-2 can act together or independently to present an image or series of images to a user. In some embodiments, the AR device 600 and/or the VR device 610 includes a single display 635A (e.g., a near-eye display) or more than two displays 635A.

In some embodiments, a first set of one or more displays 635A can be used to present an augmented-reality environment, and a second set of one or more display devices 635A can be used to present a VR environment. In some embodiments, one or more waveguides are used in conjunction with presenting AR content to the user of the AR device 600 and/or the VR device 610 (e.g., as a means of delivering light from a display projector assembly and/or one or more displays 635A to the user's eyes). In some embodiments, one or more waveguides are fully or partially integrated into the AR device 600 and/or the VR device 610. Additionally, or alternatively, to display screens, some AR systems include one or more projection systems. For example, display devices in the AR device 600 and/or the VR device 610 can include micro-LED projectors that project light (e.g., using a waveguide) into display devices, such as clear combiner lenses that allow ambient light to pass through. The display devices can refract the projected light toward a user's pupil and can enable a user to simultaneously view both AR content and the real world. The head-wearable devices can also be configured with any other suitable type or form of image projection system. In some embodiments, one or more waveguides are provided, additionally or alternatively, to the one or more display(s) 635A.

In some embodiments of the head-wearable devices, ambient light and/or a real-world live view (e.g., a live feed of the surrounding environment that a user would normally see) can be passed through a display element of a respective head-wearable device presenting aspects of the AR system. In some embodiments, ambient light and/or the real-world live view can be passed through a portion, less than all, of an AR environment presented within a user's field of view (e.g., a portion of the AR environment co-located with a physical object in the user's real-world environment that is within a designated boundary (e.g., a guardian boundary) configured to be used by the user while they are interacting with the AR environment). For example, a visual user interface element (e.g., a notification user interface element) can be presented at the head-wearable devices, and an amount of ambient light and/or the real-world live view (e.g., 15%-50% of the ambient light and/or the real-world live view) can be passed through the user interface element, such that the user can distinguish at least a portion of the physical environment over which the user interface element is being displayed.

The head-wearable devices can include one or more external displays 635A for presenting information to users. For example, an external display 635A can be used to show a current battery level, network activity (e.g., connected, disconnected), current activity (e.g., playing a game, in a call, in a meeting, or watching a movie), and/or other relevant information. In some embodiments, the external displays 635A can be used to communicate with others. For example, a user of the head-wearable device can cause the external displays 635A to present a "do not disturb" notification. The external displays 635A can also be used by the user to share any information captured by the one or more components of the peripherals interface 622A and/or generated by the head-wearable device (e.g., during operation and/or performance of one or more applications).

The memory 650A can include instructions and/or data executable by one or more processors 648A (and/or processors 648B of the housing 690) and/or a memory controller of the one or more controllers 646A (and/or controller 646B of the housing 690). The memory 650A can include one or more operating systems 651, one or more applications 652, one or more communication interface modules 653A, one or more graphics modules 654A, one or more AR processing modules 655A, and/or any other types of modules or components defined above or described with respect to any other embodiments discussed herein.

The data 660 stored in memory 650A can be used in conjunction with one or more of the applications and/or programs discussed above. The data 660 can include profile data 661, sensor data 662, media content data 663, AR application data 664, and/or any other types of data defined above or described with respect to any other embodiments discussed herein.

In some embodiments, the controller 646A of the head-wearable devices processes information generated by the sensors 623A on the head-wearable devices and/or another component of the head-wearable devices and/or communicatively coupled with the head-wearable devices (e.g., components of the housing 690, such as components of peripherals interface 622B). For example, the controller 646A can process information from the acoustic sensors 625 and/or image sensors 626. For each detected sound, the controller 646A can perform a direction of arrival (DOA) estimation to estimate a direction from which the detected sound arrived at a head-wearable device. As one or more of the acoustic sensors 625 detect sounds, the controller 646A can populate an audio data set with the information (e.g., represented by sensor data 662).

In some embodiments, a physical electronic connector can convey information between the head-wearable devices and another electronic device, and/or between one or more processors 648A of the head-wearable devices and the controller 646A. The information can be in the form of optical data, electrical data, wireless data, or any other transmittable data form. Moving the processing of information generated by the head-wearable devices to an intermediary processing device can reduce weight and heat in the eyewear device, making it more comfortable and safer for a user. In some embodiments, an optional accessory device (e.g., an electronic neckband or an HIPD 700) is coupled to the head-wearable devices via one or more connectors. The connectors can be wired or wireless connectors and can include electrical and/or non-electrical (e.g., structural) components. In some embodiments, the head-wearable devices and the accessory device can operate independently without any wired or wireless connection between them.

The head-wearable devices can include various components and subsystems for performing computer vision. For example, the AR device 600 and/or the VR device 610 can include one or more optical sensors such as two-dimensional (2D) or three-dimensional (3D) cameras, ToF depth sensors, single-beam or sweeping laser rangefinders, 3D LiDAR sensors, and/or any other suitable type or form of optical sensor. A head-wearable device can process data from one or more of these sensors to identify a location of a user and/or aspects of the user's real-world physical surroundings, including the locations of real-world objects within the real-world physical surroundings. In some embodiments, the methods described herein are used to map the real world, to provide a user with context about real-world surroundings, and/or to generate interactable virtual objects (which can be replicas or digital twins of real-world objects that can be interacted with an AR environment), among a variety of other functions. For example, FIGS. 6B-1 and 6B-2 show the VR device 610 having cameras 639A to 639D, which can be used to provide depth information for creating a voxel field and a 2D mesh to provide object information to the user to avoid collisions.

The optional housing 690 can include analogous components to those describe above with respect to the computing system 620. For example, the optional housing 690 can include a respective peripherals interface 622B, including more or fewer components to those described above with respect to the peripherals interface 622A. As described above, the components of the optional housing 690 can be used to augment and/or expand on the functionality of the head-wearable devices. For example, the optional housing 690 can include respective sensors 623B, speakers 636B, displays 635B, microphones 637B, cameras 638B, and/or other components to capture and/or present data. Similarly, the optional housing 690 can include one or more processors 648B, controllers 646B, and/or memory 650B (including respective communication interface modules 653B, one or more graphics modules 654B, one or more AR processing modules 655B) that can be used individually and/or in conjunction with the components of the computing system 620.

The techniques described above in FIGS. 6A-6C can be used with different head-wearable devices. In some embodiments, the head-wearable devices (e.g., the AR device 600 and/or the VR device 610) can be used in conjunction with one or more wearable devices such as a wrist-wearable device 500 (or components thereof) and/or a smart textile-based garment 800 (FIGS. 8A-8C), as well as an HIPD 700. Having thus described example the head-wearable devices, attention will now be turned to example handheld intermediary processing devices, such as HIPD 700.

Example Handheld Intermediary Processing Devices

Figure 7A:
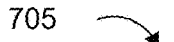
FIGS. 7A and 7B illustrate an example handheld intermediary processing device, in accordance with some embodiments.
Figure 7A:
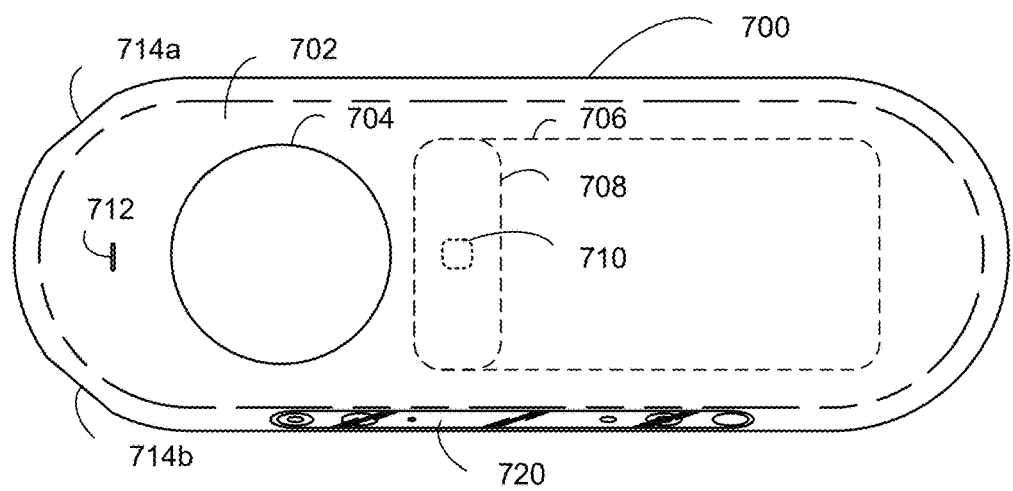
Figure 7A:
Figure 7A:
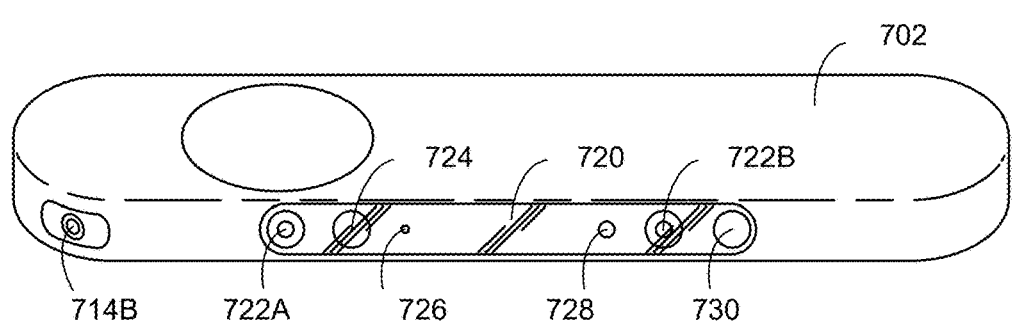
Figure 7B:
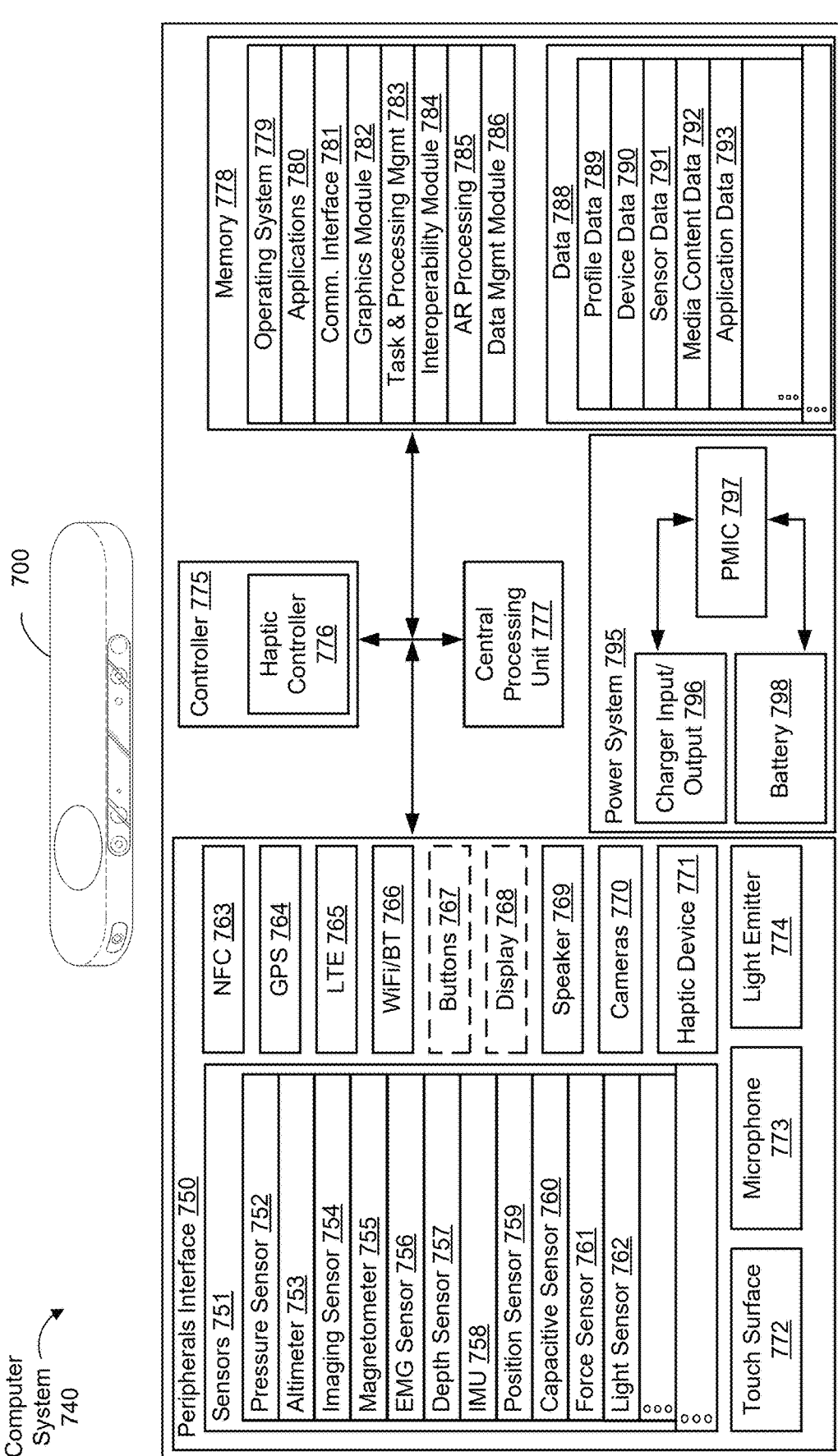

FIGS. 7A and 7B illustrate an example handheld intermediary processing device (HIPD) 700, in accordance with some embodiments. The HIPD 700 can perform various functions and/or operations associated with navigating through user interfaces and selectively opening applications.

FIG. 7A shows a top view 705 and a side view 725 of the HIPD 700. The HIPD 700 is configured to communicatively couple with one or more wearable devices (or other electronic devices) associated with a user. For example, the HIPD 700 is configured to communicatively couple with a user's wrist-wearable device 500 (or components thereof, such as the watch body 520 and the wearable band 510), AR device 600, and/or VR device 610. The HIPD 700 can be configured to be held by a user (e.g., as a handheld controller), carried on the user's person (e.g., in their pocket or in their bag), placed in proximity of the user (e.g., placed on their desk while seated at their desk or on a charging dock), and/or placed at or within a predetermined distance from a wearable device or other electronic device (e.g., where, in some embodiments, the predetermined distance is the maximum distance (e.g., 10 meters) at which the HIPD 700 can successfully be communicatively coupled with an electronic device, such as a wearable device).

The HIPD 700 can perform various functions independently and/or in conjunction with one or more wearable devices (e.g., wrist-wearable device 500, AR device 600, and/or VR device 610). The HIPD 700 is configured to increase and/or improve the functionality of communicatively coupled devices, such as the wearable devices. The HIPD 700 is configured to perform one or more functions or operations associated with interacting with user interfaces and applications of communicatively coupled devices, interacting with an AR environment, interacting with a VR environment, and/or operating as a human-machine interface controller. Additionally, as will be described in more detail below, functionality and/or operations of the HIPD 700 can include, without limitation, task offloading and/or handoffs, thermals offloading and/or handoffs, 6 degrees of freedom (6DoF) raycasting and/or gaming (e.g., using imaging devices or cameras 714A and 714B, which can be used for simultaneous localization and mapping (SLAM), and/or with other image processing techniques), portable charging; messaging, image capturing via one or more imaging devices or cameras (e.g., cameras 722A and 722B), sensing user input (e.g., sensing a touch on a multitouch input surface 702), wireless communications and/or interlining (e.g., cellular, near field, Wi-Fi, or personal area network), location determination, financial transactions, providing haptic feedback, alarms, notifications, biometric authentication, health monitoring, sleep monitoring. The above-example functions can be executed independently in the HIPD 700 and/or in communication between the HIPD 700 and another wearable device described herein. In some embodiments, functions can be executed on the HIPD 700 in conjunction with an AR environment. As the skilled artisan will appreciate upon reading the descriptions provided herein, the novel HIPD 700 described herein can be used with any type of suitable AR environment.

While the HIPD 700 is communicatively coupled with a wearable device and/or other electronic device, the HIPD 700 is configured to perform one or more operations initiated at the wearable device and/or the other electronic device. In particular, one or more operations of the wearable device and/or the other electronic device can be offloaded to the HIPD 700 to be performed. The HIPD 700 performs one or more operations of the wearable device and/or the other electronic device and provides data corresponding to the completed operations to the wearable device and/or the other electronic device. For example, a user can initiate a video stream using the AR device 600 and back-end tasks associated with performing the video stream (e.g., video rendering) can be offloaded to the HIPD 700, which the HIPD 700 performs and provides corresponding data to the AR device 600 to perform remaining front-end tasks associated with the video stream (e.g., presenting the rendered video data via a display of the AR device 600). In this way, the HIPD 700, which has more computational resources and greater thermal headroom than a wearable device can perform computationally intensive tasks for the wearable device, improving performance of an operation performed by the wearable device.

The HIPD 700 includes a multi-touch input surface 702 on a first side (e.g., a front surface) that is configured to detect one or more user inputs. In particular, the multi-touch input surface 702 can detect single-tap inputs, multi-tap inputs, swipe gestures and/or inputs, force-based and/or pressure-based touch inputs, held taps, and the like. The multi-touch input surface 702 is configured to detect capacitive touch inputs and/or force (and/or pressure) touch inputs. The multi-touch input surface 702 includes a first touch-input surface 704 defined by a surface depression, and a second touch-input surface 706 defined by a substantially planar portion. The first touch-input surface 704 can be disposed adjacent to the second touch-input surface 706. In some embodiments, the first touch-input surface 704 and the second touch-input surface 706 can be different dimensions, shapes, and/or cover different portions of the multi-touch input surface 702. For example, the first touch-input surface 704 can be substantially circular and the second touch-input surface 706 is substantially rectangular. In some embodiments, the surface depression of the multi-touch input surface 702 is configured to guide user handling of the HIPD 700. In particular, the surface depression is configured such that the user holds the HIPD 700 upright when held in a single hand (e.g., such that the using imaging devices or cameras 714A and 714B are pointed toward a ceiling or the sky). Additionally, the surface depression is configured such that the user's thumb rests within the first touch-input surface 704.

In some embodiments, the different touch-input surfaces include a plurality of touch-input zones. For example, the second touch-input surface 706 includes at least a first touch-input zone 708 within a second touch-input zone 706 and a third touch-input zone 710 within the first touch-input zone 708. In some embodiments, one or more of the touch-input zones are optional and/or user defined (e.g., a user can specific a touch-input zone based on their preferences). In some embodiments, each touch-input surface and/or touch-input zone is associated with a predetermined set of commands. For example, a user input detected within the first touch-input zone 708 causes the HIPD 700 to perform a first command and a user input detected within the second touch-input zone 706 causes the HIPD 700 to perform a second command, distinct from the first. In some embodiments, different touch-input surfaces and/or touch-input zones are configured to detect one or more types of user inputs. The different touch-input surfaces and/or touch-input zones can be configured to detect the same or distinct types of user inputs. For example, the first touch-input zone 708 can be configured to detect force touch inputs (e.g., a magnitude at which the user presses down) and capacitive touch inputs, and the second touch-input zone 706 can be configured to detect capacitive touch inputs.

The HIPD 700 includes one or more sensors 751 for sensing data used in the performance of one or more operations and/or functions. For example, the HIPD 700 can include an IMU that is used in conjunction with cameras 714 for 3-dimensional object manipulation (e.g., enlarging, moving, destroying, etc. an object) in an AR or VR environment. Non-limiting examples of the sensors 751 included in the HIPD 700 include a light sensor, a magnetometer, a depth sensor, a pressure sensor, and a force sensor. Additional examples of the sensors 751 are provided below in reference to FIG. 7B.

The HIPD 700 can include one or more light indicators 712 to provide one or more notifications to the user. In some embodiments, the light indicators are LEDs or other types of illumination devices. The light indicators 712 can operate as a privacy light to notify the user and/or others near the user that an imaging device and/or microphone are active. In some embodiments, a light indicator is positioned adjacent to one or more touch-input surfaces. For example, a light indicator can be positioned around the first touch-input surface 704. The light indicators can be illuminated in different colors and/or patterns to provide the user with one or more notifications and/or information about the device. For example, a light indicator positioned around the first touch-input surface 704 can flash when the user receives a notification (e.g., a message), change red when the HIPD 700 is out of power, operate as a progress bar (e.g., a light ring that is closed when a task is completed (e.g., 0% to 100%)), operates as a volume indicator, etc.).

In some embodiments, the HIPD 700 includes one or more additional sensors on another surface. For example, as shown FIG. 7A, HIPD 700 includes a set of one or more sensors (e.g., sensor set 720) on an edge of the HIPD 700. The sensor set 720, when positioned on an edge of the of the HIPD 700, can be pe positioned at a predetermined tilt angle (e.g., 26 degrees), which allows the sensor set 720 to be angled toward the user when placed on a desk or other flat surface. Alternatively, in some embodiments, the sensor set 720 is positioned on a surface opposite the multi-touch input surface 702 (e.g., a back surface). The one or more sensors of the sensor set 720 are discussed in detail below.

The side view 725 of the of the HIPD 700 shows the sensor set 720 and camera 714B. The sensor set 720 includes one or more cameras 722A and 722B, a depth projector 724, an ambient light sensor 728, and a depth receiver 730. In some embodiments, the sensor set 720 includes a light indicator 726. The light indicator 726 can operate as a privacy indicator to let the user and/or those around them know that a camera and/or microphone is active. The sensor set 720 is configured to capture a user's facial expression such that the user can puppet a custom avatar (e.g., showing emotions, such as smiles, laughter, etc., on the avatar or a digital representation of the user). The sensor set 720 can be configured as a side stereo red-green-blue (RGB) system, a rear indirect time-of-flight (iToF) system, or a rear stereo RGB system. As the skilled artisan will appreciate upon reading the descriptions provided herein, the novel HIPD 700 described herein can use different sensor set 720 configurations and/or sensor set 720 placement.

In some embodiments, the HIPD 700 includes one or more haptic devices 771 (FIG. 7B; e.g., a vibratory haptic actuator) that are configured to provide haptic feedback (e.g., kinesthetic sensation). The sensors 751, and/or the haptic devices 771 can be configured to operate in conjunction with multiple applications and/or communicatively coupled devices including, without limitation, a wearable devices, health monitoring applications, social media applications, game applications, and artificial reality applications (e.g., the applications associated with artificial reality).

The HIPD 700 is configured to operate without a display. However, in optional embodiments, the HIPD 700 can include a display 768 (FIG. 7B). The HIPD 700 can also income one or more optional peripheral buttons 767 (FIG. 7B). For example, the peripheral buttons 767 can be used to turn on or turn off the HIPD 700. Further, the HIPD 700 housing can be formed of polymers and/or elastomer elastomers. The HIPD 700 can be configured to have a non-slip surface to allow the HIPD 700 to be placed on a surface without requiring a user to watch over the HIPD 700. In other words, the HIPD 700 is designed such that it would not easily slide off a surfaces. In some embodiments, the HIPD 700 include one or magnets to couple the HIPD 700 to another surface. This allows the user to mount the HIPD 700 to different surfaces and provide the user with greater flexibility in use of the HIPD 700.

As described above, the HIPD 700 can distribute and/or provide instructions for performing the one or more tasks at the HIPD 700 and/or a communicatively coupled device. For example, the HIPD 700 can identify one or more back-end tasks to be performed by the HIPD 700 and one or more front-end tasks to be performed by a communicatively coupled device. While the HIPD 700 is configured to offload and/or handoff tasks of a communicatively coupled device, the HIPD 700 can perform both back-end and front-end tasks (e.g., via one or more processors, such as CPU 777; FIG. 7B). The HIPD 700 can, without limitation, can be used to perform augmenting calling (e.g., receiving and/or sending 3D or 2.5D live volumetric calls, live digital human representation calls, and/or avatar calls), discreet messaging, 6DoF portrait/landscape gaming, AR/VR object manipulation, AR/VR content display (e.g., presenting content via a virtual display), and/or other AR/VR interactions. The HIPD 700 can perform the above operations alone or in conjunction with a wearable device (or other communicatively coupled electronic device).

FIG. 7B shows block diagrams of a computing system 740 of the HIPD 700, in accordance with some embodiments. The HIPD 700, described in detail above, can include one or more components shown in HIPD computing system 740. The HIPD 700 will be understood to include the components shown and described below for the HIPD computing system 740. In some embodiments, all, or a substantial portion of the components of the HIPD computing system 740 are included in a single integrated circuit. Alternatively, in some embodiments, components of the HIPD computing system 740 are included in a plurality of integrated circuits that are communicatively coupled.

The HIPD computing system 740 can include a processor (e.g., a CPU 777, a GPU, and/or a CPU with integrated graphics), a controller 775, a peripherals interface 750 that includes one or more sensors 751 and other peripheral devices, a power source (e.g., a power system 795), and memory (e.g., a memory 778) that includes an operating system (e.g., an operating system 779), data (e.g., data 788), one or more applications (e.g., applications 780), and one or more modules (e.g., a communications interface module 781, a graphics module 782, a task and processing management module 783, an interoperability module 784, an AR processing module 785, a data management module 786, etc.). The HIPD computing system 740 further includes a power system 795 that includes a charger input and output 796, a PMIC 797, and a battery 798, all of which are defined above.

In some embodiments, the peripherals interface 750 can include one or more sensors 751. The sensors 751 can include analogous sensors to those described above in reference to FIGS. 5B. For example, the sensors 751 can include imaging sensors 754, (optional) EMG sensors 756, IMUs 758, and capacitive sensors 760. In some embodiments, the sensors 751 can include one or more pressure sensor 752 for sensing pressure data, an altimeter 753 for sensing an altitude of the HIPD 700, a magnetometer 755 for sensing a magnetic field, a depth sensor 757 (or a time-of flight sensor) for determining a difference between the camera and the subject of an image, a position sensor 759 (e.g., a flexible position sensor) for sensing a relative displacement or position change of a portion of the HIPD 700, a force sensor 761 for sensing a force applied to a portion of the HIPD 700, and a light sensor 762 (e.g., an ambient light sensor) for detecting an amount of lighting. The sensors 751 can include one or more sensors not shown in FIG. 7B.

Analogous to the peripherals described above in reference to FIGS. 5B, the peripherals interface 750 can also include an NFC component 763, a GPS component 764, an LTE component 765, a Wi-Fi and/or Bluetooth communication component 766, a speaker 769, a haptic device 771, and a microphone 773. As described above in reference to FIG. 7A, the HIPD 700 can optionally include a display 768 and/or one or more buttons 767. The peripherals interface 750 can further include one or more cameras 770, touch surfaces 772, and/or one or more light emitters 774. The multi-touch input surface 702 described above in reference to FIG. 7A is an example of touch surface 772. The light emitters 774 can be one or more LEDs, lasers, etc. and can be used to project or present information to a user. For example, the light emitters 774 can include light indicators 712 and 726 described above in reference to FIG. 7A. The cameras 770 (e.g., cameras 714A, 714B, and 722 described above in FIG. 7A) can include one or more wide angle cameras, fish-eye cameras, spherical cameras, compound eye cameras (e.g., stereo and multi cameras), depth cameras, RGB cameras, ToF cameras, RGB-D cameras (depth and ToF cameras), and/or other available cameras. Cameras 770 can be used for SLAM; 6 DoF ray casting, gaming, object manipulation, and/or other rendering; facial recognition and facial expression recognition, etc.

Similar to the watch body computing system 560 and the watch band computing system 530 described above in reference to FIG. 5B, the HIPD computing system 740 can include one or more haptic controllers 776 and associated componentry (e.g., haptic devices 771) for providing haptic events at the HIPD 700.

Memory 778 can include high-speed random-access memory and/or non-volatile memory, such as one or more magnetic disk storage devices, flash memory devices, or other non-volatile solid-state memory devices. Access to the memory 778 by other components of the HIPD 700, such as the one or more processors and the peripherals interface 750, can be controlled by a memory controller of the controllers 775.

In some embodiments, software components stored in the memory 778 include one or more operating systems 779, one or more applications 780, one or more communication interface modules 781, one or more graphics modules 782, one or more data management modules 785, which are analogous to the software components described above in reference to FIG. 5B.

In some embodiments, software components stored in the memory 778 include a task and processing management module 783 for identifying one or more front-end and back-end tasks associated with an operation performed by the user, performing one or more front-end and/or back-end tasks, and/or providing instructions to one or more communicatively coupled devices that cause performance of the one or more front-end and/or back-end tasks. In some embodiments, the task and processing management module 783 uses data 788 (e.g., device data 790) to distribute the one or more front-end and/or back-end tasks based on communicatively coupled devices' computing resources, available power, thermal headroom, ongoing operations, and/or other factors. For example, the task and processing management module 783 can cause the performance of one or more back-end tasks (of an operation performed at communicatively coupled AR device 600) at the HIPD 700 in accordance with a determination that the operation is utilizing a predetermined amount (e.g., at least 70%) of computing resources available at the AR device 600.

In some embodiments, software components stored in the memory 778 include an interoperability module 784 for exchanging and utilizing information received and/or provided to distinct communicatively coupled devices. The interoperability module 784 allows for different systems, devices, and/or applications to connect and communicate in a coordinated way without user input. In some embodiments, software components stored in the memory 778 include an AR module 785 that is configured to process signals based at least on sensor data for use in an AR and/or VR environment. For example, the AR processing module 785 can be used for 3D object manipulation, gesture recognition, facial and facial expression, recognition, etc.

The memory 778 can also include data 787, including structured data. In some embodiments, the data 787 can include profile data 789, device data 789 (including device data of one or more devices communicatively coupled with the HIPD 700, such as device type, hardware, software, configurations, etc.), sensor data 791, media content data 792, and application data 793.

It should be appreciated that the HIPD computing system 740 is an example of a computing system within the HIPD 700, and that the HIPD 700 can have more or fewer components than shown in the HIPD computing system 740, combine two or more components, and/or have a different configuration and/or arrangement of the components. The various components shown in HIPD computing system 740 are implemented in hardware, software, firmware, or a combination thereof, including one or more signal processing and/or application-specific integrated circuits.

The techniques described above in FIG. 7A-7B can be used with any device used as a human-machine interface controller. In some embodiments, an HIPD 700 can be used in conjunction with one or more wearable device such as a head-wearable device (e.g., AR device 600 and VR device 610) and/or a wrist-wearable device 500 (or components thereof). In some embodiments, an HIPD 700 can also be used in conjunction with a wearable garment, such as smart textile-based garment 800 (FIGS. 8A-8C). Having thus described example HIPD 700, attention will now be turned to example feedback devices, such as smart textile-based garment 800.

Example Smart Textile-Based Garments

FIGS. 8A and 8B illustrate an example smart textile-based garment, in accordance with some embodiments. The smart textile-based garment 800 (e.g., wearable gloves, a shirt, a headband, a wristbands, socks, etc.) is configured to communicatively couple with one or more electronic devices, such as a wrist-wearable device 500, a head-wearable device, an HIPD 700, a laptop, tablet, and/or other computing devices. The smart textile-based garment 800 is an instance of the smart textile-based garment 800 comprising one or more of the first and second stretchable materials 102 and 202 described in reference to FIGS. 1A and 1B and 2A and 2B herein, such that the smart textile-based garment 800 should be understood to have the features described with respect to any smart textile-based garment defined above or otherwise described herein, and vice versa. The smart textile-based garment 800 can perform various functions and/or operations associated with navigating through user interfaces and selectively opening applications.

The smart textile-based garment 800 can be part of an AR system, such as AR system 400*d* described above in reference to FIGS. 4D-1 and 4D-2. The smart textile-based garment 800 is also configured to provide feedback (e.g., tactile or other haptic feedback) to a user based on the user's interactions with a computing system (e.g., navigation of a user interface, operation of an application (e.g., game vibrations, media responsive haptics), device notifications, etc.)), and/or the user's interactions within an AR environment. In some embodiments, the smart textile-based garment 800 receives instructions from a communicatively coupled device (e.g., the wrist-wearable device 500, a head-wearable device, and HIPD 700, etc.) for causing the performance of a feedback response. Alternatively, or in addition, in some embodiments, the smart textile-based garment 800 determines one or more feedback responses to provide a user. The smart textile-based garment 800 can determine the one or more feedback responses based on sensor data captured by one or more of its sensors (e.g., sensors 851; FIG. 8C) or communicatively coupled sensors (e.g., sensors of a wrist-wearable device 500, a head-wearable device, an HIPD 700, and/or other computing device).

Non-limiting examples of the feedback determined by the smart textile-based garment 800 and/or a communicatively coupled device include visual feedback, audio feedback, haptic (e.g., tactile, kinesthetic, etc.) feedback, thermal or temperature feedback, and/or other sensory perceptible feedback. The smart textile-based garment 800 can include respective feedback devices (e.g., a haptic device or assembly 862 or other feedback devices or assemblies) to provide the feedback responses to the user. Similarly, the smart textile-based garment 800 can communicatively couple with another device (and/or the other device's feedback devices) to coordinate the feedback provided to the user. For example, a VR device 610 can present an AR environment to a user and as the user interacts with objects within the AR environment, such as a virtual cup, the smart textile-based garment 800 provides respective response to the user. In particular, the smart textile-based garment 800 can provide haptic feedback to prevent (or, at a minimum, hinder/resist movement of) one or more of the user's fingers from bending past a certain point to simulate the sensation of touching a solid cup and/or thermal feedback to simulate the sensation of a cold or warm beverage.

Additionally, or alternatively, in some embodiments, the smart textile-based garment 800 is configured to operate as a controller configured to perform one or more functions or operations associated with interacting with user interfaces and applications of communicatively coupled devices, interacting with an AR environment, interacting with VR environment, and/or operating as a human-machine interface controller.

FIG. 8A shows one or more haptic assemblies 862 (e.g., first through fourth haptic assemblies 862-1 through 862-4) on a portion of the smart textile-based garment 800 adjacent to a palmar side of the user's hand and FIG. 8B shows additional haptic assemblies (e.g., a fifth haptic assembly 862-5) on a portion of the smart textile-based garment 800 adjacent to a dorsal side of the user's hand. In some embodiments, the haptic assemblies 862 include a mechanism that, at a minimum, provide resistance when a respective haptic assembly 862 is transitioned from a first state (e.g., a first pressurized state (e.g., at atmospheric pressure or deflated)) to a second state (e.g., a second pressurized state (e.g., inflated to a threshold pressure)). In other words, the haptic assemblies 862 described can transition between a first pressurized state and a second pressurized state to provide haptic feedback to the user. Structures of haptic assemblies 862 can be integrated into various devices configured to be in contact or proximity to a user's skin, including, but not limited to devices such as glove worn devices, body worn clothing device, headset devices. Each of the haptic assemblies 862 can be included in or physically coupled to a garment component 804 of the smart textile-based garment 800. For example, each of the haptic assemblies 862-1, 862-2, 862-3, . . . 862-N are physically coupled to the garment 804 are configured to contact respective phalanges of a user's thumb and fingers.

Due to the ever-changing nature of artificial-reality, the haptic assemblies 862 may be required to transition between the multiple states hundreds, or perhaps thousands of times, during a single use. Thus, the haptic assemblies 862 described herein are durable and designed to quickly transition from state to state. To provide some context, in a first pressurized state, the haptic assemblies 862 do not impede free movement of a portion of the wearer's body. For example, one or more haptic assemblies 862 incorporated into a glove are made from flexible materials that do not impede free movement of the wearer's hand and fingers (e.g., an electrostatic-zipping actuator). The haptic assemblies 862 are configured to conform to a shape of the portion of the wearer's body when in the first pressurized state. However, once in a second pressurized state, the haptic assemblies 862 can be configured to restrict and/or impede free movement of the portion of the wearer's body (e.g., appendages of the user's hand). For example, the respective haptic assembly 862 (or multiple respective haptic assemblies) can restrict movement of a wearer's finger (e.g., prevent the finger from curling or extending) when the haptic assembly 862 is in the second pressurized state. Moreover, once in the second pressurized state, the haptic assemblies 862 may take different shapes, with some haptic assemblies 862 configured to take a planar, rigid shape (e.g., flat, and rigid), while some other haptic assemblies 862 are configured to curve or bend, at least partially.

The smart textile-based garment 800 can be one of a plurality of devices in an AR system (e.g., AR systems of FIGS. 4A-4D-2). For example, a user can wear a pair of gloves (e.g., a first type of smart textile-based garment 800), wear a haptics component of a wrist-wearable device 500 (FIGS. 5A-5B), wear a headband (e.g., a second type of smart textile-based garment 800), hold an HIPD 700, etc. As explained above, the haptic assemblies 862 are configured to provide haptic simulations to a wearer of the smart textile-based garments 800. The garment 804 of each smart textile-based garment 800 can be one of various articles of clothing (e.g., gloves, socks, shirts, pants, etc.). Thus, a user may wear multiple smart textile-based garments 800 that are each configured to provide haptic stimulations to respective parts of the body where the smart textile-based garments 800 are being worn. Although the smart textile-based garment 800 are described as an individual device, in some embodiments, the smart textile-based garment 800 can be combined with other wearable devices described herein. For example, the smart textile-based garment 800 can form part of a VR device 610 (e.g., a headband portion).

FIG. 8C shows block diagrams of a computing system 840 of the haptic assemblies 862, in accordance with some embodiments. The computing system 840 can include one or more peripheral interfaces 850, one or more power systems 895 (including charger input 896, PMIC 897, and battery 898), one or more controllers 875 (including one or more haptic controllers 876), one or more processors 877 (as defined above, including any of the examples provided), and memory 878, which can all be in electronic communication with each other. For example, the one or more processors 877 can be configured to execute instructions stored in the memory 878, which can cause a controller of the one or more controllers 875 to cause operations to be performed at one or more peripheral devices of the peripherals interface 850. In some embodiments, each operation described can occur based on electrical power provided by the power system 895.

In some embodiments, the peripherals interface 850 can include one or more devices configured to be part of the computing system 840, many of which have been defined above and/or described with respect to wrist-wearable devices shown in FIGS. 5A-7B. For example, the peripherals interface 850 can include one or more sensors 851, such as one or more pressure sensors 852, one or more EMG sensors 856, one or more IMUs 858, one or more position sensors 859, one or more capacitive sensors 860, one or more force sensors 861; and/or any other types of sensors defined above or described with respect to any other embodiments discussed herein. In some embodiments, the peripherals interface can include one or more additional peripheral devices, including one or more Wi-Fi and/or Bluetooth devices 868, an LTE component 869, a GPS component 870, a microphone 871, one or more haptic assemblies 862, one or more support structures 863 which can include one or more bladders 864, one or more manifolds 865, one or more pressure-changing devices 867, one or more displays 872, one or more buttons 873, one or more speakers 874, and/or any other types of peripheral devices defined above or described with respect to any other embodiments discussed herein. In some embodiments, computing system 840 includes more or fewer components than those shown in FIG. 8C.

In some embodiments, each haptic assembly 862 includes a support structure 863 and at least one bladder 864. The bladder 864 (e.g., a membrane) is a sealed, inflatable pocket made from a durable and puncture-resistant material, such as thermoplastic polyurethane (TPU), a flexible polymer, or the like. The bladder 864 contains a medium (e.g., a fluid such as air, inert gas, or even a liquid) that can be added to or removed from the bladder 864 to change pressure (e.g., fluid pressure) inside the bladder 864. The support structure 863 is made from a material that is stronger and stiffer than the material of the bladder 864. A respective support structure 863 coupled to a respective bladder 864 is configured to reinforce the respective bladder 864 as the respective bladder changes shape and size due to changes in pressure (e.g., fluid pressure) inside the bladder. The above example haptic assembly 862 is non-limiting. The haptic assembly 862 can include eccentric rotating mass (ERM), linear resonant actuators (LRA), voice coil motor (VCM), piezo haptic actuator, thermoelectric devices, solenoid actuators, ultra-sonic transducers, thermo-resistive heaters, Peltier devices, and/or other devices configured to generate a perceptible response.

The smart textile-based garment 800 also includes a haptic controller 876 and a pressure-changing device 867. Alternatively, in some embodiments, the computing system 840 is communicatively coupled with a haptic controller 876 and/or pressure-changing device 867 (e.g., in electronic communication with one or more processors 877 of the computing system 840). The haptic controller 876 is configured to control operation of the pressure-changing device 867, and in turn operation of the smart textile-based garments 800. For example, the haptic controller 876 sends one or more signals to the pressure-changing device 867 to activate the pressure-changing device 867 (e.g., turn it on and off). The one or more signals can specify a desired pressure (e.g., pounds per square inch) to be output by the pressure-changing device 867. Generation of the one or more signals, and in turn the pressure output by the pressure-changing device 867, can be based on information collected by sensors 851 of the smart textile-based garment 800 and/or other communicatively coupled device. For example, the haptic controller 876 can provide one or more signals, based on collected sensor data, to cause the pressure-changing device 867 to increase the pressure (e.g., fluid pressure) inside a first haptic assembly 862 at a first time, and provide one or more additional signals, based on additional sensor data, to the pressure-changing device 867, to cause the pressure-changing device 867 to further increase the pressure inside a second haptic assembly 862 at a second time after the first time. Further, the haptic controller 876 can provide one or more signals to cause the pressure-changing device 867 to inflate one or more bladders 864 in a first portion of a smart textile-based garment 800 (e.g., a first finger), while one or more bladders 864 in a second portion of the smart textile-based garment 800 (e.g., a second finger) remain unchanged. Additionally, the haptic controller 876 can provide one or more signals to cause the pressure-changing device 867 to inflate one or more bladders 864 in a first smart textile-based garment 800 to a first pressure and inflate one or more other bladders 864 in the first smart textile-based garment 800 to a second pressure different from the first pressure. Depending on the number of smart textile-based garments 800 serviced by the pressure-changing device 867, and the number of bladders therein, many different inflation configurations can be achieved through the one or more signals, and the examples above are not meant to be limiting.

The smart textile-based garment 800 may include an optional manifold 865 between the pressure-changing device 867, the haptic assemblies 862, and/or other portions of the smart textile-based garment 800. The manifold 865 may include one or more valves (not shown) that pneumatically couple each of the haptic assemblies 862 with the pressure-changing device 867 via tubing. In some embodiments, the manifold 865 is in communication with the controller 875, and the controller 875 controls the one or more valves of the manifold 865 (e.g., the controller generates one or more control signals). The manifold 865 is configured to switchably couple the pressure-changing device 867 with one or more haptic assemblies 862 of the smart textile-based garment 800. In some embodiments, one or more smart textile-based garments 800 or other haptic devices can be coupled in a network of haptic devices, and the manifold 865 can distribute the fluid between the coupled smart textile-based garments 800.

In some embodiments, instead of using the manifold 865 to pneumatically couple the pressure-changing device 867 with the haptic assemblies 862, the smart textile-based garment 800 may include multiple pressure-changing devices 867, where each pressure-changing device 867 is pneumatically coupled directly with a single (or multiple) haptic assembly 862. In some embodiments, the pressure-changing device 867 and the optional manifold 865 can be configured as part of one or more of the smart textile-based garments 800 (not illustrated) while, in other embodiments, the pressure-changing device 867 and the optional manifold 865 can be configured as external to the smart textile-based garments 800. In some embodiments, a single pressure-changing device 867 can be shared by multiple smart textile-based garments 800 or other haptic devices. In some embodiments, the pressure-changing device 867 is a pneumatic device, hydraulic device, a pneudraulic device, or some other device capable of adding and removing a medium (e.g., fluid, liquid, or gas) from the one or more haptic assemblies 862.

The memory 878 includes instructions and data, some or all of which data may be stored as non-transitory computer-readable storage media within the memory 878. For example, the memory 878 can include one or more operating systems 879, one or more communication interface applications 881, one or more interoperability modules 884, one or more AR processing applications 885, one or more data-management modules 886, and/or any other types of data defined above or described with respect to FIGS. 5A-7B.

The memory 878 also includes data 888, which can be used in conjunction with one or more of the applications discussed above. The data 888 can include device data 890, sensor data 891, and/or any other types of data defined above or described with respect to FIGS. 5A-7B.

The different components of the computing system 840 (and the smart textile-based garment 800) shown in FIGS. 8A-8C can be coupled via a wired connection (e.g., via busing). Alternatively, one or more of the devices shown in FIGS. 8A-8C may be wirelessly connected (e.g., via short-range communication signals).

Example System for Knitting Smart Textile-Based Garments

Figure 9:
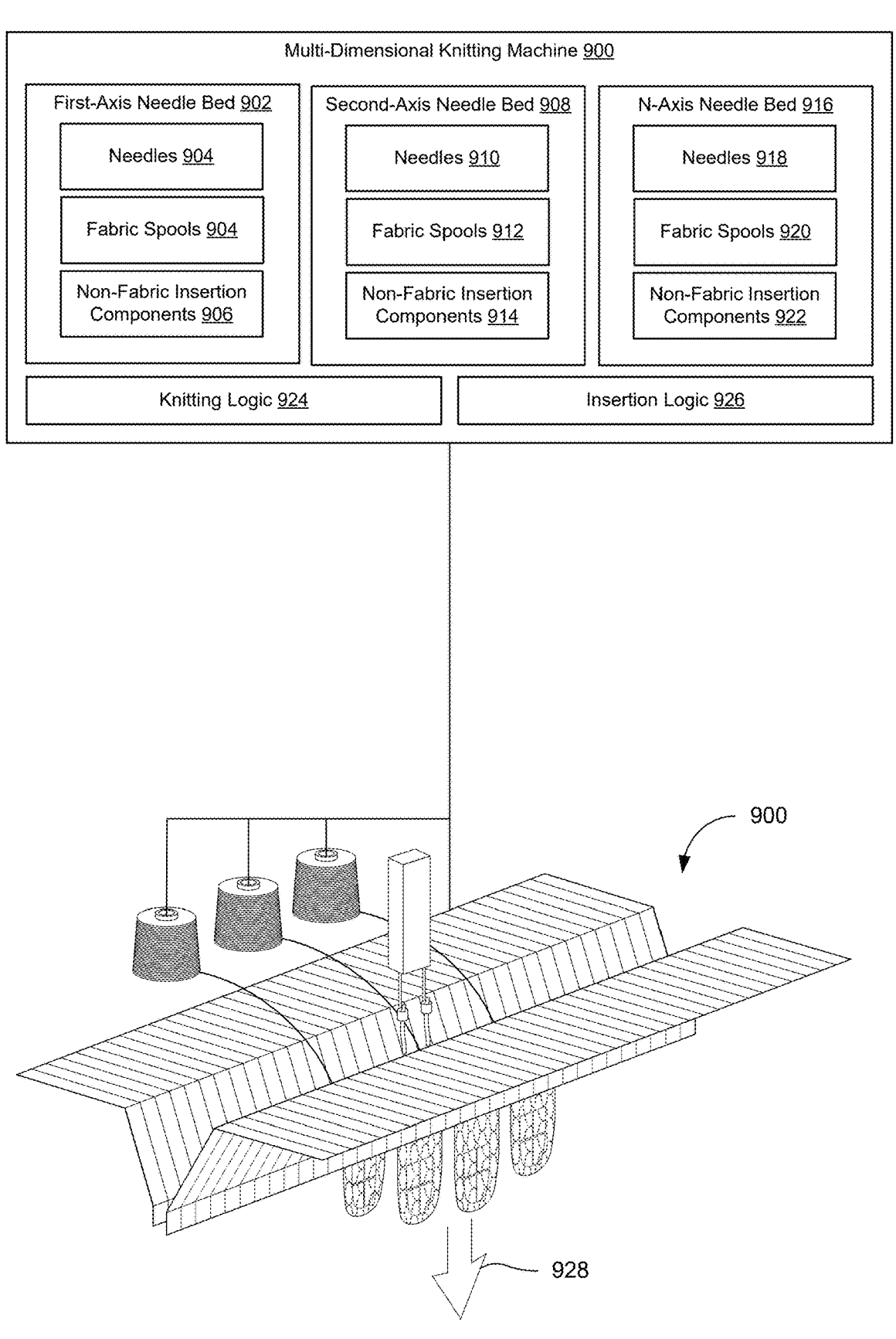
FIG. 9 illustrates a multi-dimensional knitting machine configured to produce multi-dimensional knitted smart textile-based garments in an automated fashion, in accordance with some embodiments.

Attention is now directed to FIG. 9, which illustrates a multi-dimensional knitting machine configured to produce multi-dimensional knitted garments in an automated fashion (e.g., with the needing for any hand knitting or other user intervention after initiating the knitting process, including allowing for having an electronic component automatically knitted as an integrated component of the multi-dimensional knitted garments), in accordance with some embodiments. The multi-dimensional knitting machine 900 is a garment-producing device that is computer controlled and user programmable to allow for complex knitted structures to be produced (e.g., smart textile-based garments 800 (FIGS. 8A-8C); such as gloves, tubular fabrics, fabrics with embedded electronic devices, complex knit patterns, special stretch characteristics, unique pattern structures, multi-thread structures, etc.,). The multi-dimensional knitting machine 900 includes a first-axis needle bed 902, a second-axis needle bed 908, and N-axis needle bed (indicating more than three needle beds are possible). Each one of these needle beds (e.g., needles 904, needles 910, and needles 918) is configured to use multiple different types of knit patterns (e.g., jersey knits, rib knits, interlock knits, French-terry knits, fleece knits, etc.,) based on a programmed sequence providing to the multi-dimensional knitting machine 900, and variations of these knits can be employed to form a single continuous garment (e.g., a combination of jersey knits and French terry knit and/or a first variation of a jersey knit and a second variation of a jersey knit). In some embodiments, the variations of these knits in a single continuous garment can be done without producing seams (e.g., a seamless wearable device can be produced). In some embodiments, the knitting machine is further configured to layer fabrics to produce multilayered wearable structures (e.g., to house one or more electronic components). In some embodiments, each layer in a multilayered wearable structure can be made from a different fabric, which in one example is produced using a conductive yarn. For example, a two-layer knitted capacitive sensor can be produced using the multi-dimensional knitting machine 900, where the first layer and the second layer use different thread (e.g., a coated-conductive thread and an uncoated-conductive thread). A plurality of fabric spools (e.g., fabric spools 904, fabric spools 912, and fabric spools 920) can be included for each one of the needle beds. Multiple types of fabric spools can be used for each needle bed allowing for even more complex woven structures (also referred to as garments) to be produced. In some embodiments, the fabric spools can also include elastic thread allowing for stretchable fabrics and/or fabrics with shape memory to be produced.

Each of the needle beds discussed above can also include one or more non-fabric insertion components (e.g., non-fabric insertion components 906, non-fabric insertion components 914, and non-fabric insertion components 922) that are configured to be used to allow for insertion of non-fabric structures into the needle beds, such that the non-knitted structure can be knitted into the knitted structure, while the knitted structure (e.g., garment) is being produced. For example, non-fabric structures can include flexible printed circuit boards, rigid circuit boards, conductive wires, structural ribbing, sensors (e.g., neuromuscular signal sensors, light sensors, PPG sensors, etc.,), etc. In some embodiments, a stitch pattern can be adjusted by the multi-dimensional knitting machine (e.g., in accordance with a programmed sequence of knit instructions provided to the machine) to accommodate these structures, which, in some embodiments, means that these structures are knitted into the fabric, instead of being sewn on top of a knitted fabric. This allows for garments to be lighter, thinner, and more comfortable to wear (e.g., by having fewer protrusions applying uneven pressure to the wearer's skin). In some embodiments, these multi-dimensional knitting machines can also knit knitted structures along either or both of a vertical axis or a horizontal depending on desired characteristics of the knitted structure. Knitting along a horizontal axis means that the garment would be produced from a left side to a right side (e.g., a glove would be produced starting with the pinky finger, then moving to the ring finger, then middle finger, etc. Sewing on the vertical means that the garment is produced in a top-down fashion (e.g., a glove would be produced starting from the top of the tallest finger and move down to the wrist portion of the glove (e.g., as shown by 928 in FIG. 9)). With respect to the glove examples, a reverse manufacturing process is also contemplated (e.g., knitting a thumb first when knitting on the horizontal and knitting the wrist portions when knitting on the vertical). In some embodiments, the insertion component can feed the non-knitted structure to the knitting machine, or, in some other embodiments, the insertion component is fed through the knitting machine with the non-knitted structure. In the latter, the insertion component is not integrated into the garment and is discarded. In some embodiments, the insertion component is not fed at all, but is an integrated component of the multi-dimensional knitting machine that is activated based on a programming knit sequence to then allow for insertion of a non-knitting component into a knitted structure.

The multi-dimensional knitting machine 900 also includes knitting logic module 924, which is a module that is user programmable to allow for a user (which can be a manufacturing entity producing wearable structures on mass scale) to define a knitting sequence to produce a garment using any of the above-described materials, stitch patterns, knitting techniques, etc. As stated above, the knitting logic module 924 allows for a seamless combination of any of the above-described techniques, thereby allowing unique complex knitted structures to be produced in a single knitting sequence (e.g., the user does not need to remove the knitted structure, then reinsert and reorient it to complete knitting the knitted structure). The multi-dimensional knitting machine 900 also includes insertion logic module 926, which works in tandem with the knitting logic module 924, to allow for insertion of non-fabric components to be seamlessly inserted into the knitted structure while the knitted structure is knitted together. The insertion logic is in communication with the knitting logic to allow for the knit to be adjusted in accordance with where the non-fabric structure is being inserted. In some embodiments, the user need only show where the non-fabric structure is to be inserted in their mock-up (e.g., at a user interface associated with the multi-dimensional knitting machine, which user interface allows for creating and editing a programmed knit sequence) and the knitting logic module 924 and insertion logic module 926 automatically work together to allow for the knitted structure to be produced.

Example Embodiments (A1) In some embodiments, a wearable material (e.g., the textile-based garment 800) is provided. The wearable material includes a stretchable material (e.g., the first stretchable material 102) including a biopotential-signal-sensing component (e.g., the biopotential-signal-sensing component 110) for sensing a biopotential signal from a skin-contacting location of a wearer's body on which the wearable material is being worn (e.g., a portion of the wearer's hand). The stretchable material includes a ground layer (e.g., a layer of material having an alternating current (AC) potential of zero volts). The biopotential-signal-sensing component is separated from the ground layer by a height (H) (e.g., a biopotential-grounding-separation distance). The biopotential-signal-sensing component has a width (W) and a thickness (T) (e.g., a radial width and thickness of a cylinder-shaped component, a rectangular width and thickness of a cuboid-shaped component). And the stretchable material is configured to maintain a substantially consistent stretch ratio (e.g., within 15 percent of a characteristic ratio) between the width (W), the thickness (T), and the height (H) such that a substantially consistent characteristic impedance value (Zo) is maintained by the biopotential-signal-sensing component (e.g., respective impedance values within 10% to 15% of a characteristic impedance value).

In some embodiments, the stretchable material is further configured for processing and/or transmission of high-speed digital signals across a portion of the stretchable material that is configured to maintain the characteristic impedance, which can prevent degradation and/or loss of the high-speed digital signals, thereby increasing a fidelity of the digital signals as they are received by a processor of a computing device associated with the wearable material.

(A2) In some embodiments of A1, the stretchable material further includes a dielectric layer (e.g., the dielectric layer 106; FIGS. 1A and 1B), which may be positioned between the ground layer and the biopotential-signal-sensing component. In some embodiments, the dielectric layer includes one or more of an insulating material, porcelain, mica, glass, plastic, one or more metal oxides, air, nitrogen, and/or sulfur hexafluoride.

(A3) In some embodiments of A2, the dielectric layer is configured and arranged to substantially enclose the biopotential-signal-sensing component, such that the biopotential-signal-sensing component is insulated from the ground layer. For example, in FIGS. 2A and 2B, the dielectric layer 206 is substantially enclosing each of the biopotential-signal-sensing components 210-A and 210-B.

(A4) In some embodiments of A2 or A3, the stretchable material includes another layer that is one of (i) a power layer or (ii) another ground layer. The dielectric layer is positioned between the ground layer (e.g., the ground layer 204) and the other layer (the second layer 218). And the biopotential-signal-sensing component is located in the dielectric layer such that the biopotential-signal-sensing component is positioned between the ground layer and the other layer.

(A5) In some embodiments of any one of A2 to A4, the characteristic impedance value ($Z_o$) is defined by the following equation, where $\varepsilon_r$ is a constant value related to the characteristic of a particular dielectric material comprising the dielectric layer.

$$Z_o(\Omega) = \frac{87}{\sqrt{\varepsilon_r + 1.41}} \ln\left[\frac{5.98H}{0.8W + T}\right]. \qquad \text{Equation 1}$$

As described herein, $\varepsilon_r$ may be referred to as the relative permittivity and/or the dielectric constant, where the value of the dielectric constant relates to the permittivity of a material that can be expressed as a ratio compared to the electric permittivity of a vacuum. Permittivity is the electric polarizability of a dielectric. The dielectric constant measures the ability of the dielectric to store electrical energy in an electrical field. Example dielectric constant values for various materials are widely available. As a few examples, the εr value of glass may range from between 3.7-10, the εr value of porcelain may range from 5-7, the εr value of silicon may range from 11-12, the εr range of rubber may have a value of approximately 3. These values are example values that may not apply to every type of material or every permutation or variation of a particular material.

(A6) In some embodiments of A5, the dielectric layer height (H2) of the dielectric layer is the sum of: (i) a first distance (D1) (e.g., a first dielectric distance) between a first surface of the biopotential-signal-sensing component and the ground layer, (ii) the thickness (T) of the biopotential-signal-sensing component, and (iii) a second distance (D2) (e.g., a second dielectric distance) between a second surface of the biopotential-signal-sensing component and the other layer. In some embodiments, the stretch-ratio is defined by the following equation.

$$Z_o(\Omega) = \frac{60}{\sqrt{\varepsilon_r}} \ln\left[\frac{1.9H2}{0.8W + T}\right]. \qquad \text{Equation 2}$$

(A7) In some embodiments of A6, the first and second surfaces of the biopotential-signal-sensing component are substantially opposite (e.g., within five degrees of a 180-degree difference between respective planes defined by the first and second surfaces). In some embodiments, planes defined by the first and second surfaces of the biopotential-signal-sensing component are substantially horizontal. For example, a first surface of the biopotential-signal-sensing component 210-1 may face toward the ground layer 204, and a second surface of the biopotential-signal-sensing component 210 may face toward the second layer 218.

(A8) In some embodiments of A1 to A7, the biopotential-signal-sensing component is arranged in one or more of the following configurations: (i) within (e.g., sandwiched between) respective outer layers of the stretchable material; (ii) at least partially exposed outside of the respective outer layers of the stretchable material; and/or (iii) located closer to a first outer edge of the stretchable material than a second outer edge of the stretchable material.

(A9) In some embodiments of A1 to A8, the width of the biopotential-signal-sensing component is between 16 and 24 microns.

(A10) In some embodiments of A1 to A9, the stretchable material comprises a mesh composed of one or more of copper, zinc, and/or rubber. And the properties of the mesh control stretching of the stretchable material to maintain the substantially consistent stretch ratio.

(A11) In some embodiments of A1 to A10, the ground layer (and/or the dielectric layer) occupies a portion of the stretchable material, and another portion of the stretchable material does not include the ground layer. For example, a horizontal portion of the ground layer 104 is not adjacent to a cross section of the biopotential-signal-sensing component 110.

(A12) In some embodiments of A11, the ground layer has a length of between one millimeter and ten millimeters. And the biopotential-signal-sensing component has a smaller length than the ground layer (e.g., 0.5 millimeters).

(A13) In some embodiments of any one of A1 to A12, the stretchable material includes one or more of: (i) a band portion of a wrist-wearable device (e.g., the wearable band 510), (ii) a strap of an artificial-reality headset (e.g., a strap of the VR device 610), and (iii) a skin-contacting portion of a wearable glove device (e.g., the textile-based garment 800).

(A14) In some embodiments of any one of A1 to A13, the biopotential-signal-sensing component includes an electrode of an electromyography (EMG) signal sensor.

In some embodiments, the width (W) and the height (H) of the biopotential-signal-sensing component are configured to vary linearly through a stretch region of the stretchable material (e.g., a major dimension of the stretchable material along a direction in which the wearable electronic device is configured to stretch to accommodate different sizes of a particular body part on which the wearable electronic device is configured to be worn). In some embodiments, the stretchable material includes a strain locking means (e.g., carbon fiber, aramid fiber) within respective fabrics of the stretchable material that cause the stretchable material to maintain dimensions within a particular functional range via shear resistance. In some embodiments, the strain locking means include polyimide fiber webbing. In some embodiments, a plurality of biopotential-signal-sensing components (e.g., the biopotential-signal-sensing components 210-1 and 210-2) are arranged in a co-planar fashion along a dimension of the strain-locking means, such that each of the respective biopotential-signal-sensing components is configured to receive a same amount of shear resistance.

(B1) In some embodiments, a wearable electronic device is provided. The wearable electronic device includes one or more processors, memory, and a wearable material of any of A1 to A14.

(C1) In some embodiments, a method of manufacturing a wearable electronic device is provided. In some embodiments, the method of manufacturing includes providing a wearable material of any one of A1 to A14.

Any data collection performed by the devices described herein and/or any devices configured to perform or cause the performance of the different embodiments described above in reference to any of the Figures, hereinafter the "devices," is done with user consent and in a manner that is consistent with all applicable privacy laws. Users are given options to allow the devices to collect data, as well as the option to limit or deny collection of data by the devices. A user is able to opt in or opt out of any data collection at any time. Further, users are given the option to request the removal of any collected data.

It will be understood that, although the terms "first," "second," etc., may be used herein to describe various elements, these elements should not be limited by these terms. These terms are only used to distinguish one element from another.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" can be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" can be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A wearable material comprising:
a stretchable material including a biopotential-signal-sensing component for sensing a biopotential signal from a skin-contacting location of a wearer's body on which the wearable material is being worn, wherein:
the stretchable material includes a ground layer, the biopotential-signal-sensing component is separated from the ground layer by a height (H), the biopotential-signal-sensing component has a width (W) and a thickness (T), and
the stretchable material is configured to maintain a substantially consistent stretch ratio between the width (W), the thickness (T), and the height (H) such that a substantially consistent characteristic impedance value $Z_o$ is maintained by the biopotential-signal-sensing component while being deformed when used.

2. The wearable material device of claim 1, wherein the stretchable material is further configured to transmit high-speed digital signals.

3. The wearable material of claim 1, wherein:

the stretchable material further includes a dielectric layer, and the dielectric layer is positioned between the ground layer and the biopotential-signal-sensing component.

4. The wearable material of claim 3, wherein the dielectric layer is configured and arranged to substantially enclose the biopotential-signal-sensing component, such that the biopotential-signal-sensing component is insulated from the ground layer.

5. The wearable material of claim 3, wherein:

the stretchable material includes another layer that is one of (i) a power layer or (ii) a second ground layer;

the dielectric layer is positioned between the ground layer and the other layer; and the biopotential-signal-sensing component is located in the dielectric layer such that the biopotential-signal-sensing component is positioned between the ground layer and the other layer.

6. The wearable material of claim 3, wherein:

the substantially consistent characteristic impedance value ($Z_o$) is defined by:

$$Z_o(\Omega) = \frac{60}{\sqrt{\varepsilon_r}} \ln\left[\frac{1.9H2}{0.8W + T}\right], \text{ and}$$

$\varepsilon_r$ is a constant value related to a respective physical characteristic of a particular dielectric material comprising the dielectric layer.

7. The wearable material of claim 5, wherein:

a dielectric layer height (H2) of the dielectric layer is a sum of:

a first distance (D1) between a first surf ace of the biopotential-signal-sensing component and the ground layer, the thickness (T) of the biopotential-signal-sensing component, and a second distance (D2) between a second surface of the biopotential-signal-sensing component and the other layer, and the substantially consistent stretch ratio is defined by:

$$Z_o(\Omega) = \frac{87}{\sqrt{\varepsilon_r + 1.41}} \ln\left[\frac{5.98H}{0.8W + T}\right],$$

8. The wearable material of claim 6, wherein:

a first surface and a second surface of the biopotential-signal-sensing component are substantially opposite, and planes defined by the first and second surfaces of the biopotential-signal-sensing component are substantially horizontal.

9. The wearable material of claim 1, wherein the biopotential-signal-sensing component is arranged in one or more respective configurations in relation to the stretchable material:

within respective outer layers of the stretchable material, at least partially exposed outside of the respective outer layers of the stretchable material, and/or located closer to a first outer edge of the stretchable material than a second outer edge of the stretchable material.

10. The wearable material of claim 1, wherein:

the stretchable material comprises a mesh composed of one or more of copper, zinc, and/or rubber, and one or more properties of the mesh are configured to control stretching of the stretchable material to maintain the substantially consistent stretch ratio.

11. The wearable material of claim 1, wherein:

the ground layer occupies a portion of the stretchable material, and another portion of the stretchable material does not include the ground layer.

12. The wearable material of claim 1, wherein the stretchable material comprises one of:

a band portion of a wrist-wearable device, a strap of an artificial-reality headset, and a skin-contacting portion of a wearable glove device.

13. A wearable electronic device, comprising:

one or more processors;

memory; and a wearable material comprising a stretchable material including a biopotential-signal-sensing component for sensing a biopotential signal from a skin-contacting location of a wearer's body on which the wearable material is being worn, wherein:

the stretchable material includes a ground layer, the biopotential-signal-sensing component is separated from the ground layer by a height (H), the biopotential-signal-sensing component has a width (W) and a thickness (T), and stretchable material is configured to maintain a substantially consistent stretch ratio between the width (W), the thickness (T), and the height (H) such that a substantially consistent characteristic impedance value ($Z_o$) is maintained by the biopotential-signal-sensing component while being deformed when used.

14. The wearable electronic device of claim 13, wherein:

the stretchable material further includes a dielectric layer, and the dielectric layer is positioned between the ground layer and the biopotential-signal-sensing component.

15. The wearable electronic device of claim 14, wherein the dielectric layer is configured and arranged to substantially enclose the biopotential-signal-sensing component, such that the biopotential-signal-sensing component is insulated from the ground layer.

16. The wearable electronic device of claim 14, wherein:

the stretchable material includes another layer that is one of (i) a power layer or (ii) a second ground layer;

the dielectric layer is positioned between the ground layer and the other layer; and the biopotential-signal-sensing component is located in the dielectric layer such that the biopotential-signal-sensing component is positioned between the ground layer and the other layer.

17. The wearable electronic device of claim 14, wherein:

the substantially consistent characteristic impedance value ($Z_o$) is defined by:

$$Z_o(\Omega) = \frac{87}{\sqrt{\varepsilon_r + 1.41}} \ln\left[\frac{5.98H}{0.8W + T}\right],$$

and $\varepsilon_r$ is a constant value related to a respective physical characteristic of a particular dielectric material comprising the dielectric layer.

18. The wearable electronic device of claim 17, wherein:

a dielectric layer height (H2) of the dielectric layer is a sum of:

a first distance (D1) between a first surface of the biopotential-signal-sensing component and the ground layer, the thickness (T) of the biopotential-signal-sensing component, and a second distance (D2) between a second surface of the biopotential-signal-sensing component and the other layer, and the substantially consistent stretch ratio is defined by:

$$Z_o(\Omega) = \frac{60}{\sqrt{\varepsilon_r}} \ln\left[\frac{1.9H2}{0.8W + T}\right].$$

19. The wearable electronic device of claim 18, wherein:

the first surface and the second surface of the biopotential-signal-sensing component are substantially opposite, and planes defined by the first and second surfaces of the biopotential-signal-sensing component are substantially horizontal.

20. A method of manufacturing a wearable electronic device, comprising:

providing a wearable material that comprises a stretchable material including a biopotential-signal-sensing component for sensing a biopotential signal from a skin-contacting location of a wearer's body on which the wearable material is being worn, wherein:

the stretchable material includes a ground layer, the biopotential-signal-sensing component is separated from the ground layer by a height (H), the biopotential-signal-sensing component has a width (W) and a thickness (T), and the stretchable material is configured to maintain a substantially consistent stretch ratio between the width (W), the thickness (T), and the height (H) such that a substantially consistent characteristic impedance value ($Z_o$) is maintained by the biopotential-signal-sensing component while being deformed when used.

* * * * *